US008246855B2

(12) United States Patent
Hirai

(10) Patent No.: US 8,246,855 B2
(45) Date of Patent: *Aug. 21, 2012

(54) POLYMERIZABLE LIQUID CRYSTAL COMPOSITION AND OPTICALLY ANISOTROPIC FILM USING THE SAME

(75) Inventor: Yoshiharu Hirai, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/461,997

(22) Filed: Aug. 31, 2009

(65) Prior Publication Data

US 2010/0051866 A1    Mar. 4, 2010

(30) Foreign Application Priority Data

Aug. 29, 2008   (JP) ................................ 2008-220809
Jul. 7, 2009     (JP) ................................ 2009-160405

(51) Int. Cl.
*C09K 19/00* (2006.01)
*C09K 19/06* (2006.01)
*C09K 19/32* (2006.01)
*C09K 19/52* (2006.01)

(52) U.S. Cl. ........... 252/299.66; 252/299.01; 252/299.6; 252/299.62; 252/299.63; 252/299.61; 252/299.64; 252/299.65; 428/1.1; 349/1; 349/56; 349/182

(58) Field of Classification Search ............. 252/299.01, 252/299.6, 299.61–299.66; 428/1.1; 349/1, 349/56, 182

See application file for complete search history.

(56) References Cited

U.S. PATENT DOCUMENTS

| 5,674,576 | A | 10/1997 | Gotoh et al. |
| 5,807,974 | A | 9/1998 | Kim et al. |
| 5,876,864 | A | 3/1999 | Kim et al. |
| 7,393,569 | B2 * | 7/2008 | Ito et al. ........................ 428/1.1 |
| 7,488,519 | B2 * | 2/2009 | Hirai .............................. 428/1.1 |
| 2010/0143612 | A1 * | 6/2010 | Hirai ............................ 428/1.25 |
| 2010/0151154 | A1 * | 6/2010 | Hirai .............................. 428/1.2 |

FOREIGN PATENT DOCUMENTS

| EP | 1 201 632 | 5/2002 |
| JP | 07-017910 | 1/1995 |
| JP | 08-003111 | 1/1996 |
| JP | 09-316032 | 12/1997 |

OTHER PUBLICATIONS

B. Ziemnicka and J. W. Doane, "Nematic Mesophases in 9-Methyl and 9-Bromo-2-Fluorenyl 4-Alkoxybenzoates", Mol. Cryst. Liq. Cryst., 1987, vol. 150b, pp. 361-373.
Peer Kirsch, Matthias Bremer, Andreas Taugerbeck and Tilman Wallmichrath, "Difluorooxymethylene-Bridged Liquid Crystals: A Novel Synthesis Based on the Oxidative Alkoxydifluorodesulfuration of Dithianylium Salts", Angew. Chem. Int. Ed., 2001, 40, No. 8, pp. 1480-1483.
Rafik Karaman, Dan T. Kohlman and James L. Fry, "Conversion of Aromatic Ketones, Benzyl Alcohols, and Alkyl Aryl Ethers to Aromatic Hydrocarbons with Lithium 4,4'-D1-t-Butylbiphenyl Radical Anion", Tetrahedron Letters, 1990, vol. 31, No. 43, pp. 6155-6158.

* cited by examiner

*Primary Examiner* — Geraldina Visconti
(74) *Attorney, Agent, or Firm* — Wenderoth, Lind & Ponack, LLP

(57) ABSTRACT

A polymerizable liquid crystal composition is provided that has a wide range where a liquid crystal phase is exhibited, has excellent solubility in an organic solvent, and is facilitated in control of an alignment state. The use of the polymerizable liquid crystal composition provides a polymerizable liquid crystal composition that has good solubility in a solvent with high safety, such as PGMEA, and can control various alignment states. The polymerizable liquid crystal composition in one aspect contains a fluorenone derivative represented by the formula (1) and a compound having a bisphenol skeleton represented by the formula (2). In the formulae (1) and (2), $W^1$ represents hydrogen, fluorine, chlorine, methyl or ethyl; $X^1$ represents hydrogen, fluorine, methyl or trifluoromethyl; $Z^{11}$ to $Z^{14}$ are bonding groups; $A^1$ represents a divalent cyclic group; $Y^1$ represents alkylene having from 2 to 20 carbon atoms; $A^2$ represents a divalent group having a bisphenol skeleton; $X^2$ represents hydrogen, fluorine, methyl or trifluoromethyl; $W^2$ represents hydrogen, halogen, alkyl or fluoroalkyl; $Y^2$ independently represents a single bond, —CH=CH— or —(CH$_2$)$_2$—; and $n^2$ independently represents an integer of from 2 to 15.

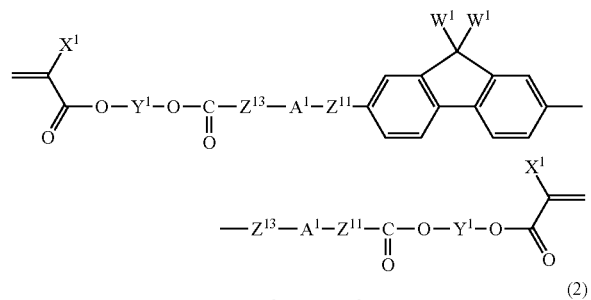

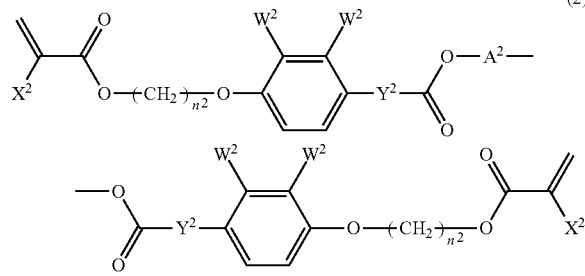

24 Claims, 4 Drawing Sheets

POLYMERIZABLE LIQUID CRYSTAL COMPOSITION AND OPTICALLY ANISOTROPIC FILM USING THE SAME

FIELD OF THE INVENTION

The present invention relates to a polymerizable liquid crystal composition, a polymer obtained by polymerizing the composition, a molded article having optical anisotropy comprising the polymer, and a liquid crystal display device comprising the polymer.

BACKGROUND OF THE INVENTION

In recent years, a polymerizable liquid crystal compound is utilized as an optically anisotropic member, such as a polarizing plate and a phase retarder owing to the fact that the compound exhibits optical anisotropy in a liquid crystal state, and the optical anisotropy is fixed by polymerization. The optical characteristics that is required by a molded article having optical anisotropy varies depending on purposes, and it is necessary to use a compound having characteristics that conform to the purpose. Only a sole kind of these compounds is difficult to control the optical anisotropy by itself, and therefore there are cases where the compound is used in combination with various compounds as a composition.

The present inventors have developed a polymerizable liquid crystal compound having a fluorene skeleton (see Patent Document 1). A polymerizable liquid crystal composition containing the compound may be used as an ink after adding thereto an organic solvent for controlling the coating property thereof. A film having optical anisotropy is produced with a polymerizable liquid crystal composition in the following manner. A polymerizable liquid crystal compound, a photopolymerization initiator, a surfactant and the like are dissolved in an organic solvent to prepare an ink having been controlled in solution viscosity, leveling property and the like. The ink is coated on a transparent substrate film having been subjected to an alignment treatment, and then dried to remove the solvent, and the polymerizable liquid crystal composition is oriented on the substrate film. Thereafter, the composition is polymerized by irradiating with an ultraviolet ray to fix the oriented state. The organic solvent used may be an ordinary solvent, such as a hydrocarbon solvent, e.g., toluene, and a ketone solvent, e.g., methyl ethyl ketone and cyclopentanone, but there is a demand for use of an organic solvent that has high safety and produces less environmental load, such as propylene glycol monoethyl ether acetate (PGMEA), in view of the environmental load, the safety issues, such as mutagenicity and toxicity. However, the polymerizable liquid crystal compound is poor in solubility in such a solvent as PGMEA to fail to provide an ink with high concentration. Furthermore, the compound has a high melting point, whereby crystals thereof are liable to be deposited when the compound is once heated to form a liquid crystal and then allowed to stand under room temperature.

Patent Document 1: U.S. Pat. No. 6,824,709

SUMMARY OF THE INVENTION

An object of the invention is to provide a polymerizable liquid crystal composition that has a wide range where a liquid crystal phase is exhibited, has such a low recrystallization temperature that a liquid crystal phase is exhibited even after allowing to stand under room temperature, and excellent in solubility in a solvent with high safety (safe solvent), such as PGMEA. Another object of the invention is to provide a polymer that is controlled in alignment of the polymerizable liquid crystal to exhibit optical anisotropy conforming to the purpose. Still another object of the invention is to provide a liquid crystal display device that contains the polymer exhibiting optical anisotropy.

The inventors have found that a polymerizable liquid crystal composition containing components including a fluorenone polymerizable liquid crystal compound having a particular skeleton and a polymerizable liquid crystal compound having a bisphenol skeleton solves the aforementioned problems, and thus the invention has been completed.

DETAILED DESCRIPTION OF THE INVENTION

Figure 1:
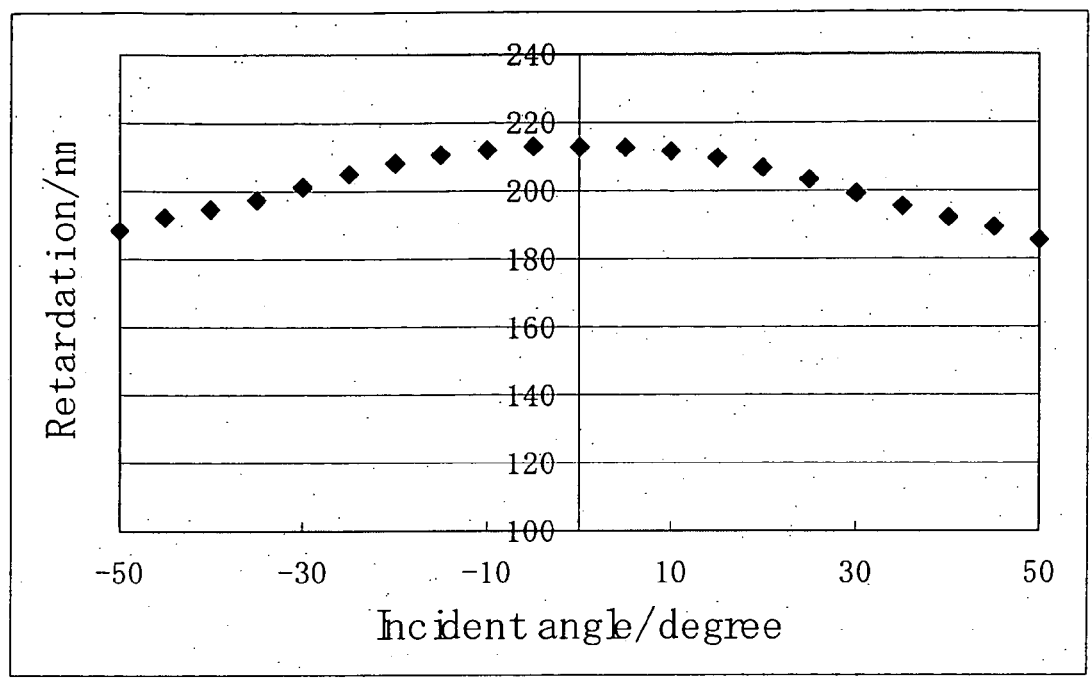
FIG. 1 is an illustration showing results of measurement of retardation for a liquid crystal film (homogeneous alignment) obtained in Example 1.

The terms used herein are defined as follows. The term "liquid crystal compound" is a generic term for a compound having a liquid crystal phase and a compound having no liquid crystal phase but being useful as a component of a liquid crystal composition. The term "liquid crystal phase" includes a nematic phase, a smectic phase, a cholesteric phase and the like, and means a nematic phase in many cases. The term "polymerizable" or "polymerizability" means such a capability that a monomer is polymerized through such means as light, heat or catalyst to provide a polymer. A compound represented by a formula (1-1) may be abbreviated as a compound (1-1). The abbreviation rule may also be applied to compounds represented by the other formulae. The term "liquid crystal" or "liquid crystallinity" is not limited to the fact that a liquid crystal phase is exhibited. The term "liquid crystal" or "liquid crystallinity" includes such a property that a compound has no liquid crystal phase but is useful as a component of a liquid crystal composition by mixing with another liquid crystal compound. The term "arbitrary" used upon describing the structures of the chemical formulae includes not only an arbitrary position but also an arbitrary number, which are freely selected. For example, the expression "arbitrary A may be replaced by B, C or D" not only includes the case where arbitrary A is replaced by B, the case where arbitrary A is replaced by C, and the case where arbitrary A is replaced by D, but also includes the case where arbitrary plural A are replaced by at least two of B, C and D. In the definition that arbitrary —$CH_2$— may be —O—, however, two groups of —$CH_2$— adjacent to each other are not replaced by —O— simultaneously to exclude a bonding group —O—O—.

The invention includes embodiments shown by the items [1] to [18] shown below.

[1] A polymerizable liquid crystal composition containing at least one compound selected from the group of compounds represented by the formula (1) as a component (A) and at least one compound selected from the group of compounds represented by the formula (2) as a component (B), wherein the liquid crystal composition may further contain at least one compound selected from the group of compounds represented by the formulae (3-1) and (3-2) as a component (C), and may further contain at least one compound selected from the group of compounds represented by the formula (4) as a component (D):

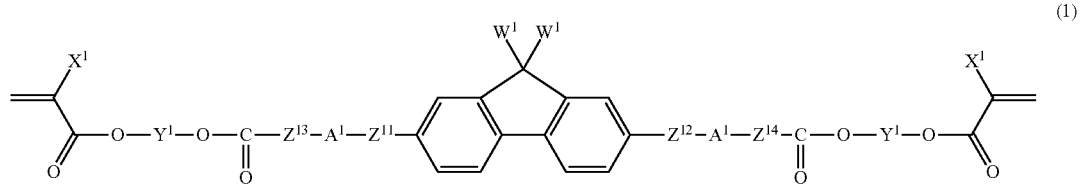

(1)

wherein $W^1$ independently represents hydrogen, fluorine, chlorine, methyl or ethyl;

$X^1$ independently represents hydrogen, fluorine, methyl or trifluoromethyl;

$Z^{11}$ represents a single bond, —COO—, —CH=CH—COO—, —CH$_2$CH$_2$—COO—, —CH$_2$O—, —CONH—, —(CH$_2$)$_4$—, —CH$_2$CH$_2$— or —C≡C—;

$Z^{12}$ represents a single bond, —OCO—, —OCO—CH=CH—, —OCO—CH$_2$CH$_2$—, —OCH$_2$—, —NHCO—, —(CH$_2$)$_4$—, —CH$_2$CH$_2$— or —C≡C—;

$Z^{13}$ and $Z^{14}$ each independently represent a single bond or —O—;

$A^1$ independently represents 1,4-cyclohexylene, 1,4-phenylene, 1,3-phenylene, pyridin-2,5-diyl, pyrimidin-2,5-diyl, naphthalen-2,6-diyl or tetrahydronaphthalen-2,6-diyl, provided that in the 1,3-phenylene and 1,4-phenylene, arbitrary hydrogen may be replaced by fluorine, chlorine, cyano, methyl, ethyl, methoxy, hydroxyl, formyl, acetoxy, acetyl, trifluoroacetyl, difluoromethyl or trifluoromethyl; and $Y^1$ independently represents alkylene having from 2 to 20 carbon atoms, provided that in the alkylene, arbitrary hydrogen may be replaced by fluorine or chlorine, and arbitrary —CH$_2$— may be replaced by —O—, —COO—, —OCO—, —CH=CH— or —C≡C—,

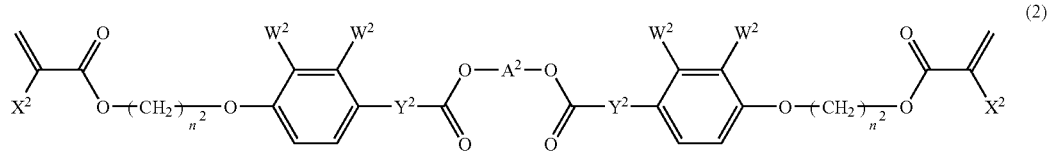

(2)

wherein $A^2$ represents a group represented by one of the formulae (A2-1) to (A2-18):

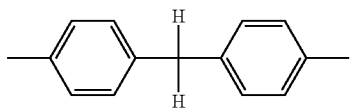

(A2-1)

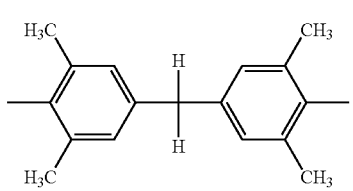

(A2-2)

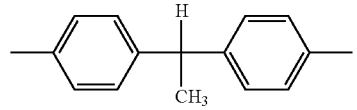

(A2-3)

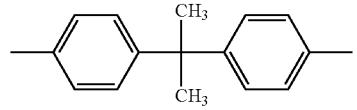

(A2-4)

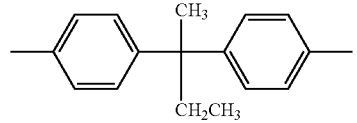

(A2-5)

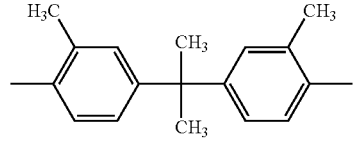

(A2-6)

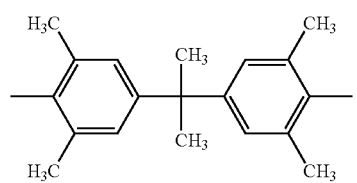

(A2-7)

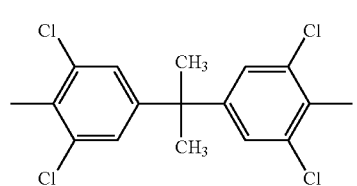

(A2-8)

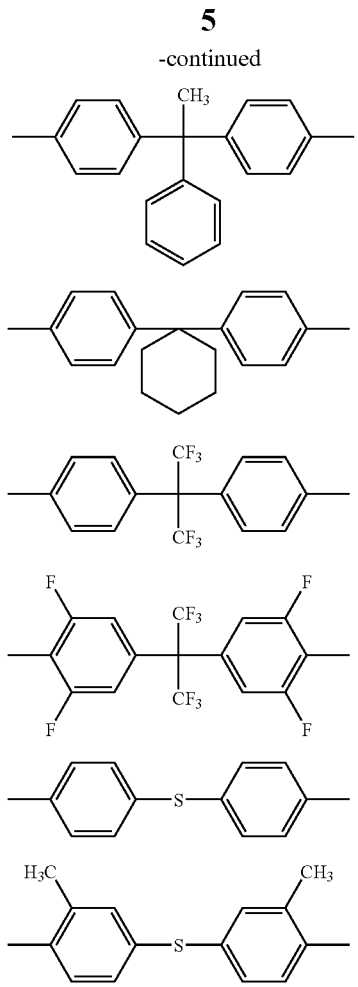
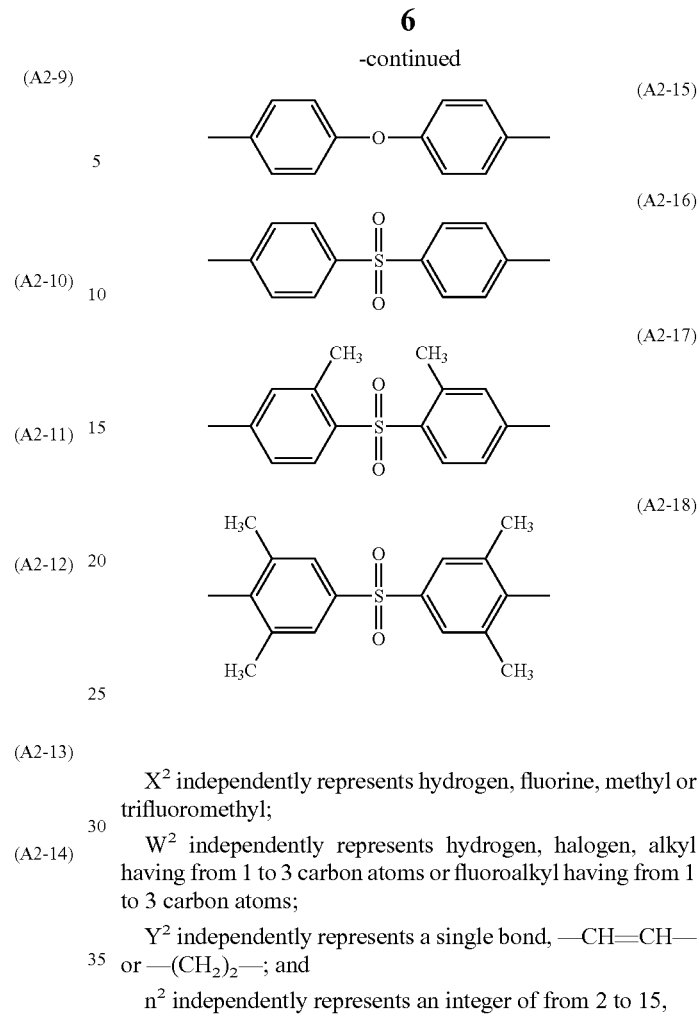
$X^2$ independently represents hydrogen, fluorine, methyl or trifluoromethyl;
$W^2$ independently represents hydrogen, halogen, alkyl having from 1 to 3 carbon atoms or fluoroalkyl having from 1 to 3 carbon atoms;
$Y^2$ independently represents a single bond, —CH=CH— or —(CH$_2$)$_2$—; and
$n^2$ independently represents an integer of from 2 to 15,
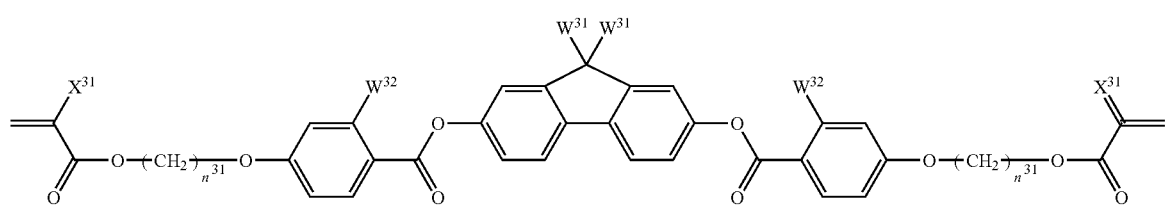
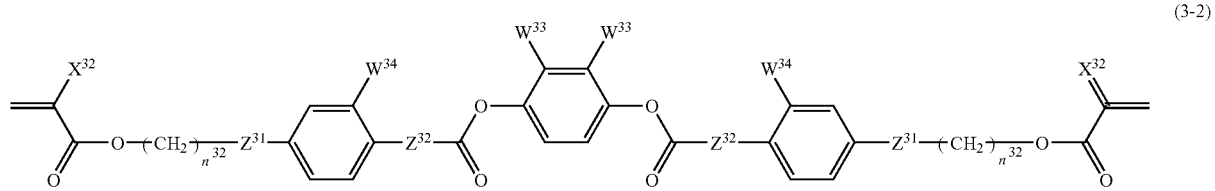

wherein
in the formula (3-1),
$X^{31}$ independently represents hydrogen, fluorine or methyl;
$W^{31}$ independently represents hydrogen or methyl;
$W^{32}$ independently represents hydrogen or fluorine; and
$n^{31}$ independently represents an integer of from 2 to 10, and
in the formula (3-2),
$X^{32}$ independently represents hydrogen, fluorine or methyl; and
$Z^{31}$ independently represents —O— or a group represented by the formula (a),
$Z^{32}$ independently represents a single bond, —CH$_2$CH$_2$— or —CH=CH—;
$W^{33}$ independently represents hydrogen, fluorine, methyl or trifluoromethyl;
$W^{34}$ independently represents hydrogen or fluorine; and
$n^{32}$ independently represents an integer of from 2 to 10,

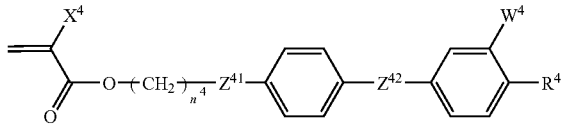

(4)

wherein
$X^4$ represents hydrogen, fluorine or methyl;
$R^4$ represents —CN, —OCF$_3$, alkyl having from 1 to 10 carbon atoms or alkoxy having from 1 to 10 carbon atoms;
$W^4$ represents hydrogen or fluorine;
$Z^{41}$ represents —O— or a group represented by the formula (a);
$Z^{42}$ represents a single bond, —C≡C— or —COO—; and
$n^4$ represents an integer of from 2 to 10.

[2] The polymerizable liquid crystal composition according to the item [1], wherein
in the formula (1),
$W^1$ independently represents hydrogen or methyl;
$X^1$ independently represents hydrogen, fluorine or methyl;
$Z^1$ represents —COO—, —CH=CH—COO— or —CH$_2$CH$_2$—COO—;
$Z^{12}$ represents —OCO—, —OCO—CH=CH— or —OCO—CH$_2$CH$_2$—;
$Z^{13}$ and $Z^{14}$ each independently represent a single bond or —O—;
$A^1$ independently represents 1,4-phenylene or 1,3-phenylene, provided that in the rings, arbitrary hydrogen may be replaced by fluorine or chlorine; and
$Y^1$ independently represents alkylene having from 2 to 14 carbon atoms, provided that in the alkylene, arbitrary —CH$_2$— may be replaced by —O—,
in the formula (2),
$A^2$ represents a group represented by one of the formulae (A2-1) to (A2-8) and (A2-11) to (A2-18);
$X^2$ independently represents hydrogen or methyl;
$W^2$ independently represents hydrogen or fluorine;
$Y^2$ independently represents a single bond, —CH=CH— or (CH$_2$)$_2$—; and
$n^2$ independently represents an integer of from 2 to 10, in the formula (3-1),
$X^{31}$ independently represents hydrogen, fluorine or methyl;
$W^{31}$ independently represents hydrogen or methyl;
$W^{32}$ independently represents hydrogen or fluorine; and
$n^{31}$ independently represents an integer of from 2 to 10, in the formula (3-2),
$X^{32}$ independently represents hydrogen, fluorine or methyl;
$Z^{31}$ independently represents —O— or a group represented by the formula (a);
$Z^{32}$ independently represents a single bond, —CH$_2$CH$_2$— or —CH=CH—;
$W^{33}$ independently represents hydrogen, fluorine, methyl or trifluoromethyl;
$W^{34}$ independently represents hydrogen or fluorine; and
$n^{32}$ independently represents an integer of from 2 to 10, and
in the formula (4),
$X^4$ represents hydrogen, fluorine or methyl;
$R^4$ represents —CN, —OCF$_3$, alkyl having from 1 to 10 carbon atoms or alkoxy having from 1 to 10 carbon atoms;
$W^4$ represents hydrogen or fluorine;
$Z^{41}$ represents —O— or a group represented by the formula (a);
$Z^{42}$ represents a single bond, —C≡C— or —COO—; and
$n^4$ represents an integer of from 2 to 10.

[3] The polymerizable liquid crystal composition according to the item [1], wherein
in the formula (1),
$W^1$ independently represents hydrogen or methyl;
$X^1$ independently represents hydrogen or methyl;
$Z^{11}$ represents —COO—, —CH=CH—COO— or —CH$_2$CH$_2$—COO—;
$Z^{12}$ represents —OCO—, —OCO—, CH=CH— or —OCO—CH$_2$CH$_2$—;
$Z^{13}$ and $Z^{14}$ each independently represent a single bond or —O—;
$A^1$ independently represents 1,4-phenylene or 1,3-phenylene, provided that in the rings, arbitrary hydrogen may be replaced by fluorine or chlorine; and
$Y^1$ independently represents alkylene having from 2 to 14 carbon atoms, provided that in the alkylene, arbitrary —CH$_2$— may be replaced by —O—,
in the formula (2),
$A^2$ represents a group represented by one of the formulae (A2-1), (A2-4), (A2-11), (A2-12), (A2-16) and (A2-18);
$X^2$ independently represents hydrogen or methyl;
$W^2$ independently represents hydrogen or fluorine;
$Y^2$ independently represents a single bond, —CH=CH— or —(CH$_2$)$_2$—; and
$n^2$ independently represents an integer of from 2 to 10, in the formula (3-1),
$X^{31}$ independently represents hydrogen, fluorine or methyl;
$W^{31}$ independently represents hydrogen or methyl;
$W^{32}$ independently represents hydrogen or fluorine; and
$n^{31}$ independently represents an integer of from 2 to 10, in the formula (3-2),
$X^{32}$ independently represents hydrogen, fluorine or methyl;
$Z^{31}$ independently represents —O— or a group represented by the formula (a);
$Z^{32}$ independently represents a single bond, —CH$_2$CH$_2$— or —CH=CH—;
$W^{33}$ independently represents hydrogen, methyl or trifluoromethyl;
$W^{34}$ independently represents hydrogen, and
$n^{32}$ independently represents an integer of from 2 to 10, and
in the formula (4),
$X^4$ represents hydrogen or methyl;
$R^4$ represents —CN, —OCF$_3$, alkyl having from 1 to 10 carbon atoms or alkoxy having from 1 to 10 carbon atoms;

$W^4$ represents hydrogen or fluorine;

$Z^{41}$ represents —O— or a group represented by the formula (a);

$Z^{42}$ represents a single bond, —C≡C— or —COO—; and $n^4$ represents an integer of from 2 to 10.

[4] The polymerizable liquid crystal composition according to one of the items [1] to [3], wherein the composition contains the component (A), the component (B) and the component (C).

[5] The polymerizable liquid crystal composition according to one of the items [1] to [3], wherein the composition contains the component (A), the component (B) and the component (D).

[6] The polymerizable liquid crystal composition according to one of the items [1] to [3], wherein the composition contains the component (A), the component (B), the component (C) and the component (D).

[7] The polymerizable liquid crystal composition according to one of the items [1] to [6], wherein the composition further contains at least one silane coupling agent selected from compounds represented by the formulae (5-1) and (5-2), and a weight ratio of the silane coupling agent is from 0.01 to 0.15 based on a total weight of the components (A) to (D):

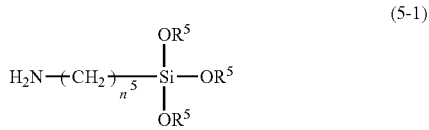

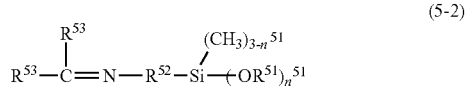

wherein in the formula (5-1), $R^5$ independently represents methyl or ethyl; and $n^5$ represents an integer of from 1 to 5, and in formula (5-2), $R^{51}$ represents alkyl having from 1 to 4 carbon atoms;

$R^{52}$ represents alkyl having from 1 to 10 carbon atoms;

$R^{53}$ independently represents hydrogen or alkyl having from 1 to 10 carbon atoms, provided that all groups represented by $R^{53}$ each are not hydrogen simultaneously; and $n^{51}$ represents an integer of from 1 to 3.

[8] The polymerizable liquid crystal composition according to the item [7], wherein in the formula (5-1), $R^5$ represents ethyl; and $n^5$ represents an integer of from 1 to 5, in the formula (5-2), $R^{51}$ represents methyl or ethyl;

$R^{52}$ represents alkyl having from 1 to 10 carbon atoms;

$R^{53}$ independently represents hydrogen or alkyl having from 1 to 10 carbon atoms, provided that all groups represented by $R^{53}$ each are not hydrogen simultaneously; and $n^{51}$ represents an integer of 3, and a weight ratio of the silane coupling agent is from 0.03 to 0.10 based on a total weight of the components (A) to (D).

[9] The polymerizable liquid crystal composition according to one of the items [1] to [6], wherein the composition further contains a nonionic surfactant, and a weight ratio of the nonionic surfactant is from 0.0001 to 0.03 based on a total weight of the components (A) to (D).

[10] The polymerizable liquid crystal composition according to the item [9], wherein the nonionic surfactant is a fluorine-related nonionic surfactant, a silicone-related nonionic surfactant or a hydrocarbon-related nonionic surfactant.

[11] The polymerizable liquid crystal composition according to one of the items [1] to [10], wherein an amount of the component (A) is from 5 to 95% by weight, an amount of the component (B) is from 1 to 30% by weight, an amount of the component (C) is from 0 to 47% by weight, and an amount of the component (D) is from 0 to 47% by weight, based on a total weight of the components (A) to (D).

[12] The polymerizable liquid crystal composition according to one of the items [1] to [10], wherein an amount of the component (A) is from 10 to 90% by weight, an amount of the component (B) is from 1 to 28% by weight, an amount of the component (C) is from 0 to 45% by weight, and an amount of the component (D) is from 0 to 44% by weight, based on a total weight of the components (A) to (D).

[13] The polymerizable liquid crystal-composition according to one of the items [1] to [10], wherein an amount of the component (A) is from 15 to 85% by weight, an amount of the component (B) is from 1 to 25% by weight, an amount of the component (C) is from 0 to 42% by weight, and an amount of the component (D) is from 0 to 42% by weight, based on a total weight of the components (A) to (D).

[14] A film having optical anisotropy obtained by polymerizing at least one of the polymerizable liquid crystal composition according to one of the items [1] to [13].

[15] The film having optical anisotropy according to the item [14], wherein the polymerizable liquid crystal composition is in a homogeneous alignment state.

[16] The film having optical anisotropy according to the item [14], wherein the polymerizable liquid crystal composition is in a homeotropic alignment state.

[17] The film having optical anisotropy according to the item [14], wherein the polymerizable liquid crystal composition is in a hybrid alignment state.

[18] A liquid crystal display device comprising the film having optical anisotropy according to one of the items [14] to [17].

The composition of the invention contains at least one compound selected from the group of compounds represented by the formula (1) as a component (A).

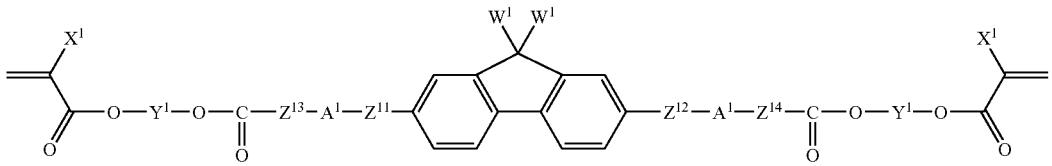

The symbols in the formula (1) have the following meanings.

$W^1$ independently represents hydrogen, fluorine, chlorine, methyl or ethyl, and preferably hydrogen or methyl.

$X^1$ independently represents hydrogen, fluorine, methyl or trifluoromethyl, preferably hydrogen, fluorine or methyl, and more preferably hydrogen or methyl.

$Z^{11}$ represents a single bond, —COO—, —CH=CH—COO—, —CH$_2$CH$_2$—COO—, —CH$_2$O—, —CONH—, —(CH$_2$)$_4$—, —CH$_2$CH$_2$— or —C≡C—, and preferably —COO—, —CH=CH—COO— or —CH$_2$CH$_2$—COO—.

$Z^{12}$ represents a single bond, —OCO—, —OCO—CH=CH—, —OCO—CH$_2$CH$_2$—, —OCH$_2$—, —NHCO—, —(CH$_2$)$_4$—, —CH$_2$CH$_2$— or —C≡C—, and preferably —OCO—, —OCO—CH=CH— or —OCO—CH$_2$CH$_2$—.

$Z^{13}$ and $Z^{14}$ each independently represent a single bond or —O—.

$A^1$ independently represents 1,4-cyclohexylene, 1,4-phenylene, 1,3-phenylene, pyridin-2,5-diyl, pyrimidin-2,5-diyl, naphthalen-2,6-diyl or tetrahydronaphthalen-2,6-diyl. In the 1,3-phenylene and 1,4-phenylene, arbitrary hydrogen may be replaced by fluorine, chlorine, cyano, methyl, ethyl, methoxy, hydroxyl, formyl, acetoxy, acetyl, trifluoroacetyl, difluoromethyl or trifluoromethyl. In this case, the number of hydrogen that is replaced by cyano, methyl, ethyl, methoxy, hydroxyl, formyl, acetoxy, acetyl, trifluoroacetyl, difluoromethyl or trifluoromethyl is preferably 1 or 2. Preferred examples of the group represented by $A^1$ include 1,4-phenylene and 1,3-phenylene, provided that in these rings, arbitrary hydrogen may be replaced by fluorine or chlorine.

$Y^1$ independently represents alkylene having from 2 to 20 carbon atoms, provided that in the alkylene, arbitrary hydrogen may be replaced by fluorine or chlorine, and arbitrary —CH$_2$— may be replaced by —O—, —COO—, —OCO—, —CH=CH— or —C≡C—. Preferred examples of the group represented by $Y^1$ include alkylene having from 2 to 14 carbon atoms, provided that in the alkylene, arbitrary —CH$_2$— may be replaced by —O—.

The composition of the invention contains at least one compound selected from the group of compounds represented by the formula (2) as a component (B).

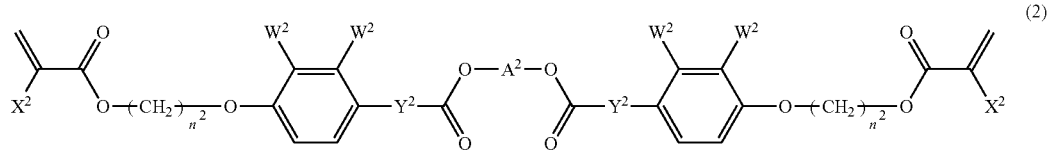

(2)

The symbols in the formula (2) have the following meanings.

$X^2$ independently represents hydrogen, fluorine, methyl or trifluoromethyl, and preferably hydrogen or methyl.

$W^2$ independently represents hydrogen, halogen, alkyl having from 1 to 3 carbon atoms or fluoroalkyl having from 1 to 3 carbon atoms, and preferably hydrogen or fluorine.

$Y^2$ independently represents a single bond, —CH=CH— or (CH$_2$)$_2$—.

$n^2$ independently represents an integer of from 2 to 15, and preferably an integer of from 2 to 10.

$A^2$ represents a group represented by one of the formulae (A2-1) to (A2-18).

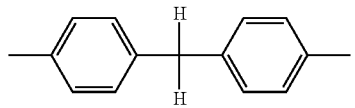
(A2-1)

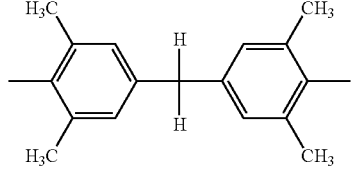
(A2-2)

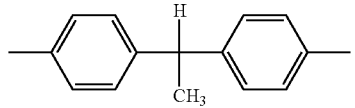
(A2-3)

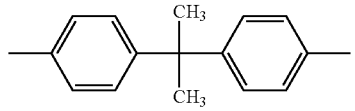
(A2-4)

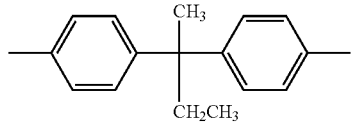
(A2-5)

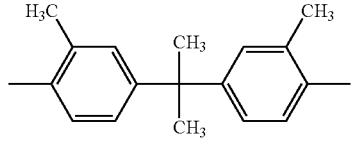
(A2-6)

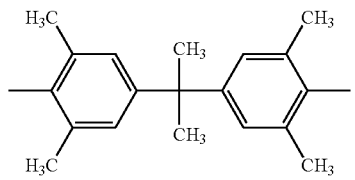
(A2-7)

-continued

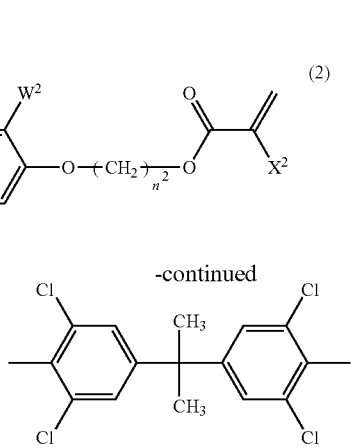
(A2-8)

(A2-9)

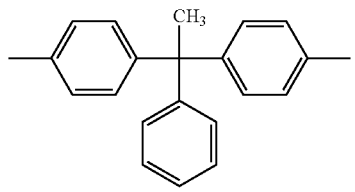

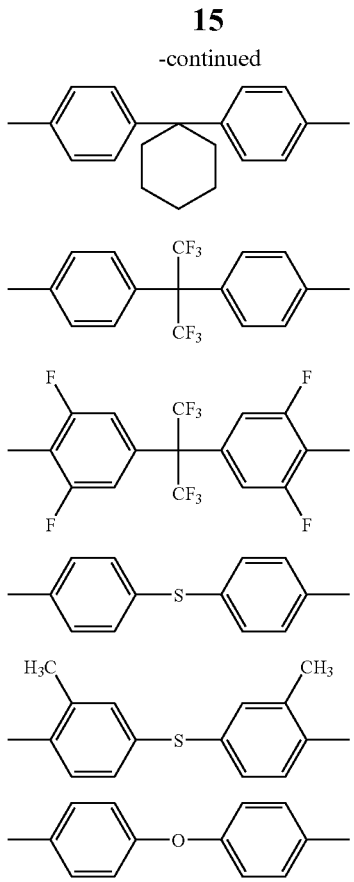

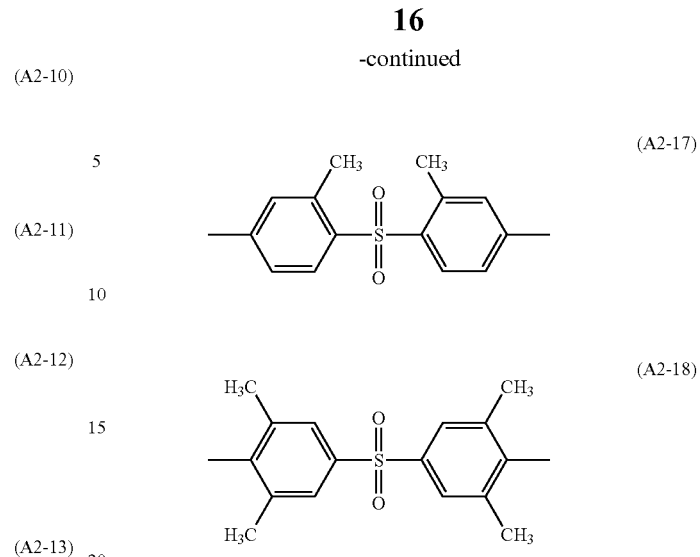

Preferred examples of the group represented by $A^2$ include groups represented by the formulae (A2-1) to (A2-8) and (A2-11) to (A2-18), and more preferably groups represented by the formulae (A2-1), (A2-4), (A2-11), (A2-12), (A2-16) and (A2-18).

The composition of the invention may further contain at least one compound selected from the group of compounds represented by the formulae (3-1) and (3-2) as a component (C).

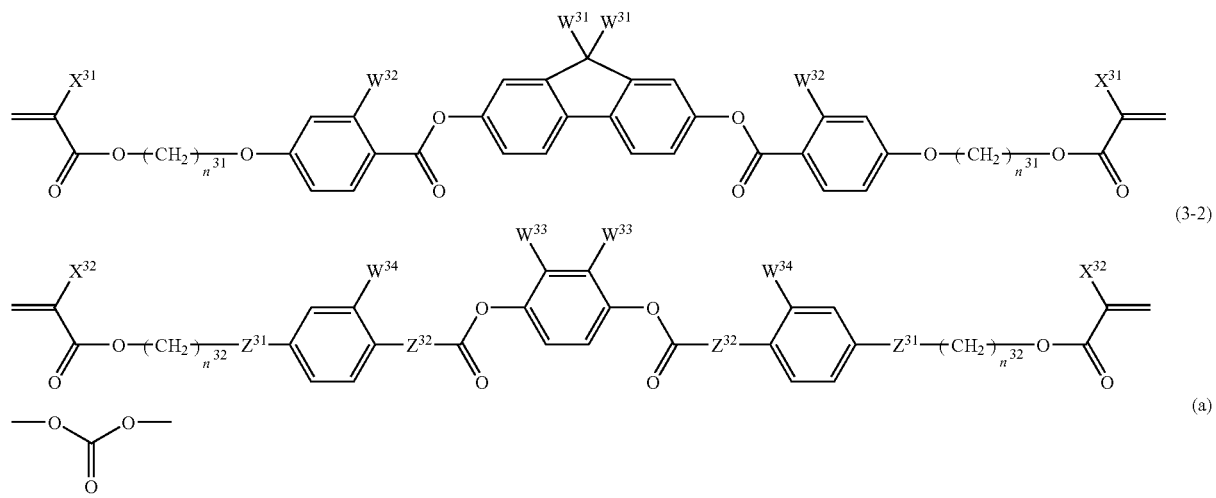

-continued

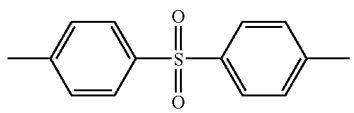

The symbols in the formula (3-1) have the following meanings.
$X^{31}$ independently represents hydrogen, fluorine or methyl.
$W^{31}$ independently represents hydrogen or methyl.
$W^{32}$ independently represents hydrogen or fluorine.
$n^{31}$ independently represents an integer of from 2 to 10.
The symbols in the formula (3-2) have the following meanings.
$X^{32}$ independently represents hydrogen, fluorine or methyl.

$Z^{31}$ independently represents —O— or a group represented by the formula (a).

$Z^{32}$ independently represents a single bond, —CH$_2$CH$_2$— or CH=CH—.

$W^{33}$ independently represents hydrogen, fluorine, methyl or trifluoromethyl and preferably hydrogen, methyl or trifluoromethyl.

$W^{34}$ independently represents hydrogen or fluorine.

$n^{32}$ independently represents an integer of from 2 to 10.

The composition of the invention may further contain at least one compound selected from the group of compounds represented by the formula (4) as a component (D).

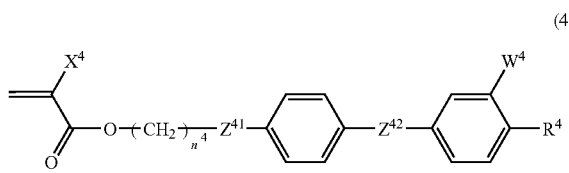
(4)

The symbols in the formula (4) have the following meanings.

$X^4$ represents hydrogen, fluorine or methyl, and preferably hydrogen or methyl.

$R^4$ represents —CN, —OCF$_3$, alkyl having from 1 to 10 carbon atoms or alkoxy having from 1 to 10 carbon atoms.

$W^4$ represents hydrogen or fluorine.

$Z^{41}$ represents —O— or a group represented by the formula (a).

$Z^{42}$ represents a single bond, —C≡C— or —COO—.

$n^4$ represents an integer of from 2 to 10.

The composition of the invention may contain either the component (C) or the component (D) solely or may contain both the components (C) and (D).

The composition of the invention may further contain at least one silane coupling agent selected from compounds represented by the formulae (5-1) and (5-2), in addition to the components (A) to (D).

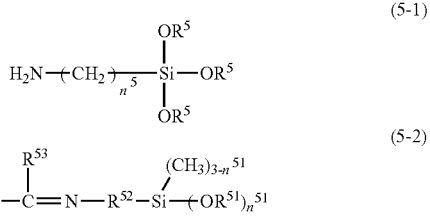

The symbols in the formula (5-1) have the following meanings.

$R^5$ independently represents methyl or ethyl, and preferably ethyl.

$n^5$ represents an integer of from 1 to 5.

The symbols in the formula (5-2) have the following meanings.

$R^{51}$ represents alkyl having from 1 to 4 carbon atoms, and preferably methyl or ethyl.

$R^{52}$ represents alkyl having from 1 to 6 carbon atoms.

$R^{53}$ independently represents alkyl having from 1 to 10 carbon atoms and preferably alkyl having from 1 to 6 carbon atoms, provided that all groups represented by $R^{53}$ each are not hydrogen simultaneously, preferably methyl, ethyl, propyl, isopropyl, butyl, isobutyl or tert-butyl, and more preferably methyl or isopropyl.

$n^{51}$ represents an integer of from 1 to 3, and preferably an integer of 3.

The composition of the invention may further contain a, nonionic surfactant, in addition to the components (A) to (D). Examples of the nonionic surfactant include a fluorine-related nonionic surfactant, a silicone-related nonionic surfactant or a hydrocarbon-related nonionic surfactant, and preferred examples thereof include a fluorine-related nonionic surfactant.

Preferred embodiments of the components constituting the composition of the invention have been described above. Examples of combinations of the preferred embodiments include the aforementioned items [2] to [13].

The composition of the invention has a nematic phase at room temperature, and has a tendency of homeotropic alignment in the case where a plastic substrate, a supporting substrate having a plastic thin film coated thereon, or a glass substrate is not subjected to a surface treatment, such as a rubbing treatment, and the composition contains the monofunctional component (the compound (4)). In the case where the substrate is subjected to a rubbing treatment, and the composition does not contain the monofunctional component (the compound (4)), the composition has a tendency of homogeneous alignment or hybrid alignment. These tendencies are liable to be influenced by the addition of a silane coupling agent and a nonionic surfactant as described later.

The compounds used in the composition of the invention will be described.

The compound (1) has a skeleton having a particular structure containing a fluorenone ring as a main part, and two polymerizable groups. The compound exhibits liquid crystallinity, and is a polymerizable liquid crystal compound capable of producing a hard polymer having a three-dimensional structure as compared to a compound having one polymerizable group. The compound shows good solubility in a safe solvent, such as PGMEA.

The compound (2) has a bisphenol skeleton and two polymerizable groups. The compound is a polymerizable compound capable of producing a hard polymer having a three-dimensional structure as compared to a compound having one polymerizable group. The compound may not exhibit liquid crystallinity. The compound has a function of decreasing the melting point of the polymerizable liquid crystal composition. The use of the compound in combination with the other polymerizable liquid crystal compounds provides a tendency of homeotropic alignment or hybrid alignment while depending on such conditions as the supporting substrate and the additives.

The compounds (3-1) and (3-2) have a liquid crystal skeleton and two polymerizable groups. The compounds have a tendency of homogeneous alignment while depending on such conditions as the supporting substrate and the additives. The compounds exhibit a liquid crystal phase within a wide temperature range and has a tendency of showing a relatively large birefringence. In the following description, the compounds (3-1) and (3-2) may be referred to as a compound (3) as a generic name in some cases.

The compound (4) has a liquid crystal skeleton and one polymerizable group. The compound has a function of increasing the tilt angle of the other molecule and a function of decreasing the melting point.

The compounds (5-1) and (5-2) are each an amine silane coupling agent. The compounds have a function of enhancing the adhesion to the supporting substrate and a function of facilitating homeotropic alignment.

The composition of the invention may contain an other polymerizable compound that is different from the compounds (1), (2), (3-1), (3-2), (4) and (5). The composition may contain an additive, such as a surfactant, for forming a thin coated film. The composition may contain such an additive as a polymerization initiator and a photosensitizer that are suitable for polymerization. The composition may contain such an additive as an ultraviolet-ray absorbent, an antioxidant, a radical scavenger and a light stabilizer for improving the characteristics of the polymer. The composition may contain an organic solvent. The organic solvent is useful for forming a coated film (paint film) having a uniform thickness.

The ratios of the components of the composition of the invention will be described.

The ratio of the component (A) is preferably from 5 to 95% by weight, more preferably from 10 to 90% by weight, and further preferably from 15 to 85% by weight, based on the total weight of the components (A) to (D).

The amount of the component (B) is preferably from 1 to 30% by weight, more preferably from 1 to 28% by weight, and further preferably from 1 to 25% by weight, based on the total weight of the components (A) to (D).

The amount of the component (C) is preferably from 0 to 47% by weight, more preferably from 0 to 45% by weight, and further preferably from 0 to 42% by weight, based on the total weight of the components (A) to (D).

The amount of the component (D) is preferably from 0 to 47% by weight, more preferably from 0 to 44% by weight, and further preferably from 0 to 42% by weight, based on the total weight of the components (A) to (D).

In the case where the composition contains the silane coupling agent, the amount of the silane coupling agent is preferably from 0.01 to 0.15, and more preferably from 0.03 to 0.10, in terms of a weight ratio based on the total weight of the components (A) to (D).

In the case where the composition contains a nonionic surfactant, the amount of the nonionic surfactant is preferably from 0.0001 to 0.03 in terms of a weight ratio based on the total weight of the components (A) to (D).

In the case where the composition contains other polymerizable compounds, the amount of the compounds is preferably from 0.01 to 0.20, and more preferably from 0.03 to 0.10, in terms of a weight ratio based on the total weight of the components (A) to (D). In the case where such an additive as a polymerization initiator is used, the amount thereof may be a minimum amount that achieves the function intended by the additive.

The combinations of the components constituting the composition of the invention will be described.

In the case where homogeneous alignment is to be produced, a combination of the component (A), the component (B) and the component (C) is preferred. In the case where the alignment homogeneity is to be controlled, a nonionic surfactant may be used in combination. The nonionic surfactant has a function of stabilizing homogeneous alignment. In the case where homeotropic alignment is to be produced a combination of the component (A), the component (B), the component (C), the component (D) and the silane coupling agent is preferred. In the case where the coating homogeneity is to be controlled, a nonionic surfactant may be further added. These combinations may further contain other polymerizable compounds.

The synthesis methods of the compounds will be described. The compounds used in the invention can be synthesized by appropriately combining synthesis methods in organic chemistry described in: Houben-Wyle, Methoden der Organischen Chemie, Georg Thieme Valag, Stuttgart; Organic Reactions, John Wily & Sons, Inc.; Organic Syntheses, John Wily & Sons, Inc.; Comprehensive Organic Synthesis, Pergamon Press; New Experimental Chemistry-Course (Shin Jikken Kagaku Kouza), Maruzen, Inc.; and the like.

The synthesis method of the compound (1) is disclosed in WO 2008/136265.

The synthesis method of the compound (2) is disclosed in JP-A-2007-16213 and JP-A-2008-133344.

The synthesis method of the compound (3-1) is disclosed in JP-A-2003-238491. The synthesis method of the compound (3-2) is disclosed in Makromol. Chem., vol. 190, pp. 3201-3215 (1989), Makromol. Chem., vol. 190, pp. 2255-2268 (1989), WO 97/00600, JP-A-2004-231638, JP-A-2006-307150 and the like. For introducing an α-fluoroacryloyloxy group ($CH_2$=CF—COO—), α-fluoroacrylic acid or α-fluoroacrylic chloride may be used, but it is effective to use α-fluoroacrylic fluoride ($CH_2$=CF—COOF). The synthesis method of α-fluoroacrylic fluoride is disclosed in J. Org. Chem., 1989, vol. 54, p. 5640, JP-A-60-158137, JP-A-61-85345 and the like, and α-fluoroacrylic fluoride can be synthesized according to the methods disclosed therein. The compounds (3-1) and (3-2) can be synthesized by using these compounds as starting materials.

The compound (4) can be synthesized by the methods disclosed in Macromolecules, vol. 26, pp. 6132-6134 (1993), DE 19504224, WO 97/00600 and the like.

Examples of the compound (1) include the compounds shown below.

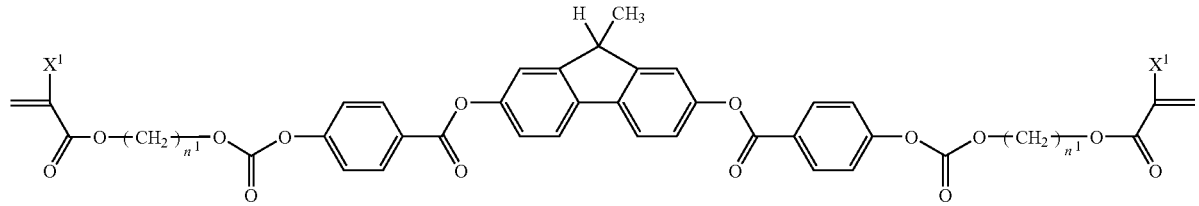

(1-1)

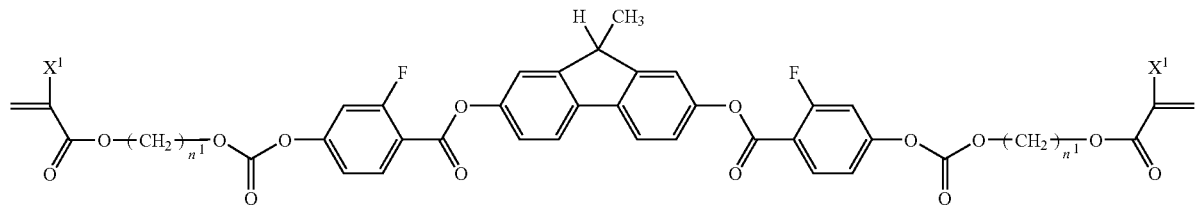

(1-2)

-continued
(1-3)
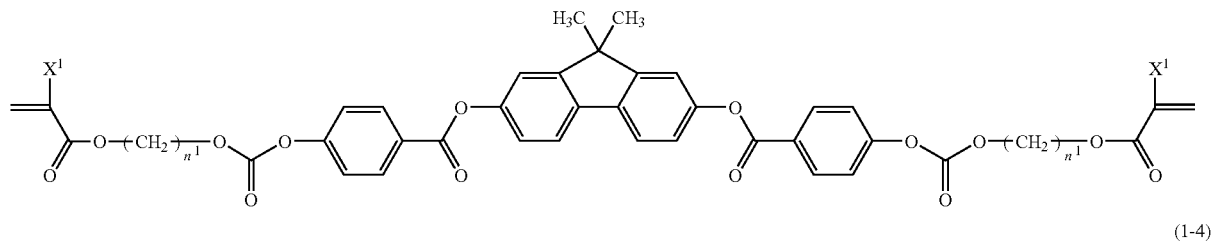
(1-4)
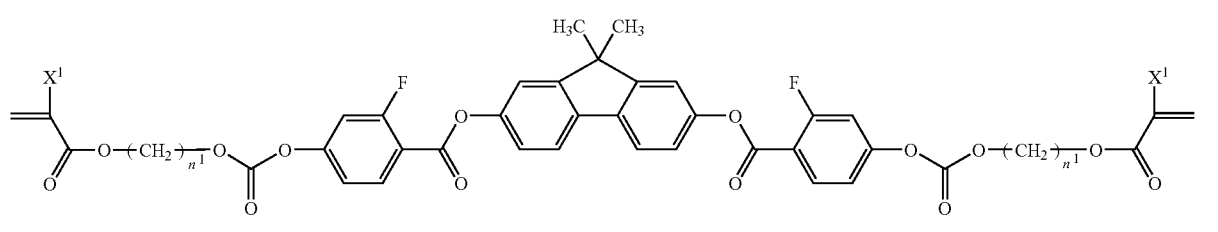
(1-5)
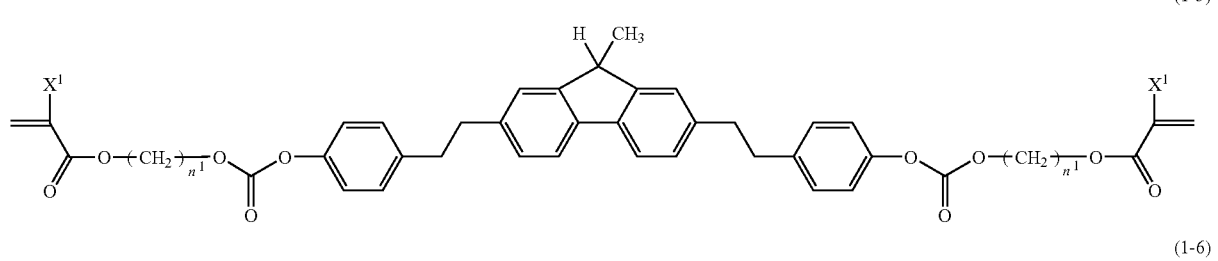
(1-6)
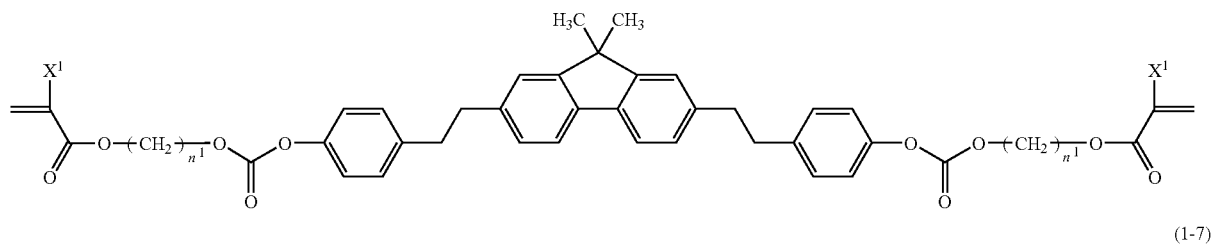
(1-7)
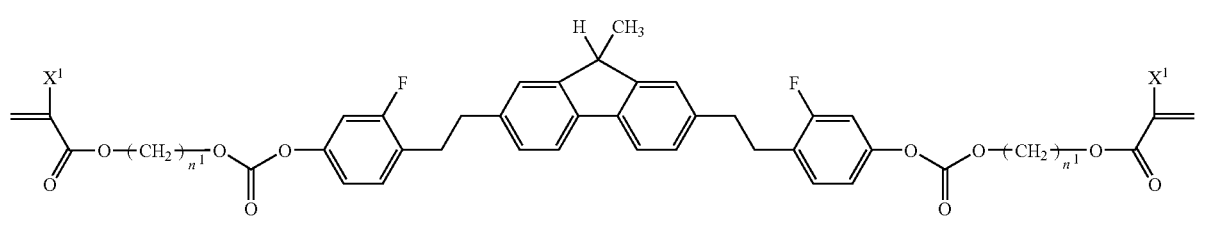
(1-8)
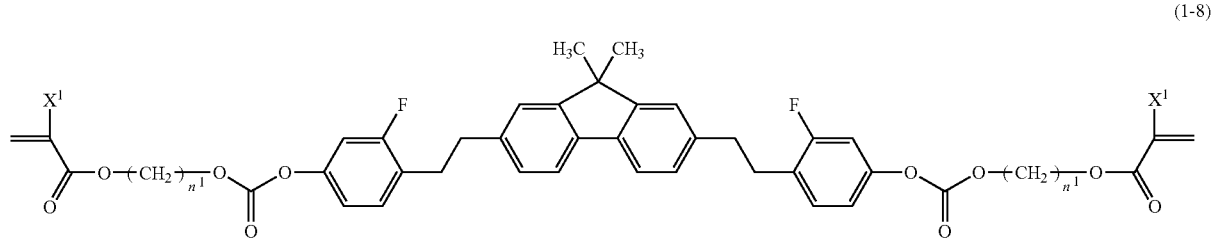
(1-9)
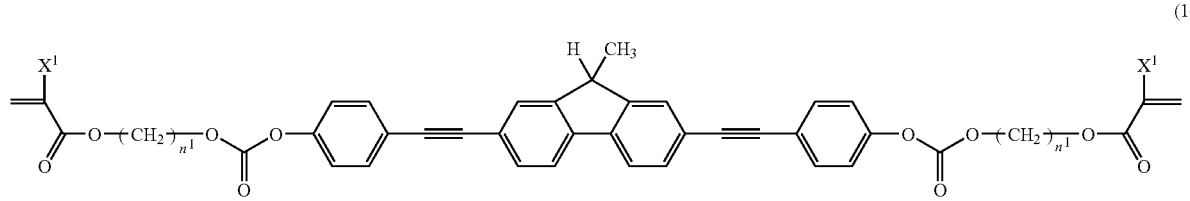

-continued
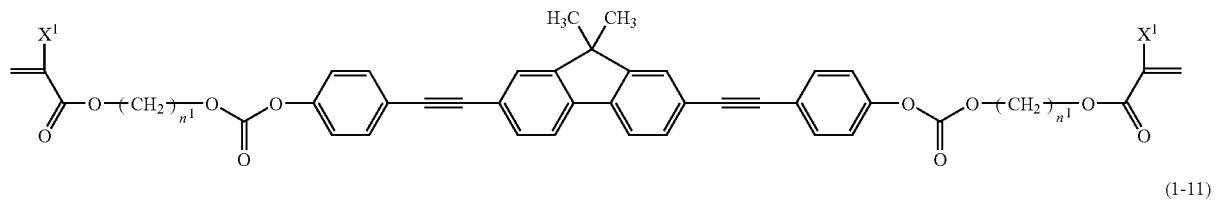
(1-10)
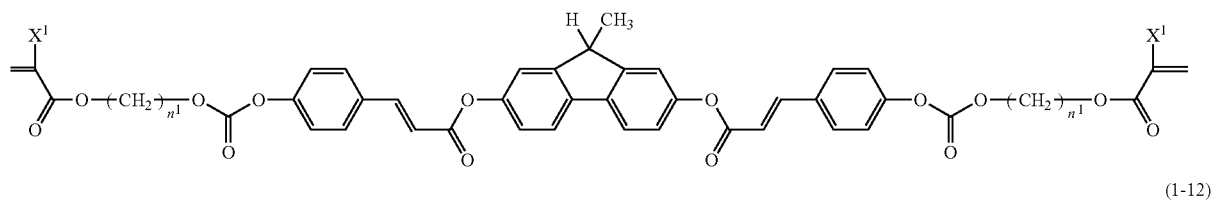
(1-11)
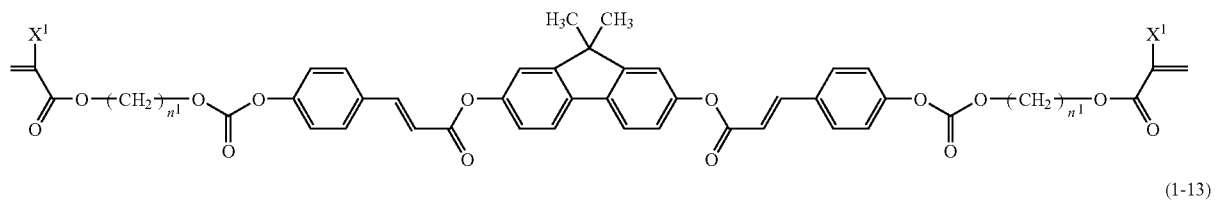
(1-12)
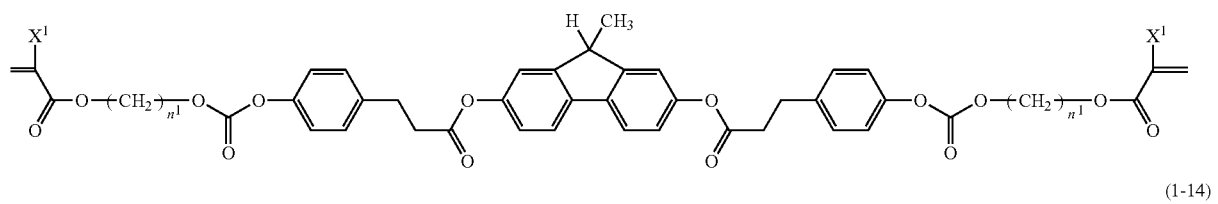
(1-13)
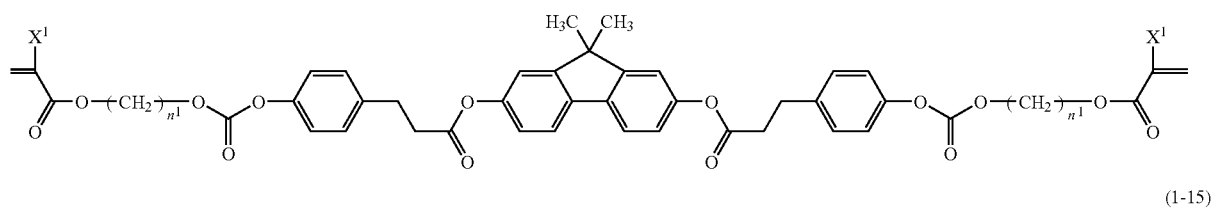
(1-14)
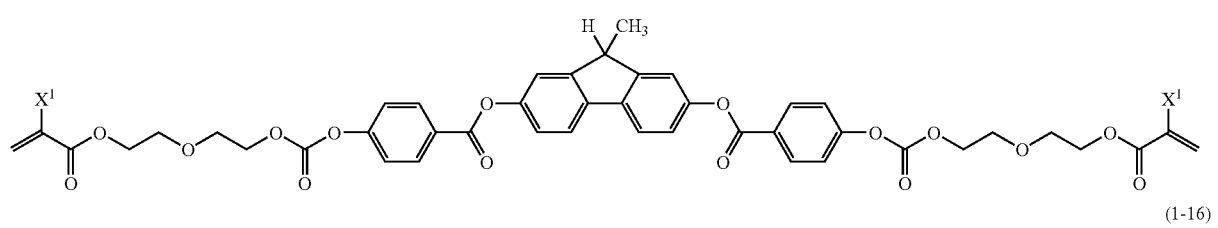
(1-15)
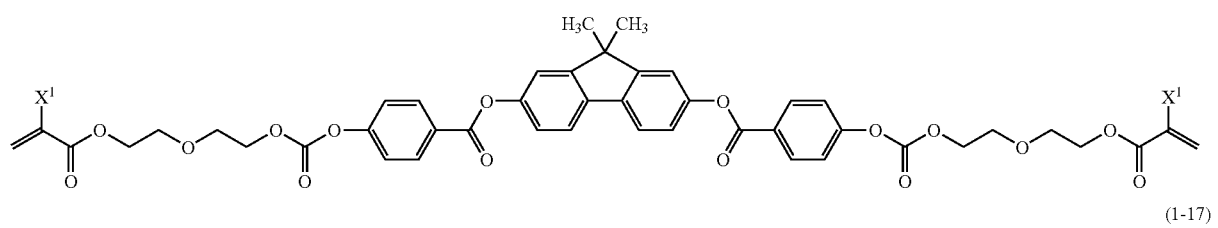
(1-16)
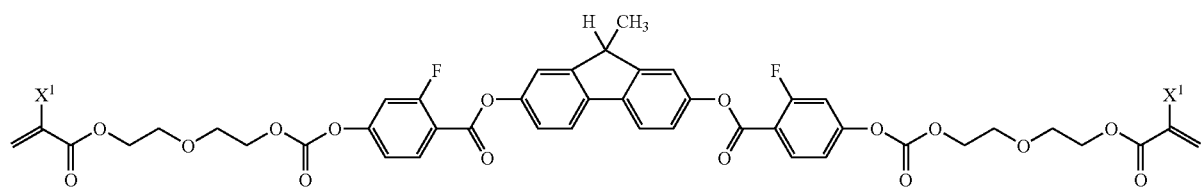
(1-17)

-continued
(1-18)
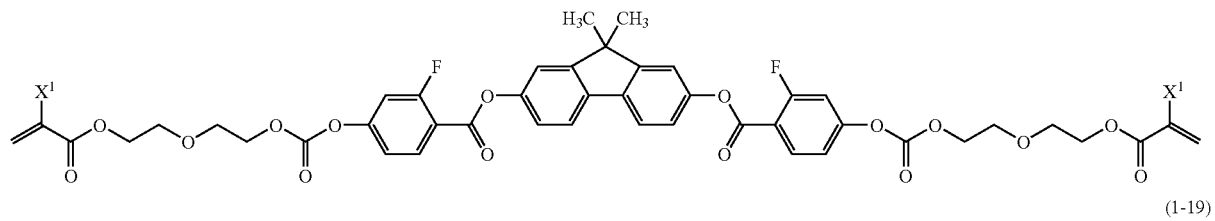
(1-19)
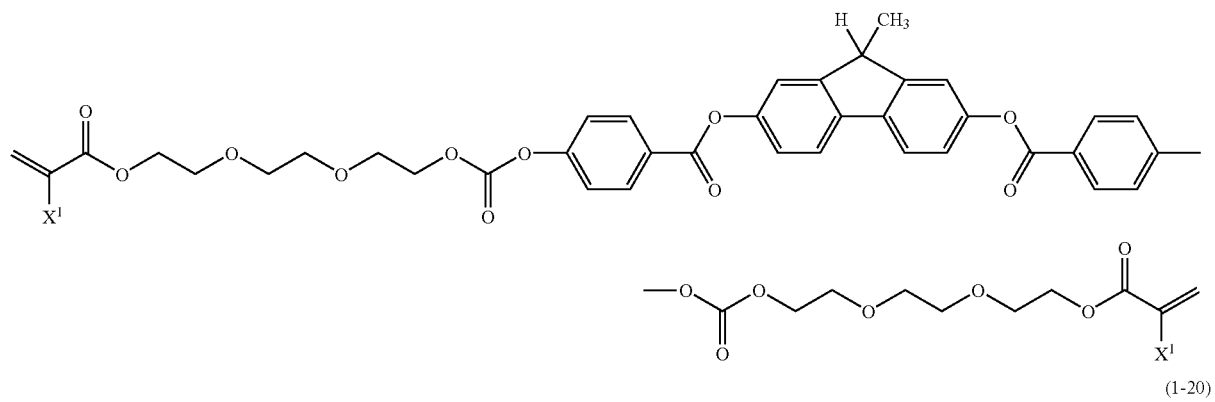
(1-20)
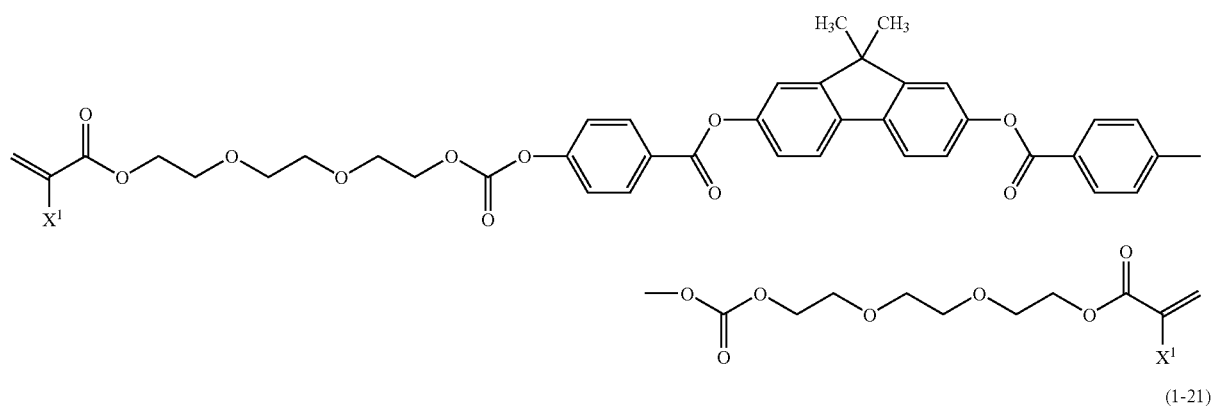
(1-21)
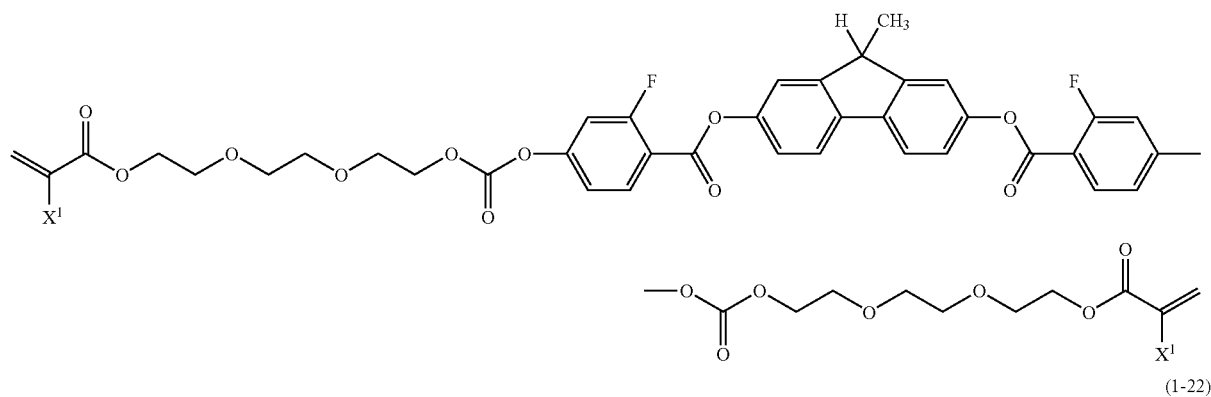
(1-22)
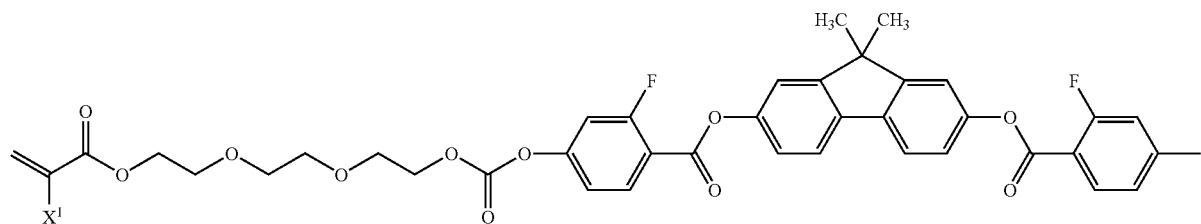

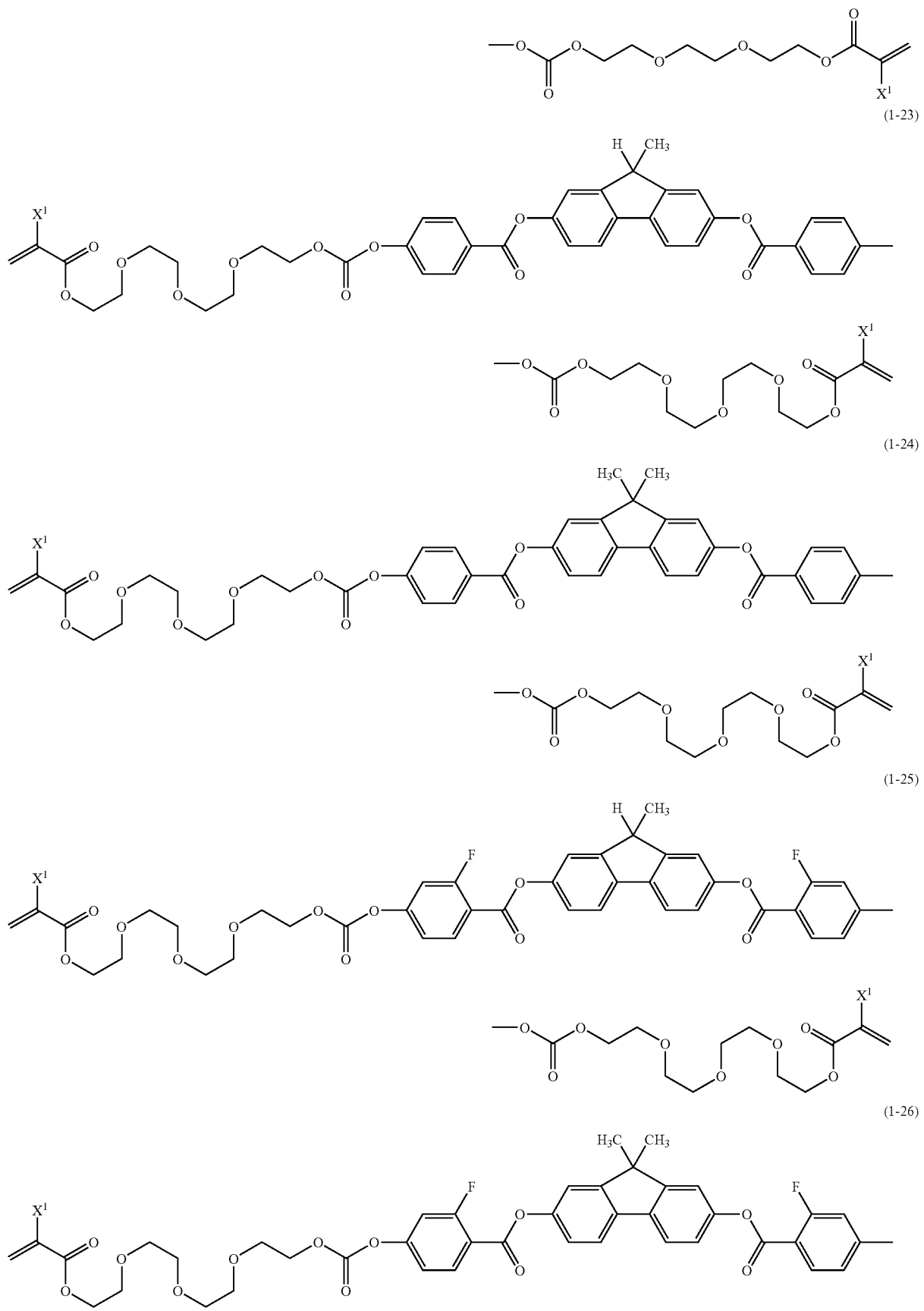

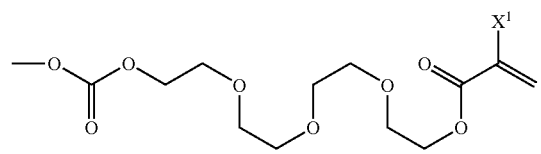
(1-27)
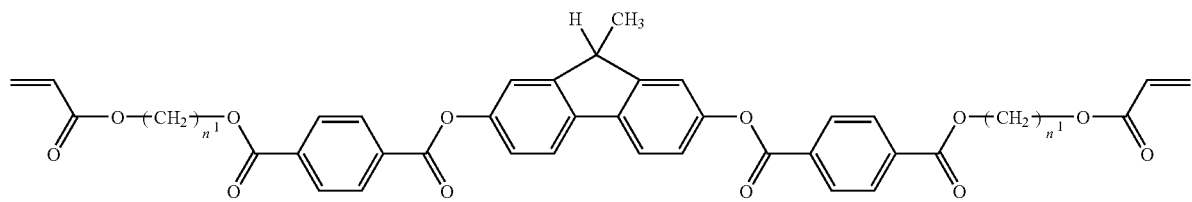
(1-28)
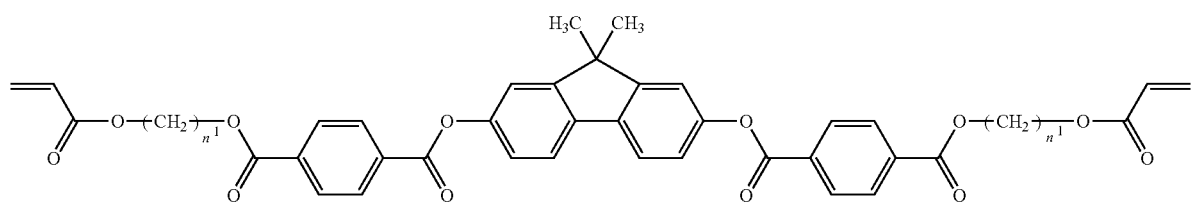
(1-29)
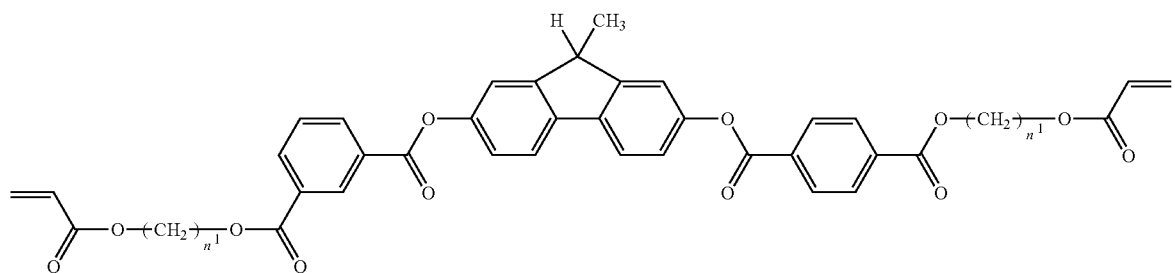
(1-30)
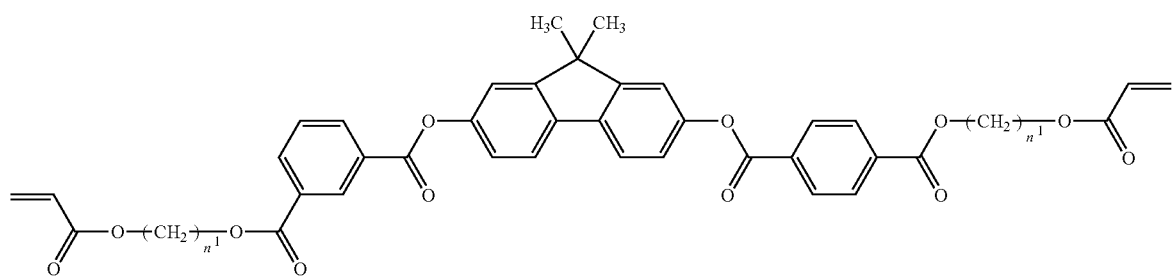
(1-31)
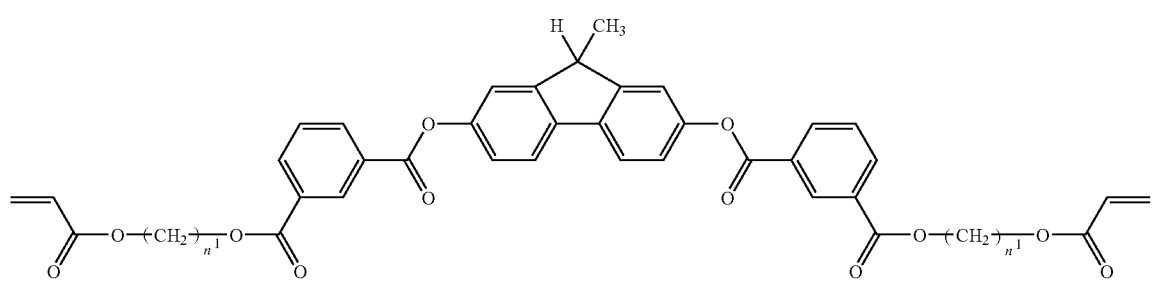

-continued
(1-32)
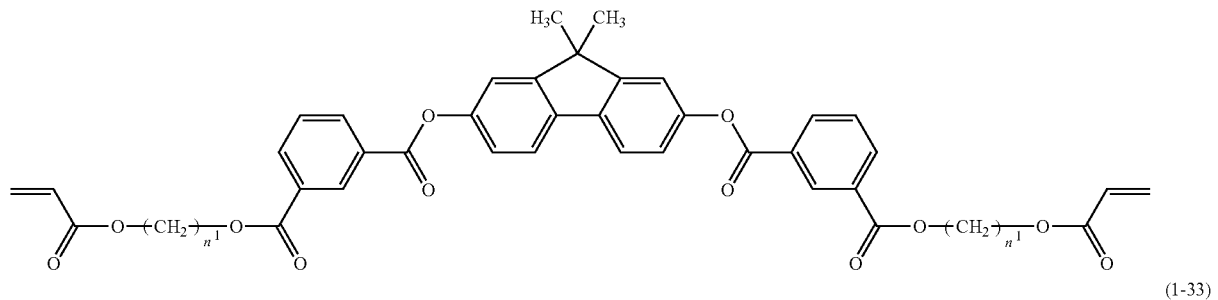
(1-33)
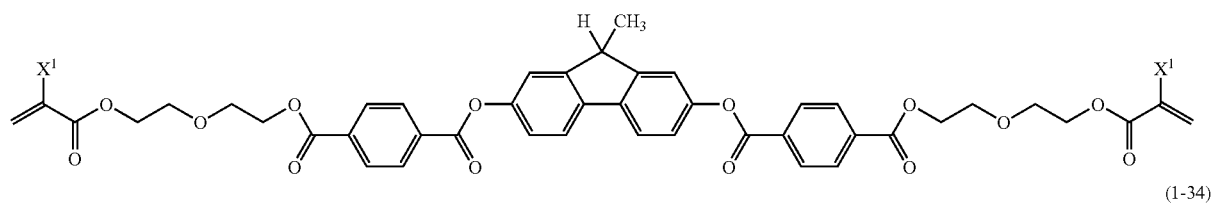
(1-34)
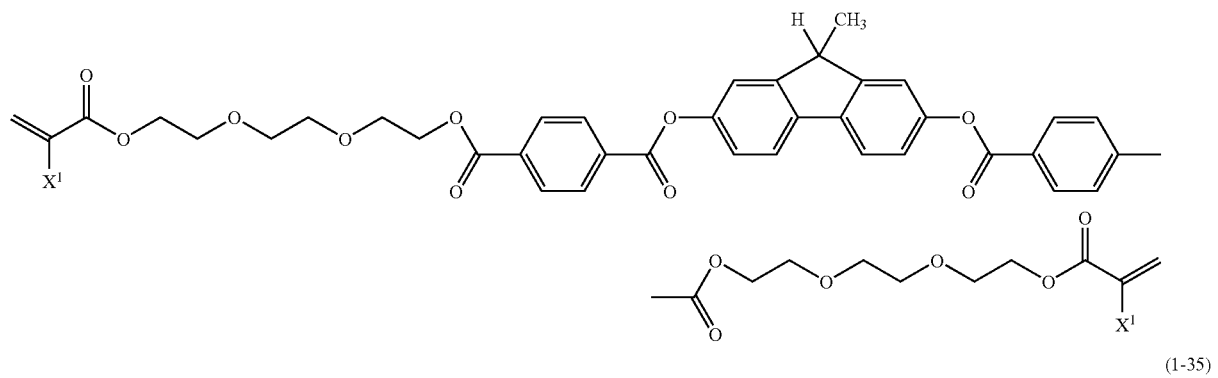
(1-35)
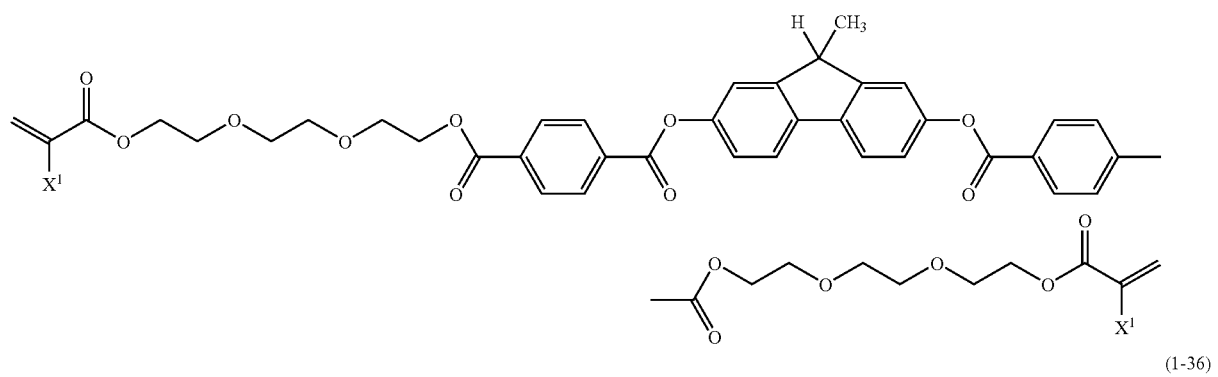
(1-36)
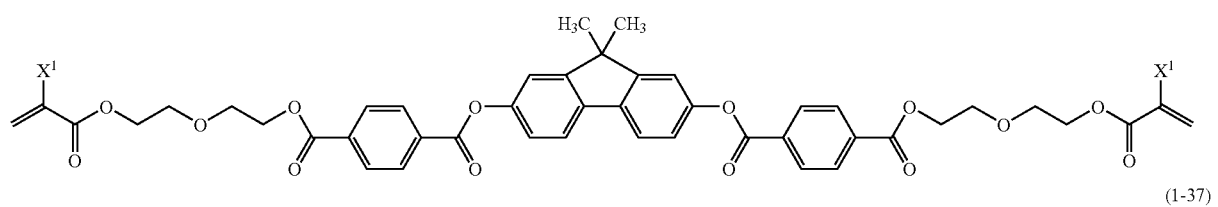
(1-37)
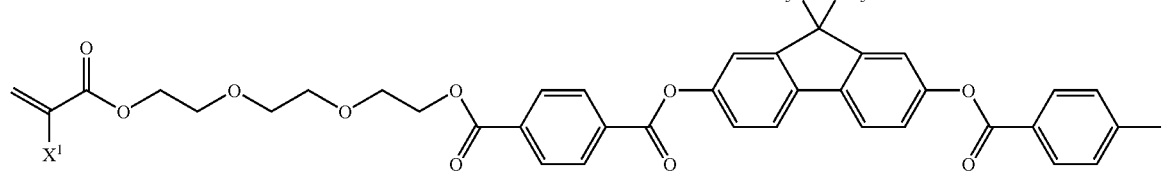

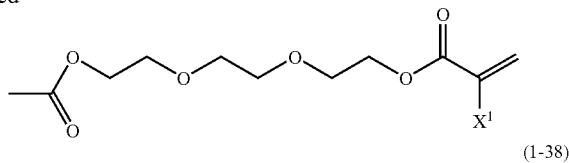
(1-38)
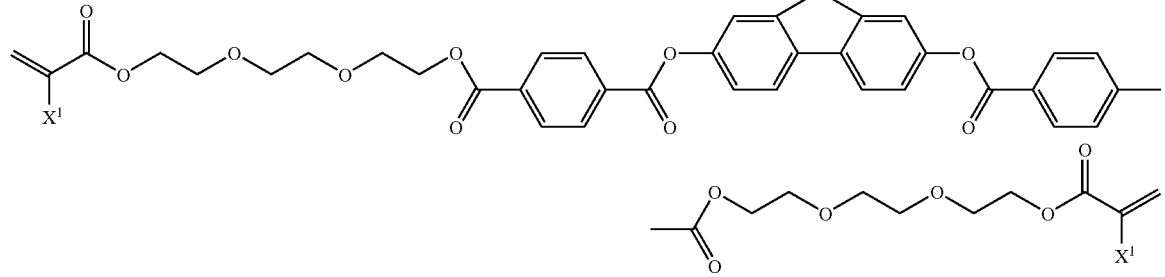
In the formulae (1-1) to (1-38), $X^1$ represents hydrogen, fluorine, chlorine, methyl or trifluoromethyl; and $n^1$ represents an integer of from 2 to 15.
Preferred examples of the compound (2) include the compounds shown below.
(2-A2-11-A)
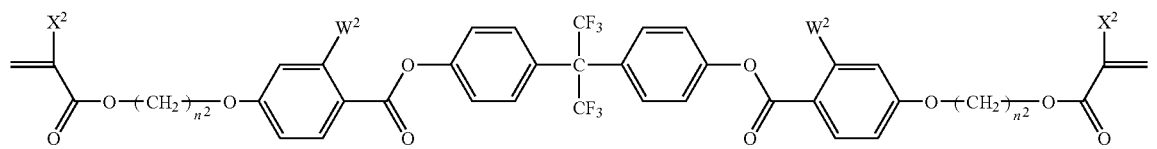
(2-A2-11-B)
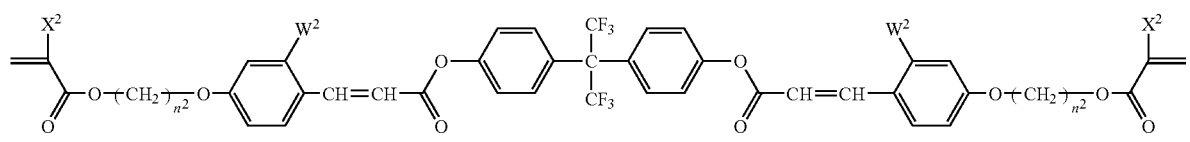
(2-A2-11-C)
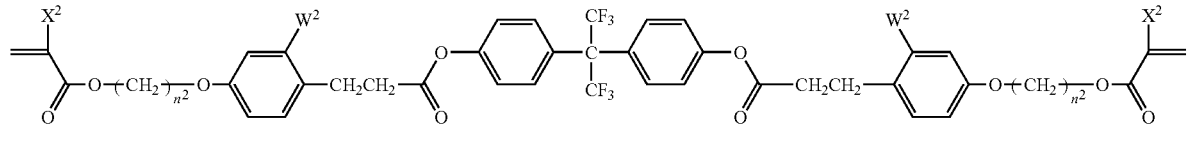
(2-A2-12-A)
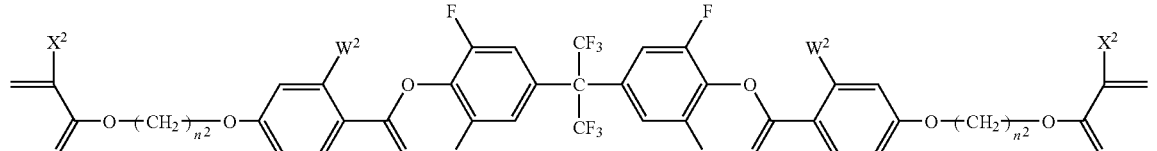
(2-A2-16-A)
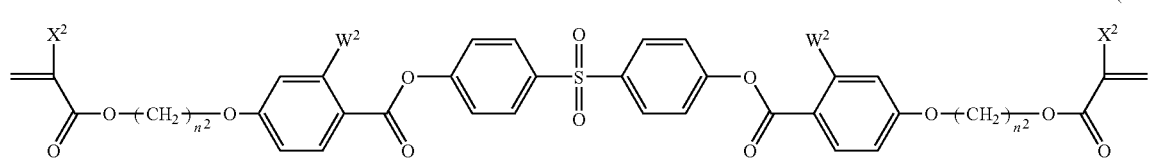

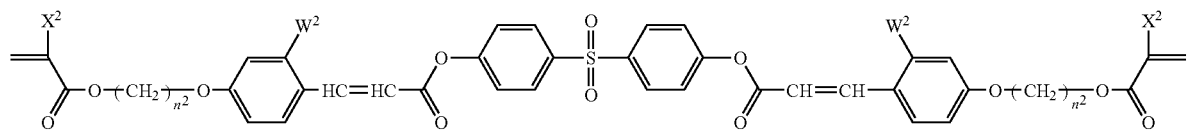

(2-A2-16-B)

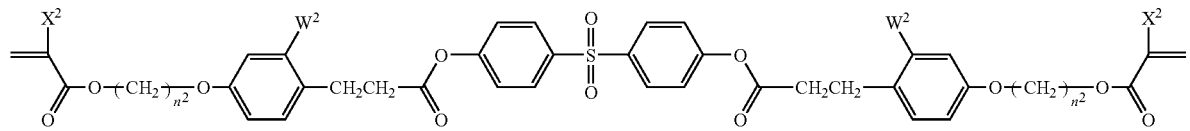

(2-A2-16-C)

In the formulae (2-A2-11-A) to (2-A2-12A) and (2-A2-16-A) to (2-A2-16-C), $X^2$ represents hydrogen, fluorine, methyl or trifluoromethyl; $W^2$ represents hydrogen or fluorine; $n^2$ represents an integer of from 2 to 15.

Preferred examples of the compound (3-1) include the compounds shown below.

In the formulae (3-1-A) to (3-1-D), $X^{31}$ represents hydrogen, fluorine, methyl or trifluoromethyl; and $n^{31}$ represents an integer of from 2 to 10.

Preferred examples of the compound (3-2) include the compounds shown below.

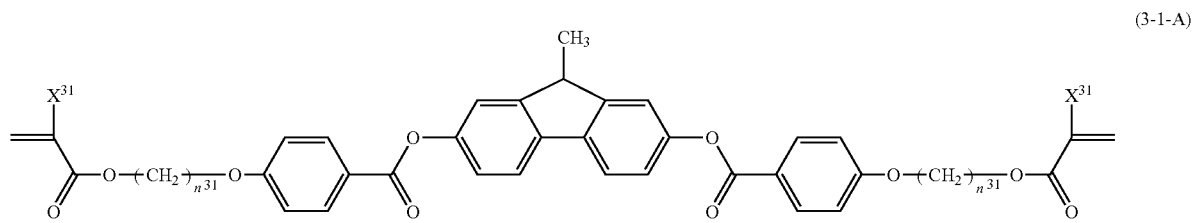

(3-1-A)

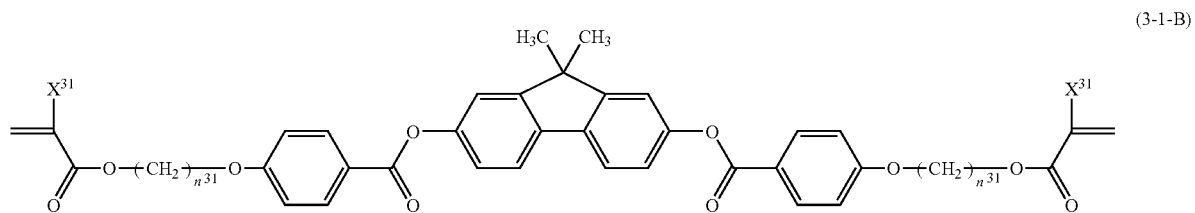

(3-1-B)

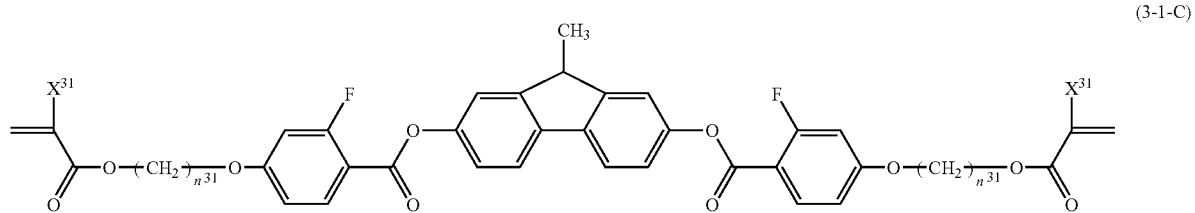

(3-1-C)

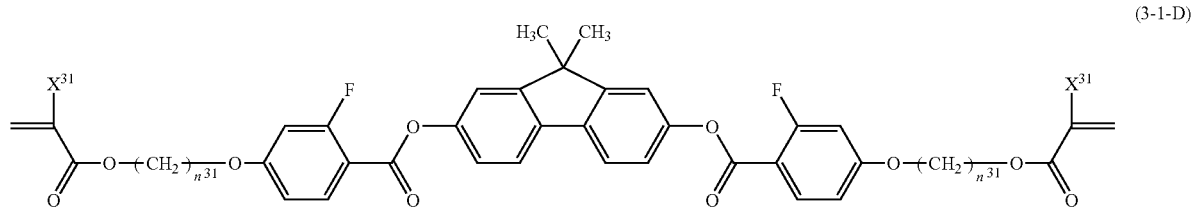

(3-1-D)

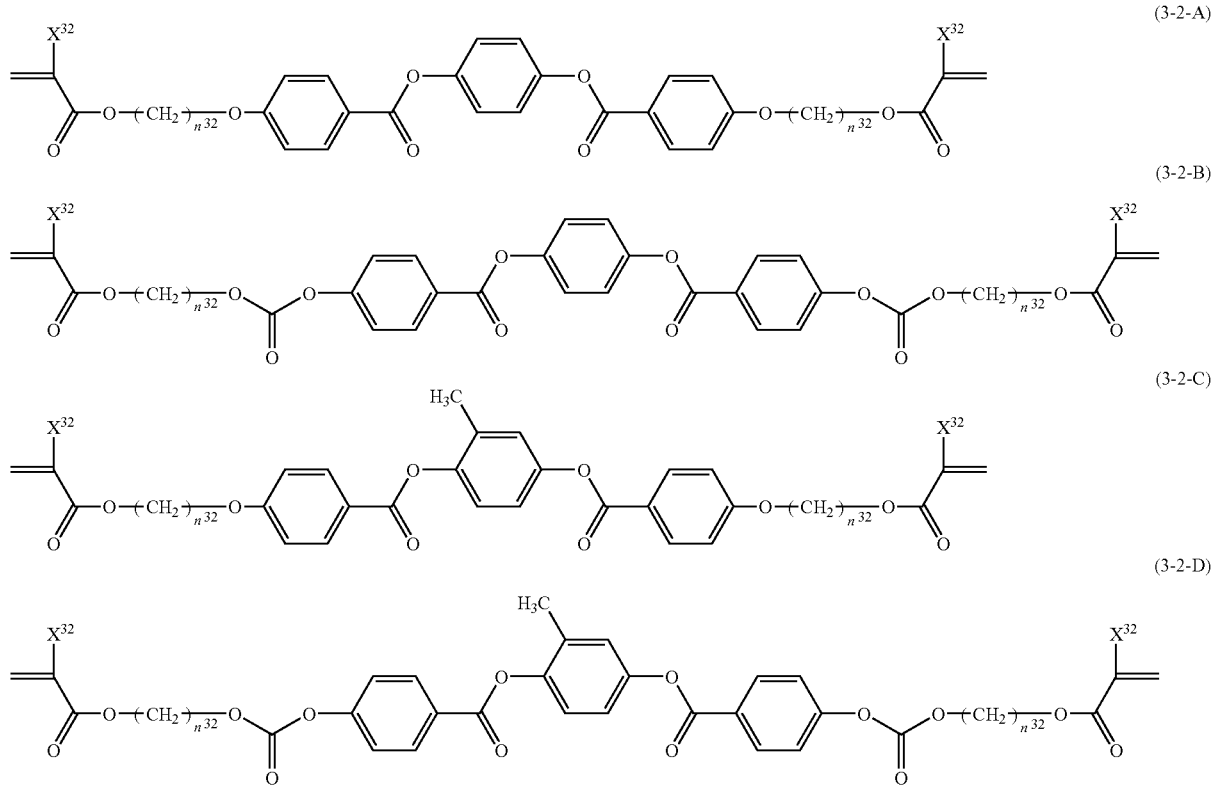

In the formulae (3-2-A) to (3-2-D), $X^{32}$ independently represents hydrogen, fluorine, methyl or trifluoromethyl; and $n^{32}$ represents an integer of from 2 to 10.

Preferred examples of the compound (4) include the compounds shown below.

(4-1-A)

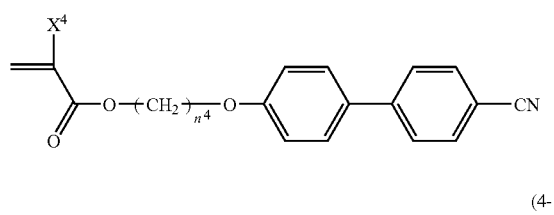

(4-1-B)

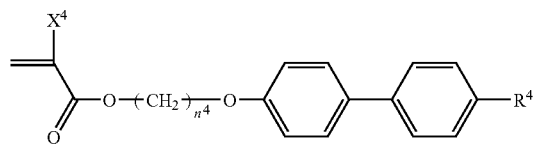

(4-1-C)

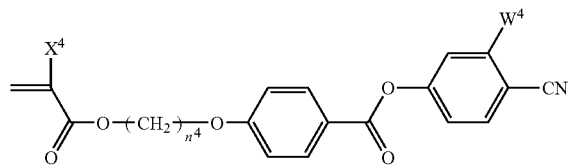

-continued (4-1-D)

(4-1-E)

(4-1-F)

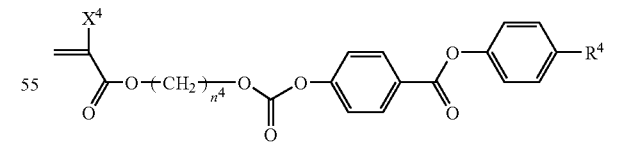

In the formulae (4-1-A) to (4-1-F), $X^4$ independently represents hydrogen, fluorine or methyl; $W^4$ represents hydrogen or fluorine; $R^4$ represents alkyl having from 1 to 10 carbon atoms, alkoxy having from 1 to 10 carbon atoms or —$OCF_3$; and $n^4$ represents an integer of from 2 to 10.

Specific examples of the compound (1), the compound (2), the compound (3), the compound (4), the compound (5-1) and the compound (5-2) include the compounds shown below.

(1-1-1)
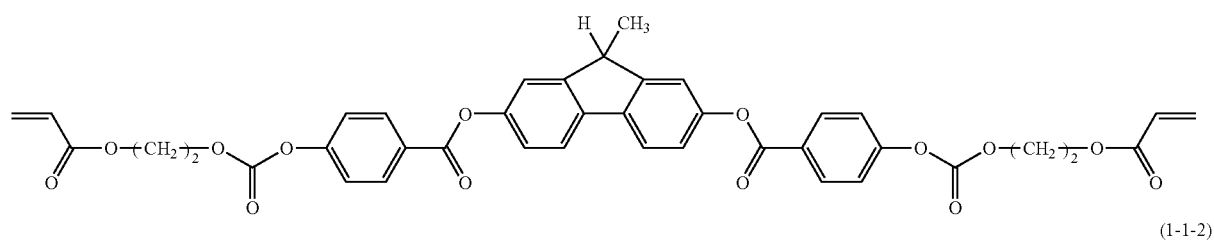
(1-1-2)
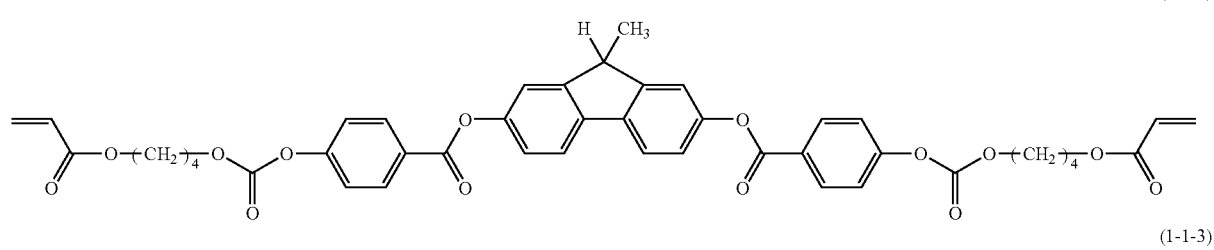
(1-1-3)
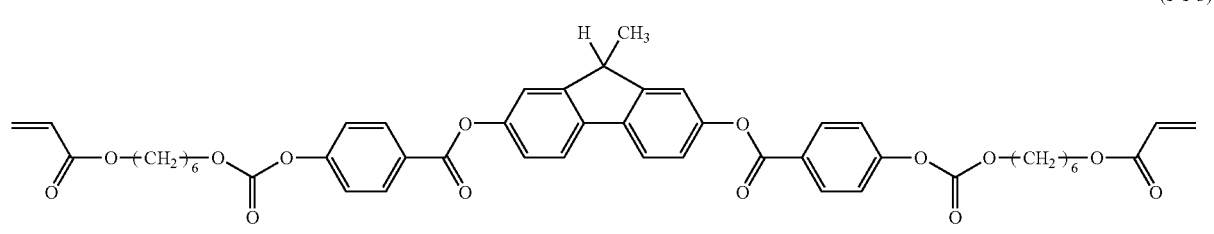
(1-1-4)
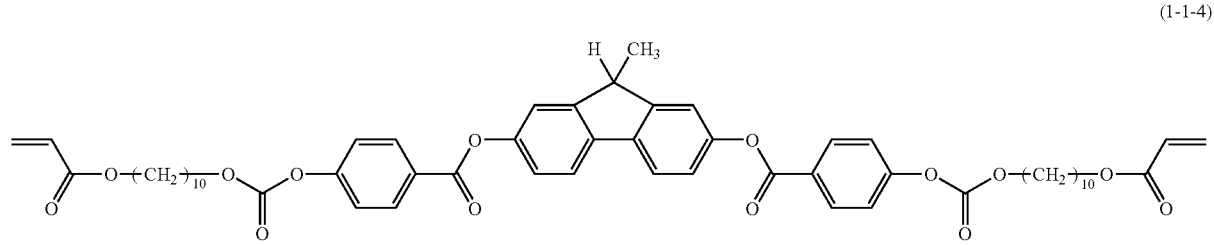
(1-1-5)
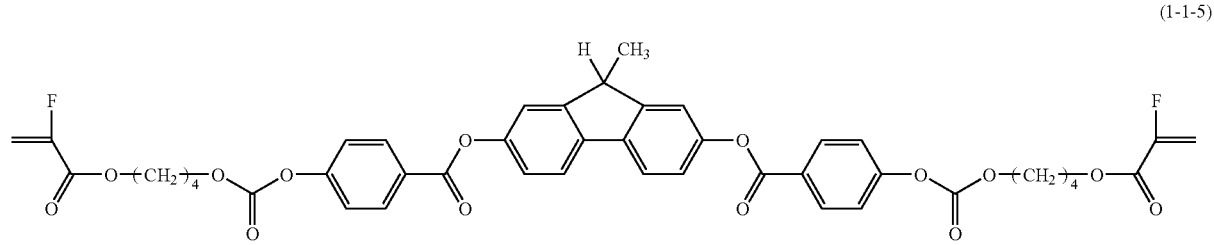
(1-1-6)
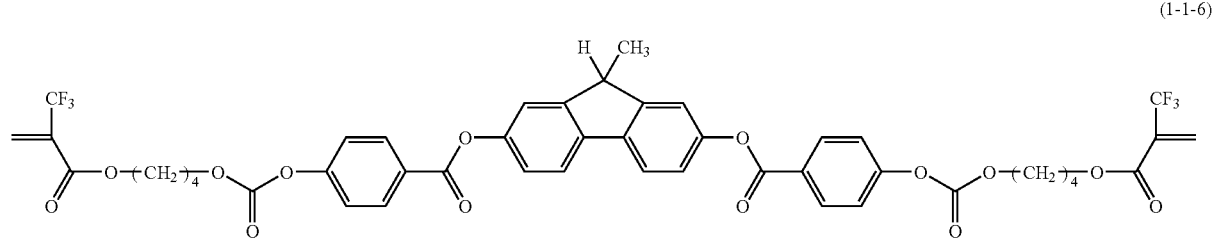
(1-1-7)
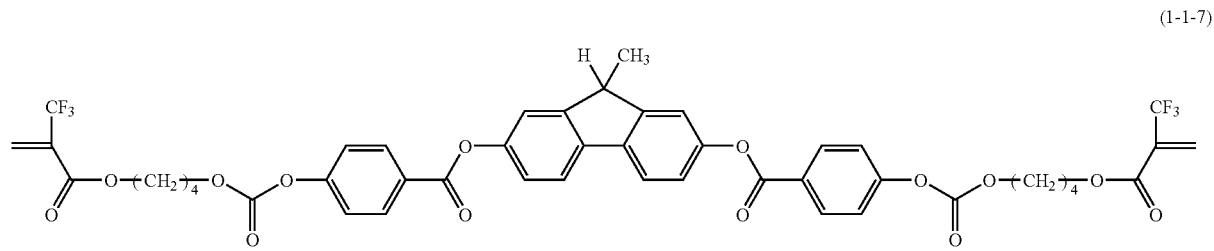

(1-2-1)
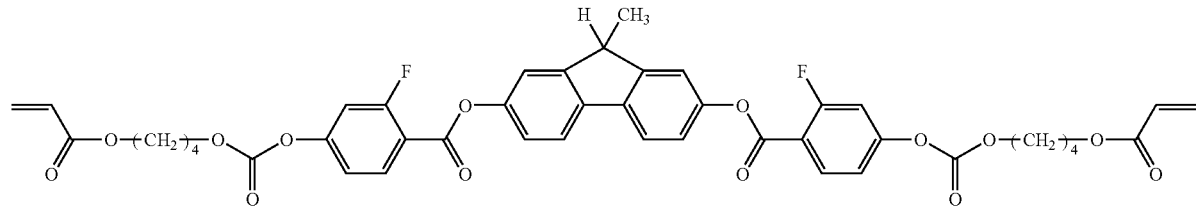
(1-2-2)
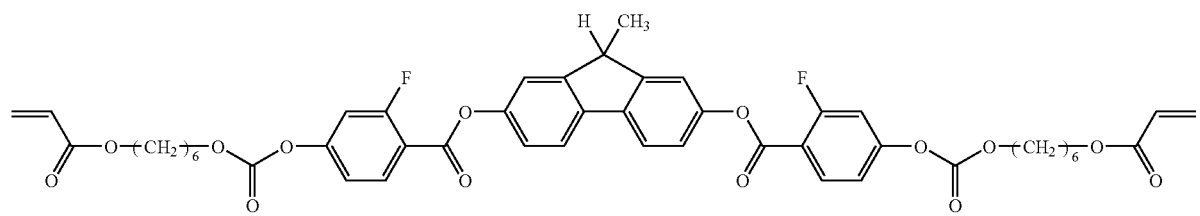
(1-3-1)
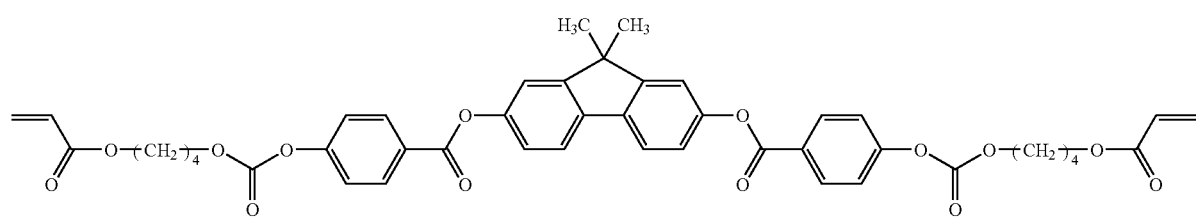
(1-3-2)
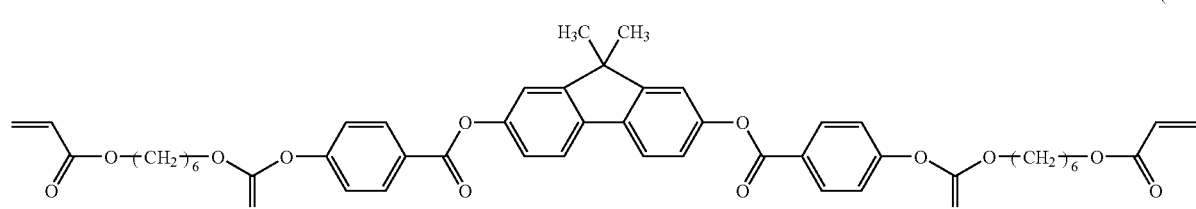
(1-4-1)
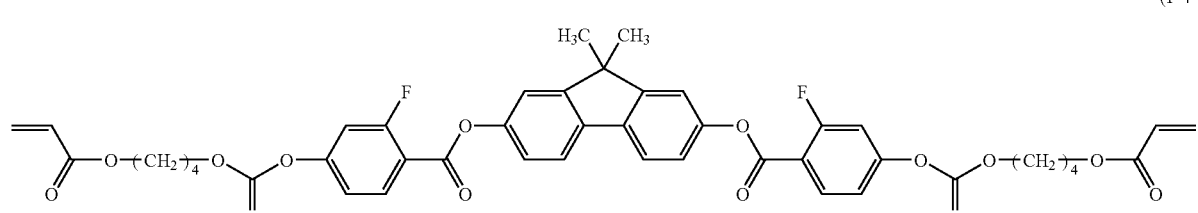
(1-4-2)
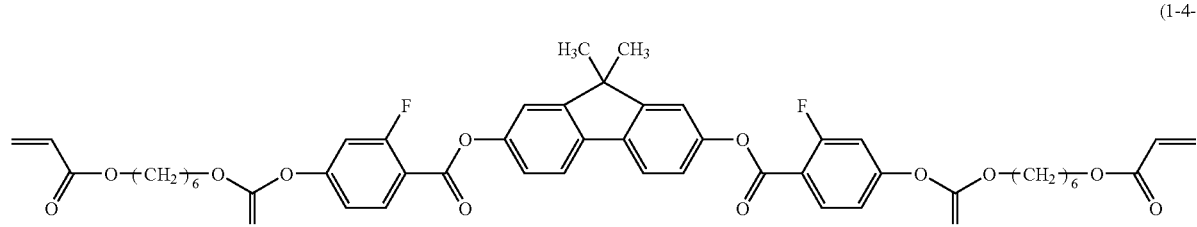
(1-9-1)
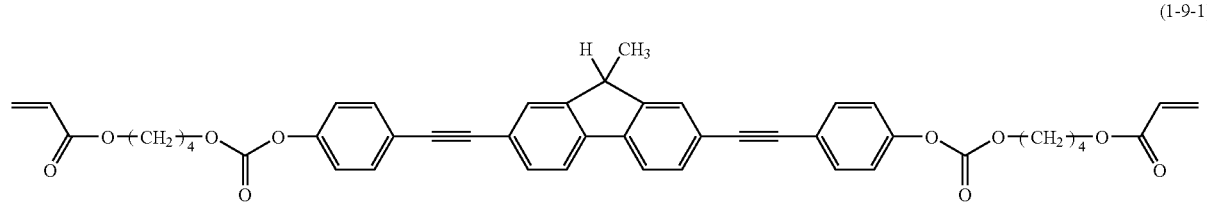

-continued
(1-9-2)
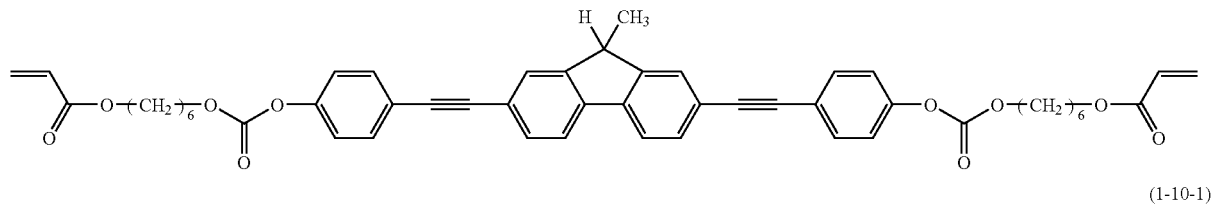
(1-10-1)
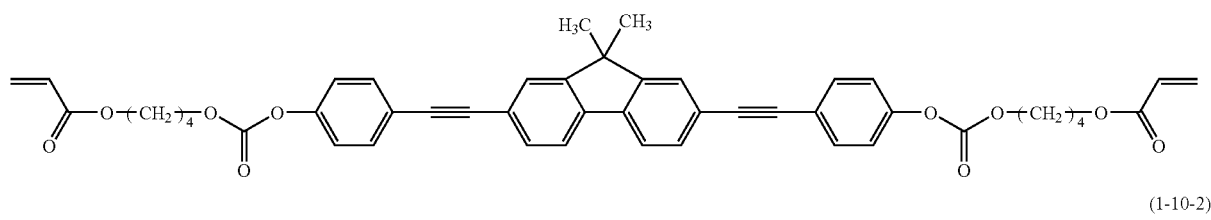
(1-10-2)
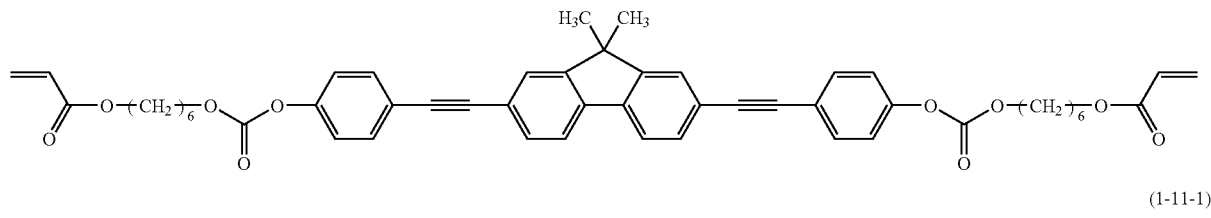
(1-11-1)
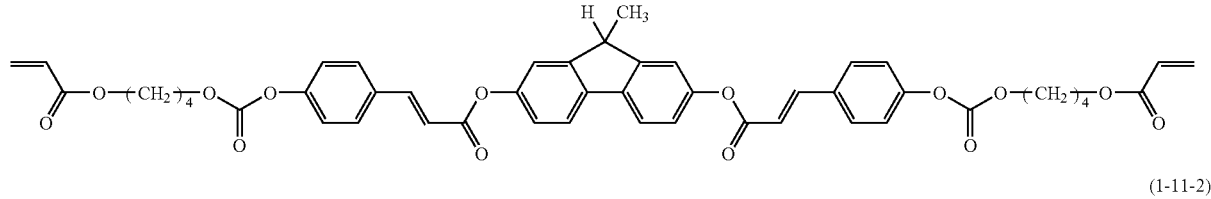
(1-11-2)
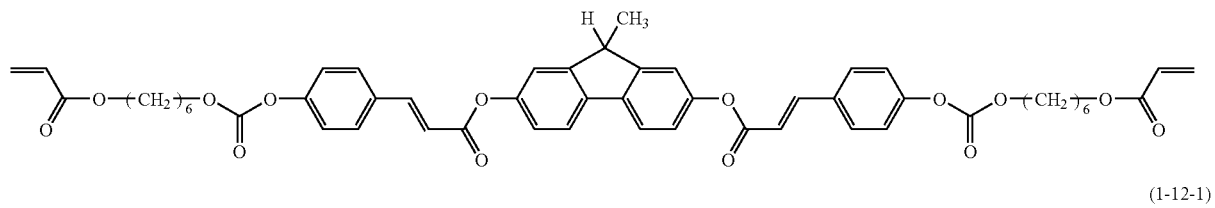
(1-12-1)
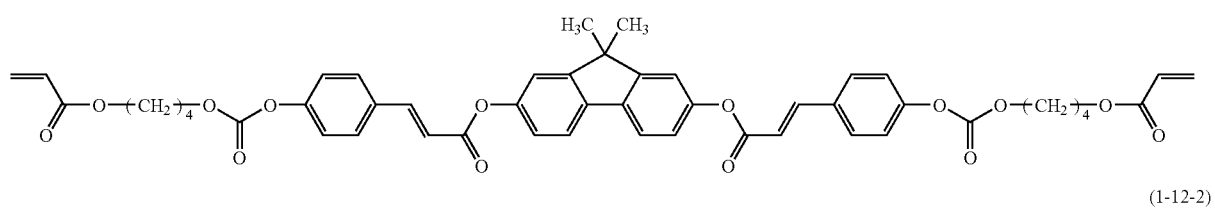
(1-12-2)
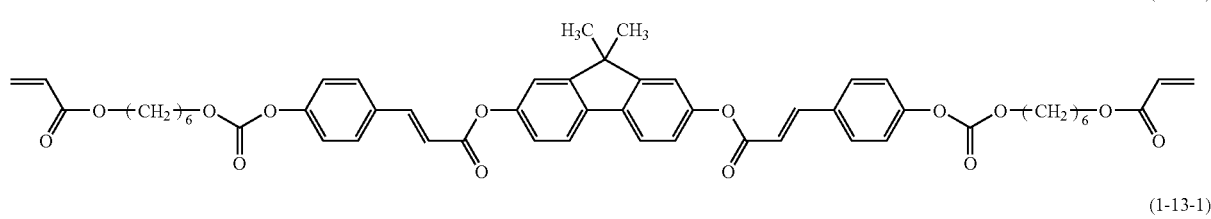
(1-13-1)
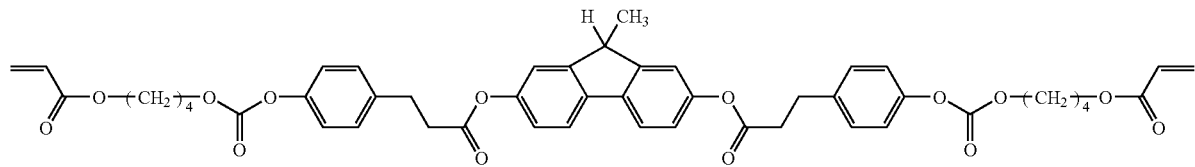

-continued
(1-13-2)
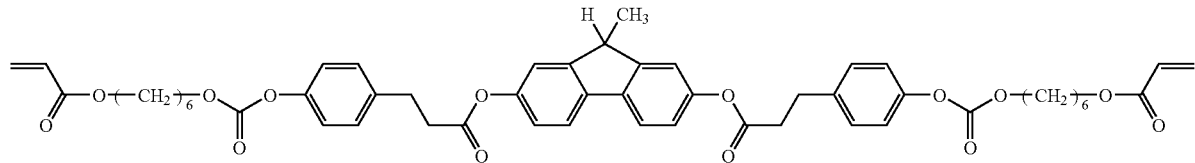
(1-14-1)
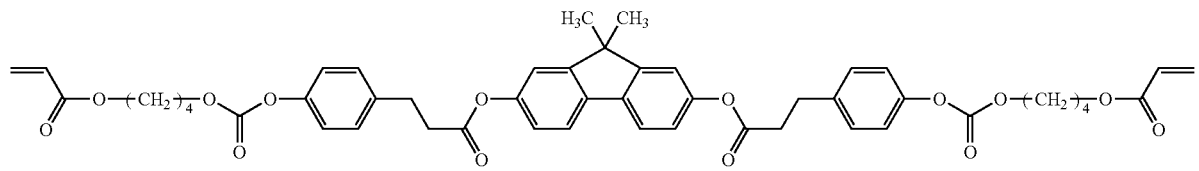
(1-14-2)
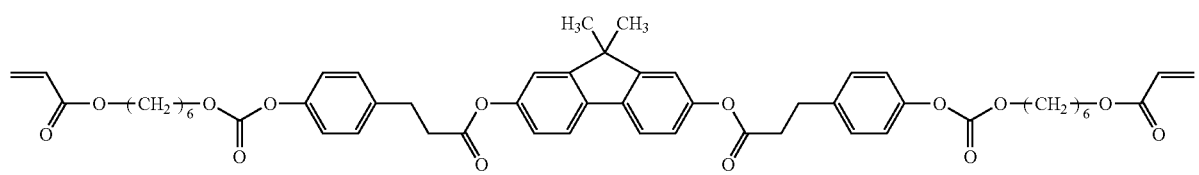
(1-15-1)
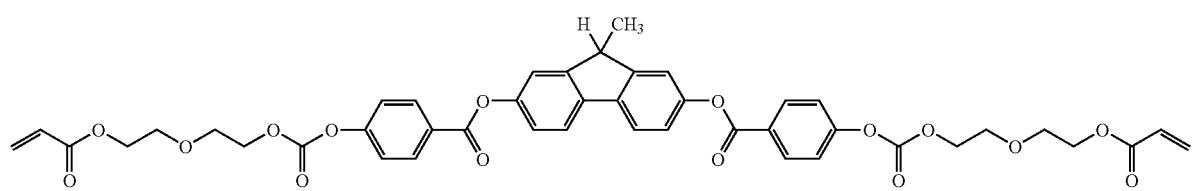
(1-16-1)
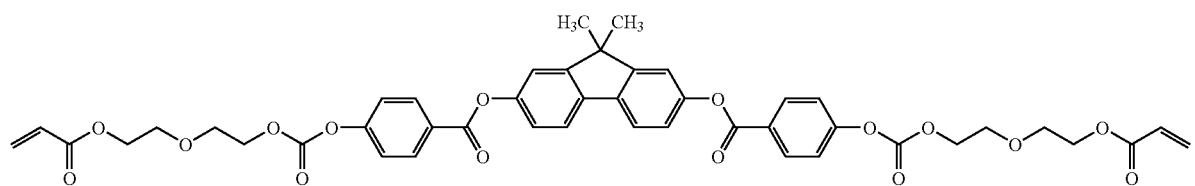
(1-17-1)
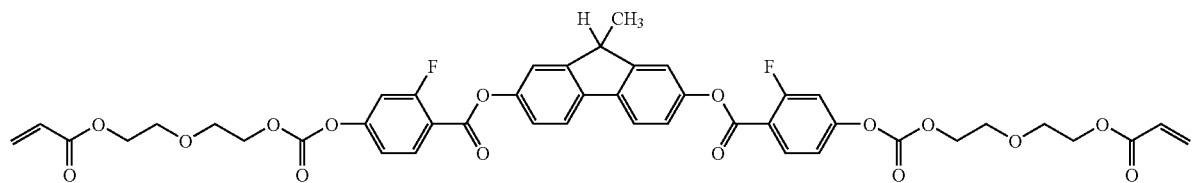
(1-18-1)
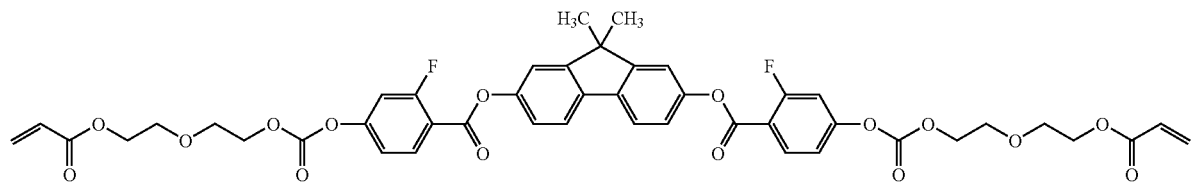

-continued
(1-19-1)
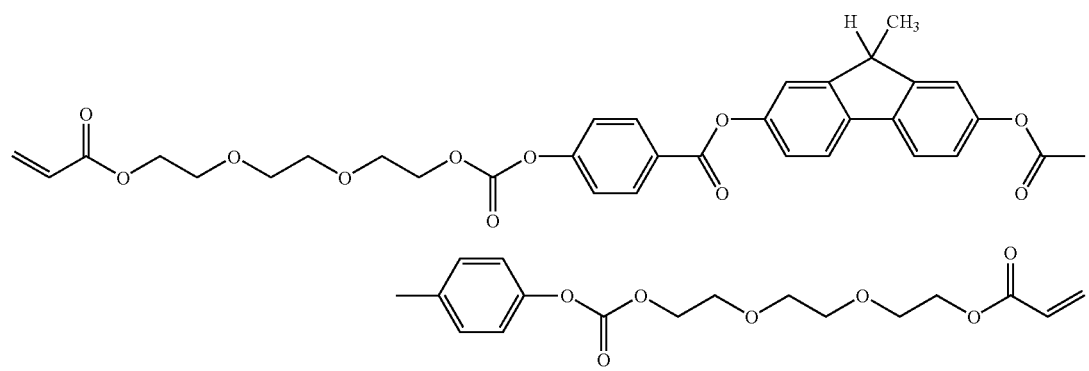
(1-20-1)
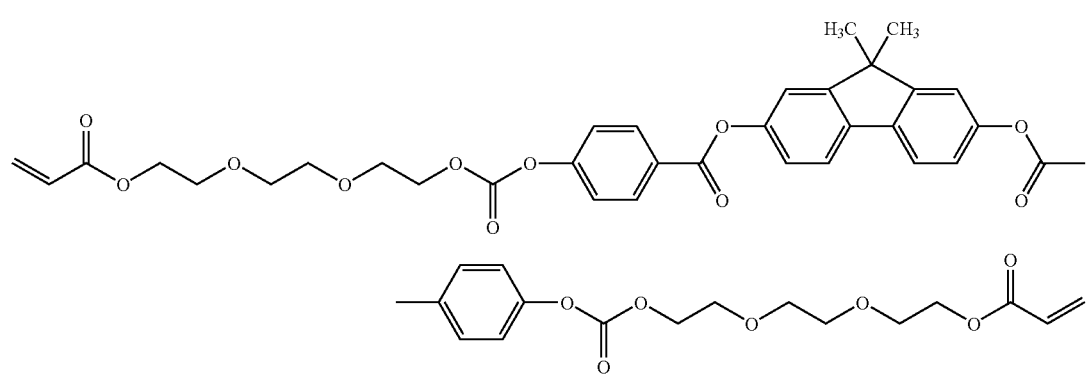
(1-21-1)
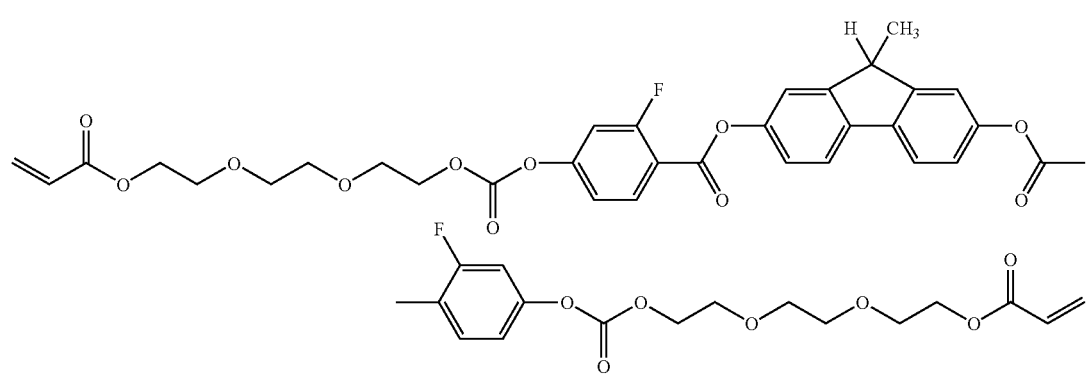
(1-22-1)
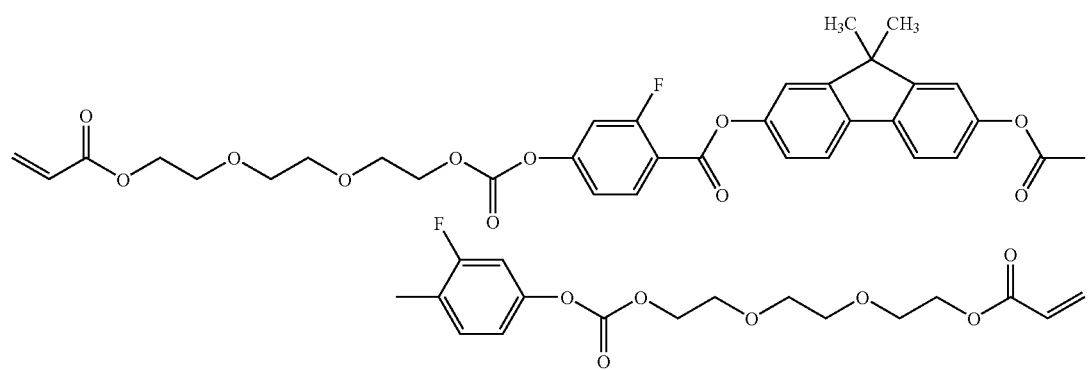

-continued
(1-23-1)
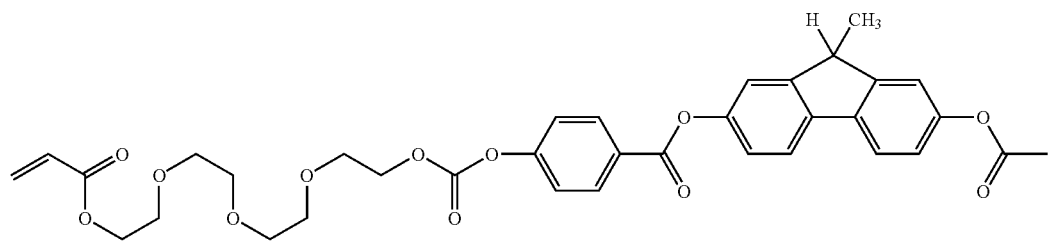
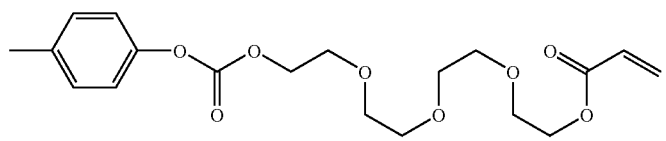
(1-24-1)
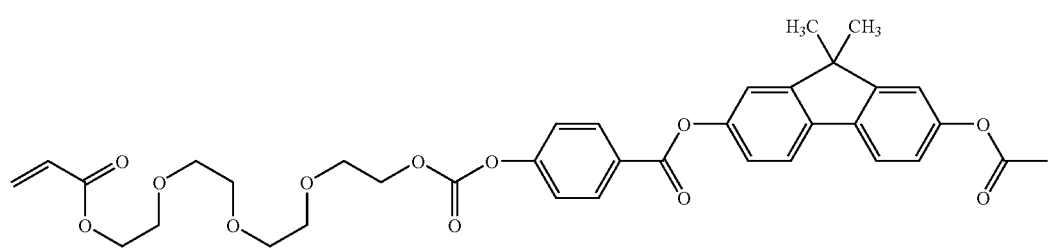
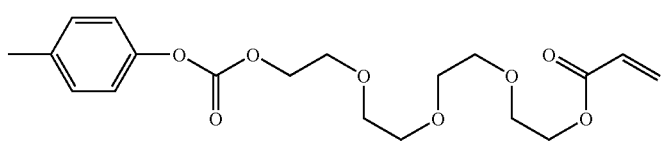
(1-25-1)
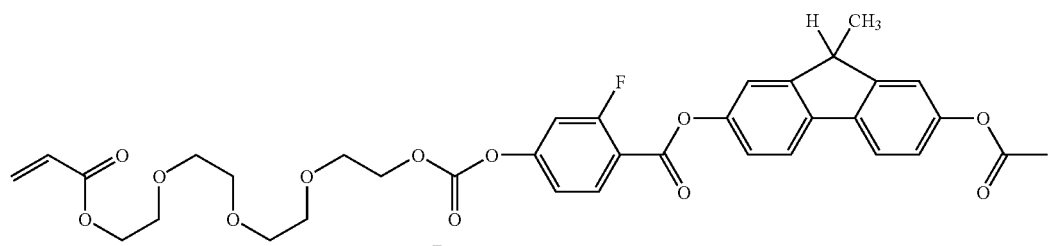
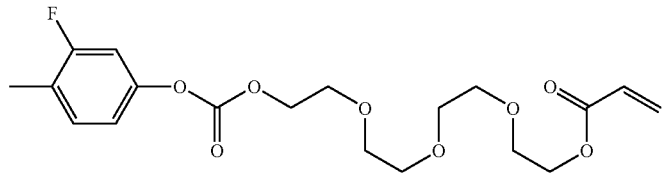
(1-26-1)
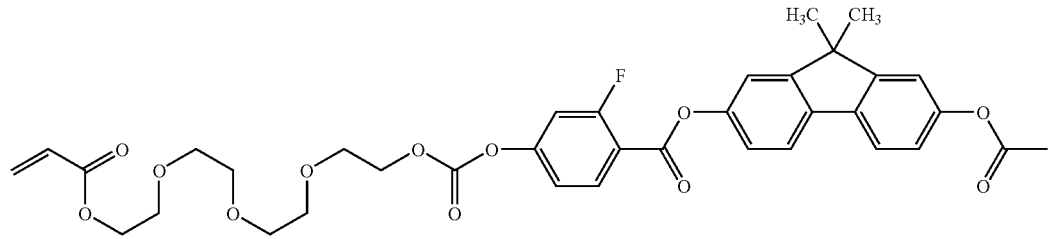
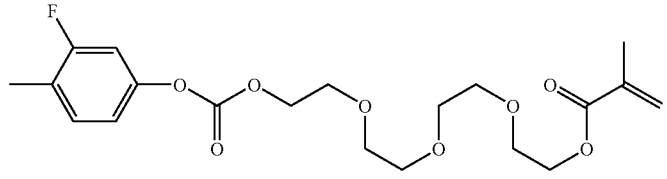

(1-27-1)
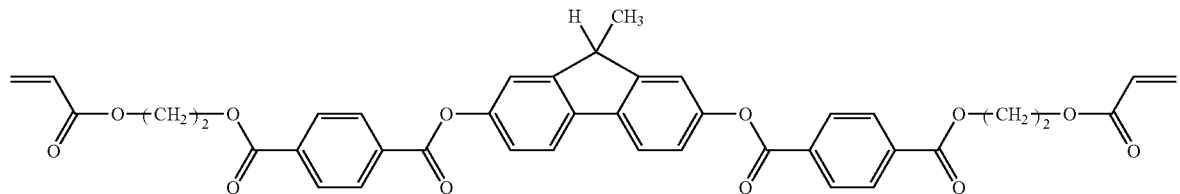
(1-27-2)
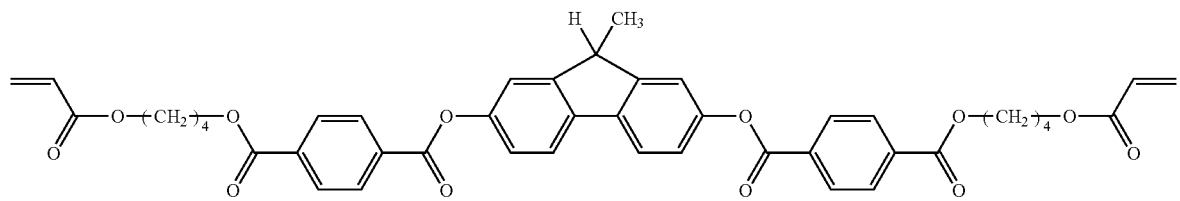
(1-27-3)
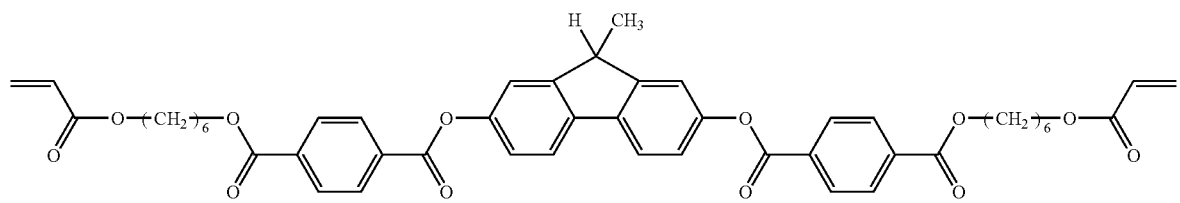
(1-27-4)
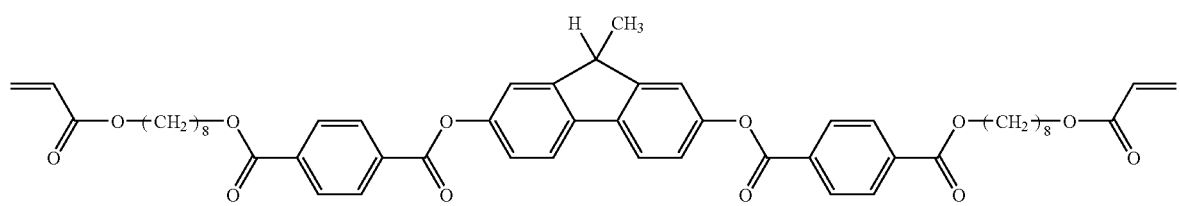
(1-28-1)
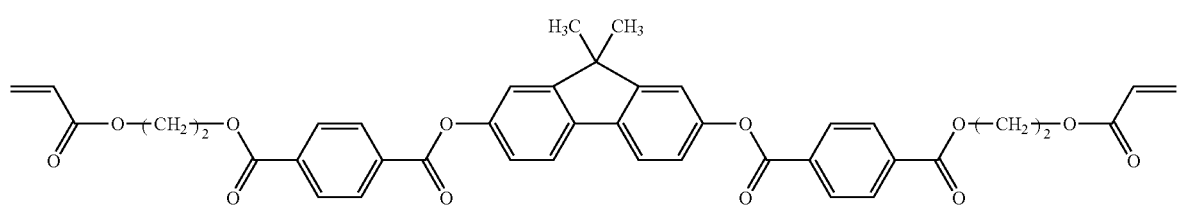
(1-28-2)
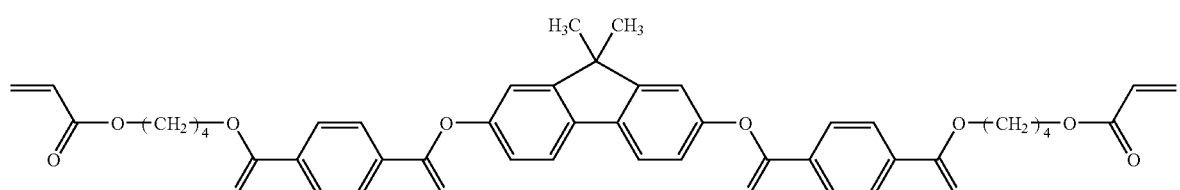
(1-28-3)
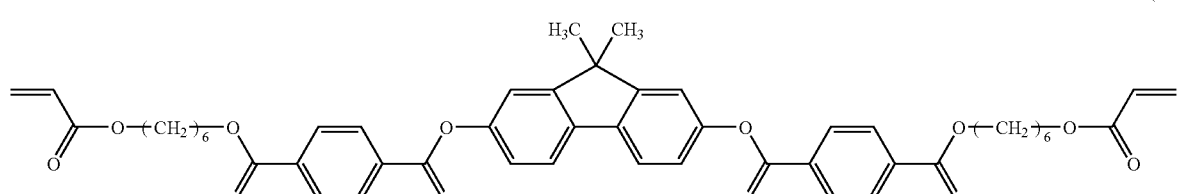

-continued
(1-28-4)
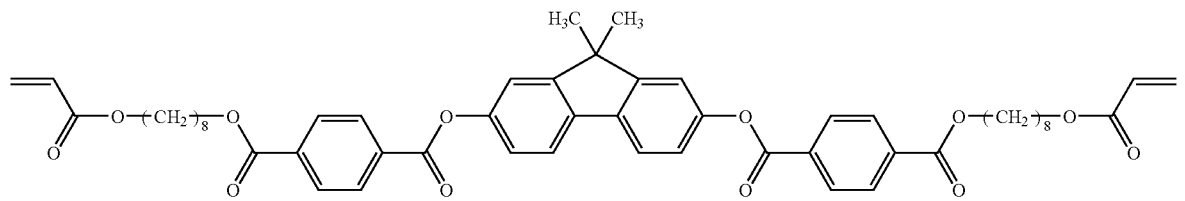
(1-29-1)
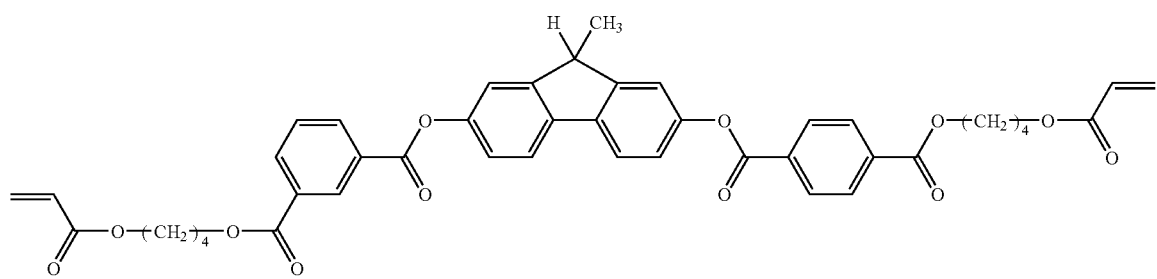
(1-30-1)
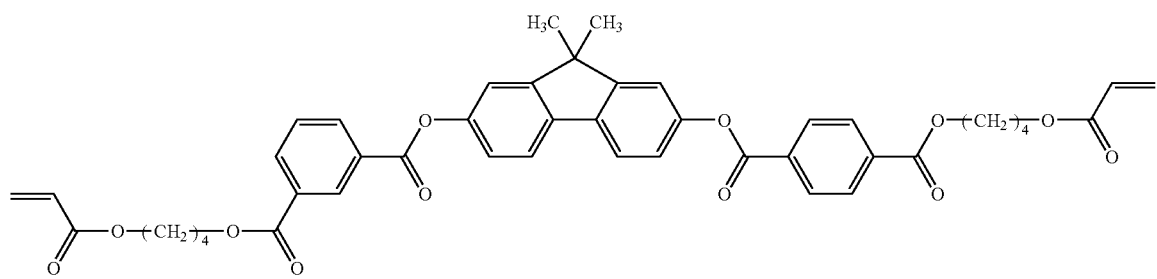
(1-31-1)
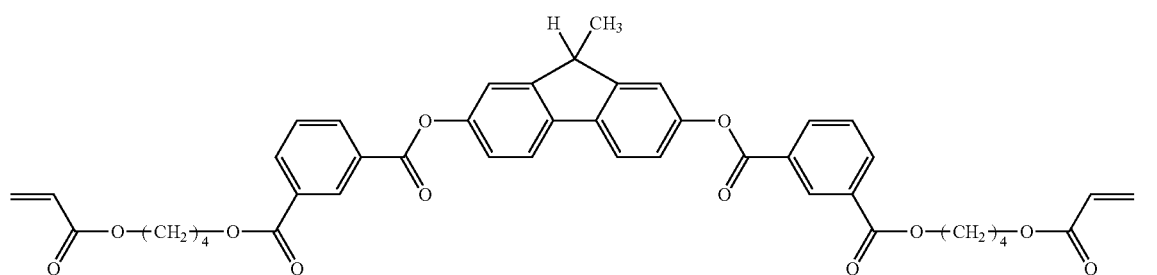
(1-32-1)
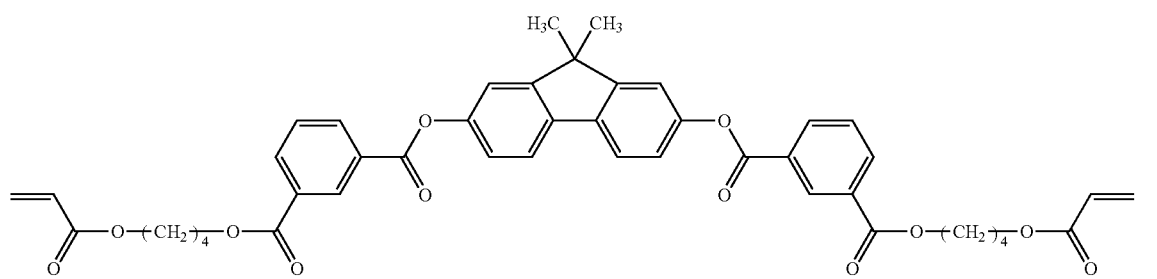
(1-33-1)
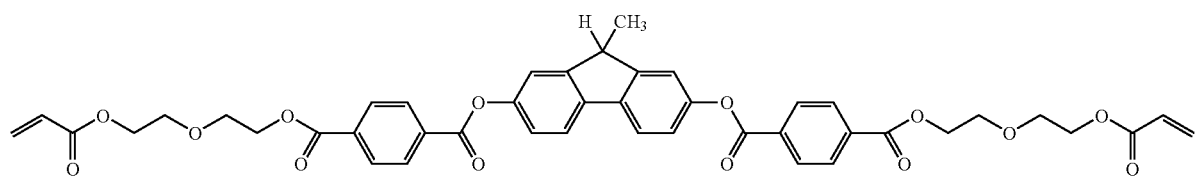

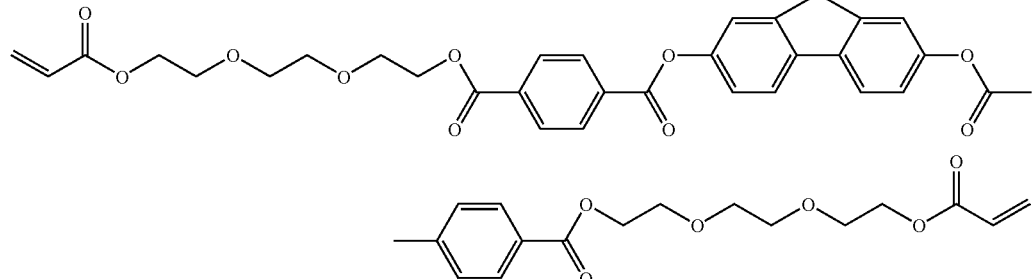
(1-34-1)
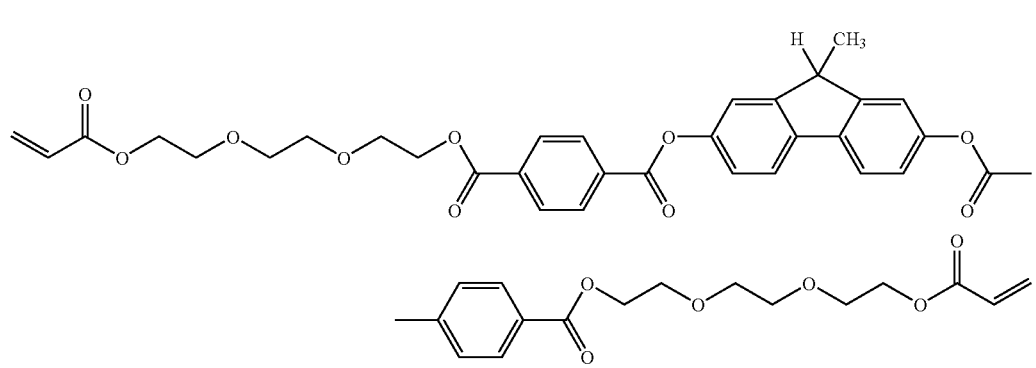
(1-35-1)
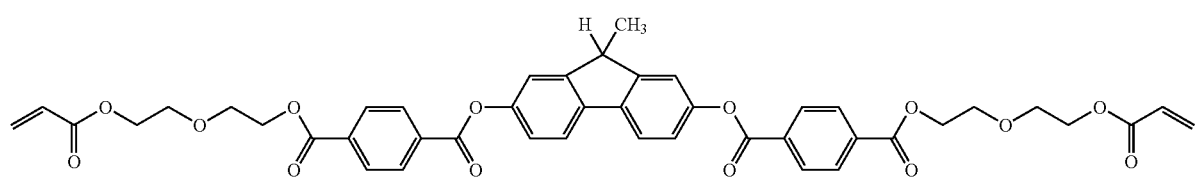
(1-36-1)
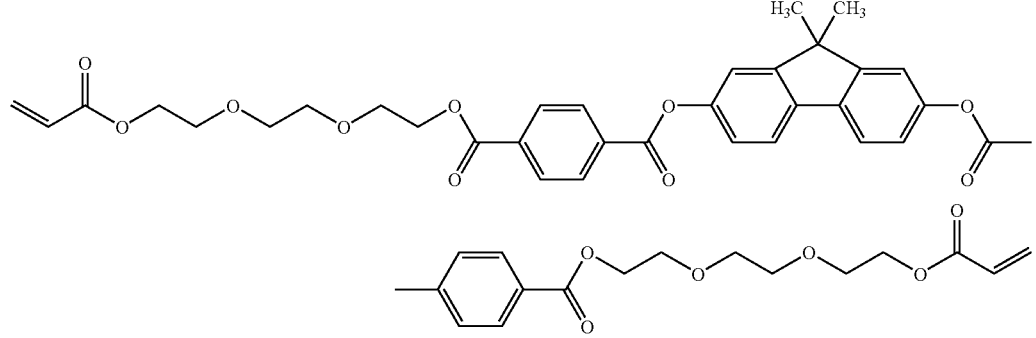
(1-37-1)
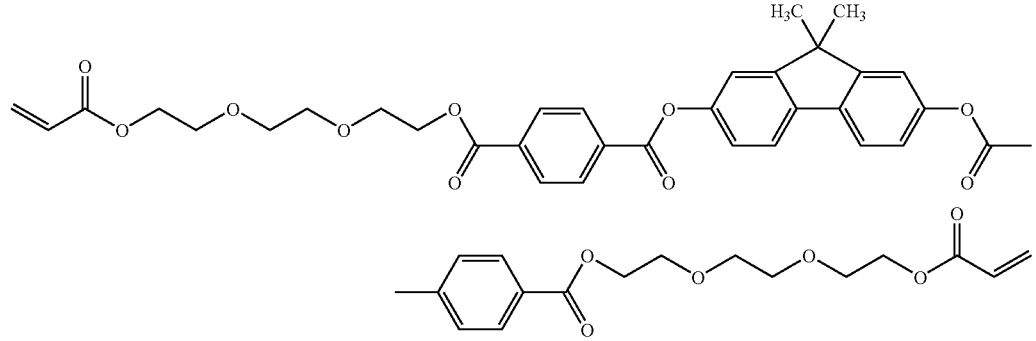
(1-38-1)

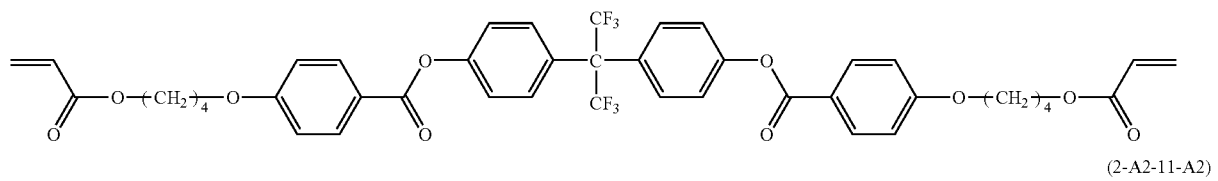
(2-A2-11-A1)
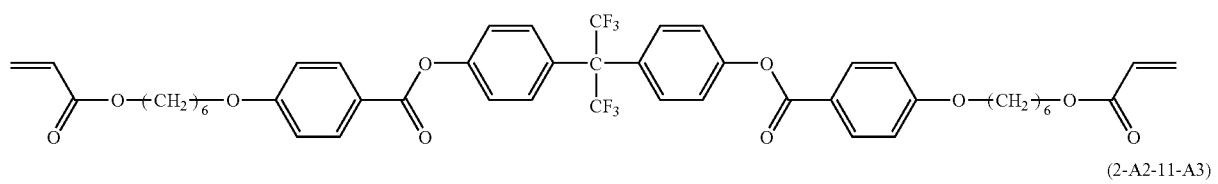
(2-A2-11-A2)
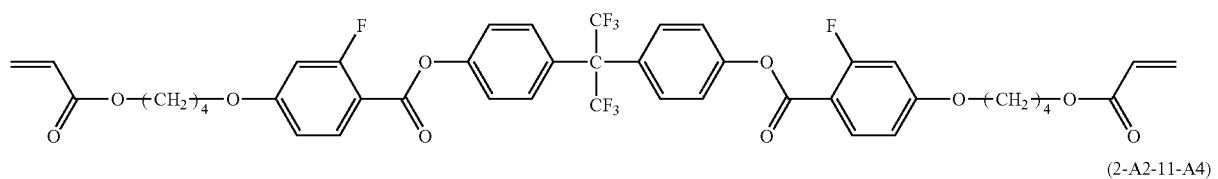
(2-A2-11-A3)
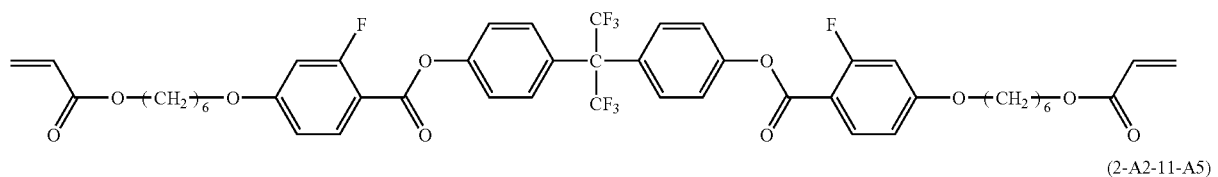
(2-A2-11-A4)
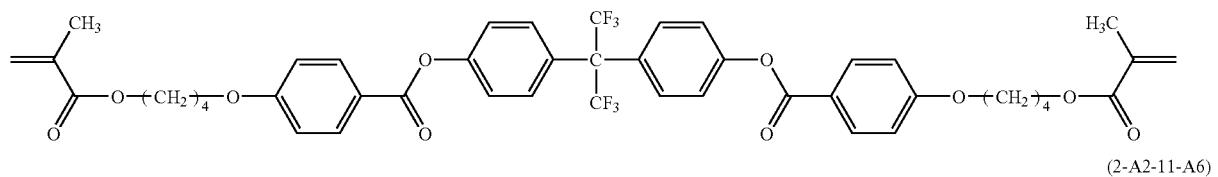
(2-A2-11-A5)
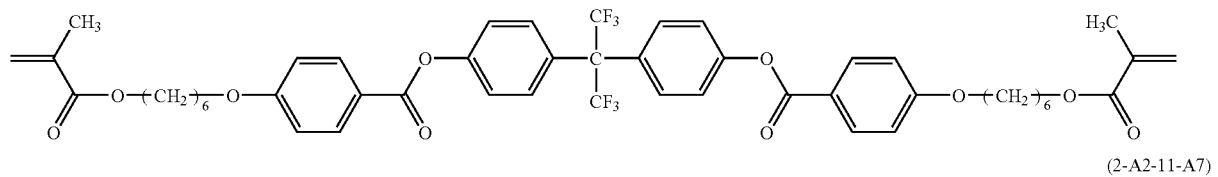
(2-A2-11-A6)
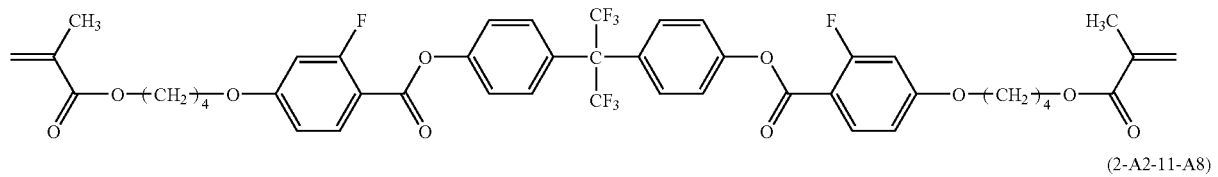
(2-A2-11-A7)
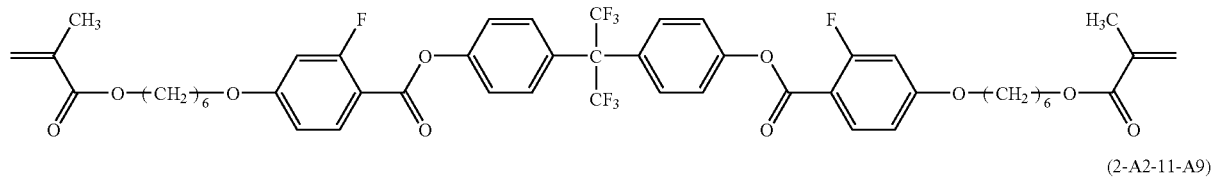
(2-A2-11-A8)
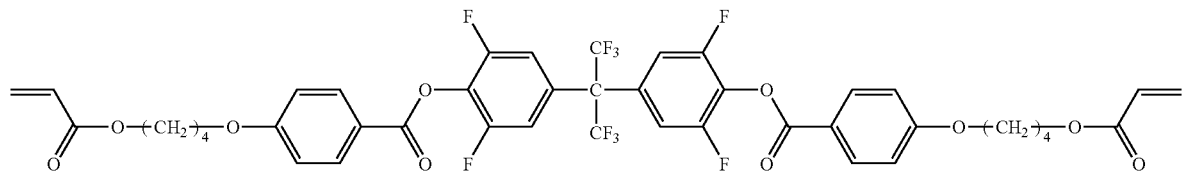
(2-A2-11-A9)

-continued
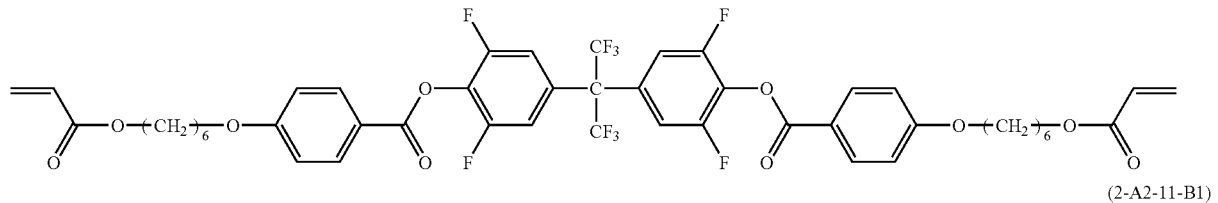
(2-A2-11-A10)
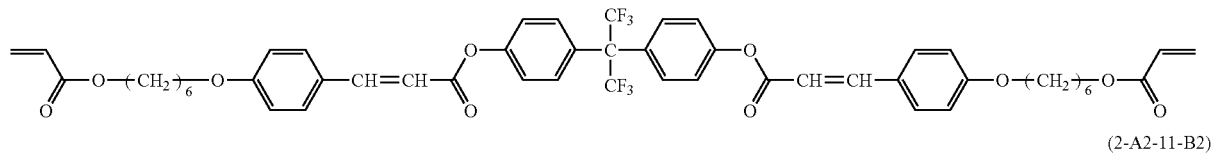
(2-A2-11-B1)
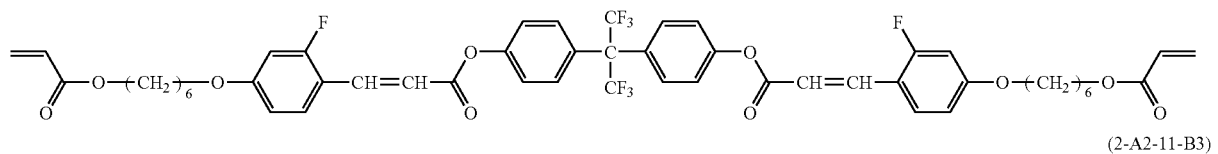
(2-A2-11-B2)
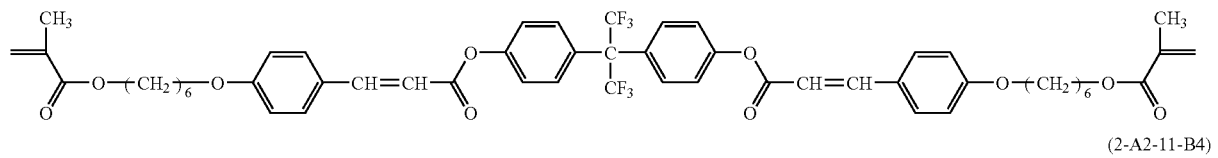
(2-A2-11-B3)
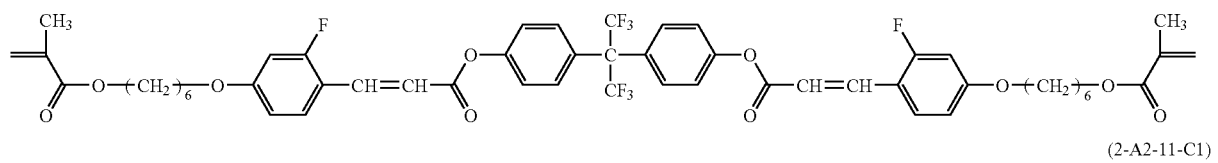
(2-A2-11-B4)
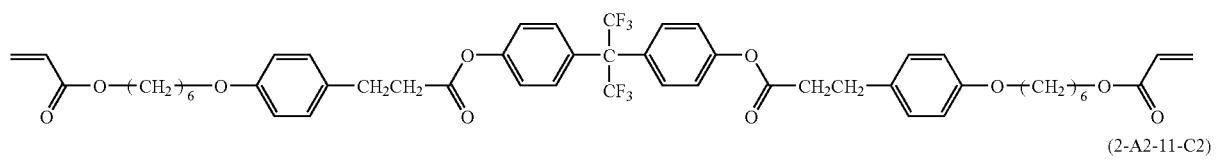
(2-A2-11-C1)
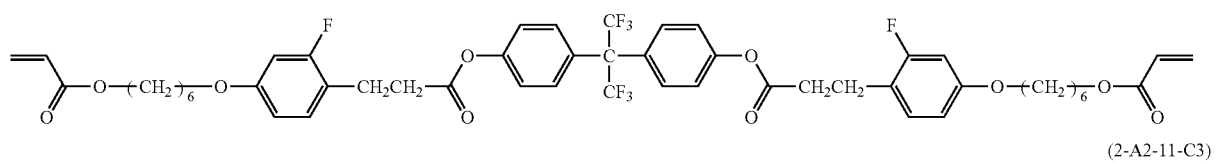
(2-A2-11-C2)
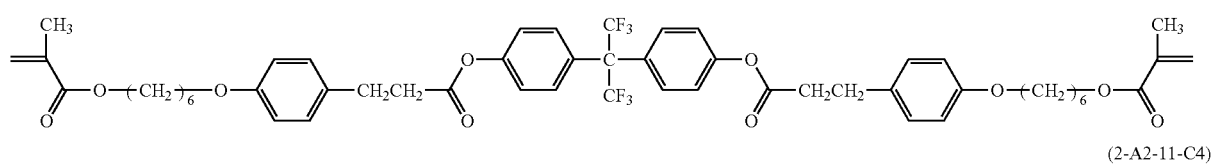
(2-A2-11-C3)
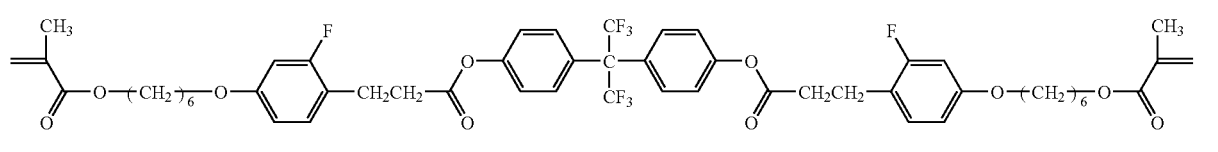
(2-A2-11-C4)
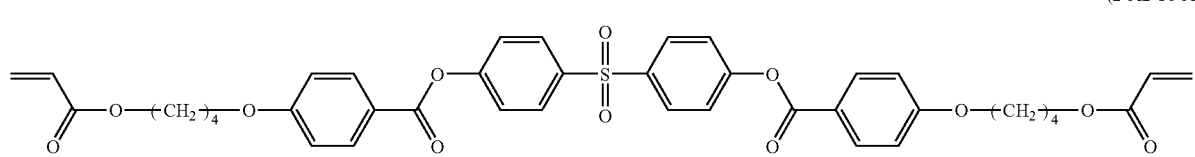
(2-A2-16-A1)

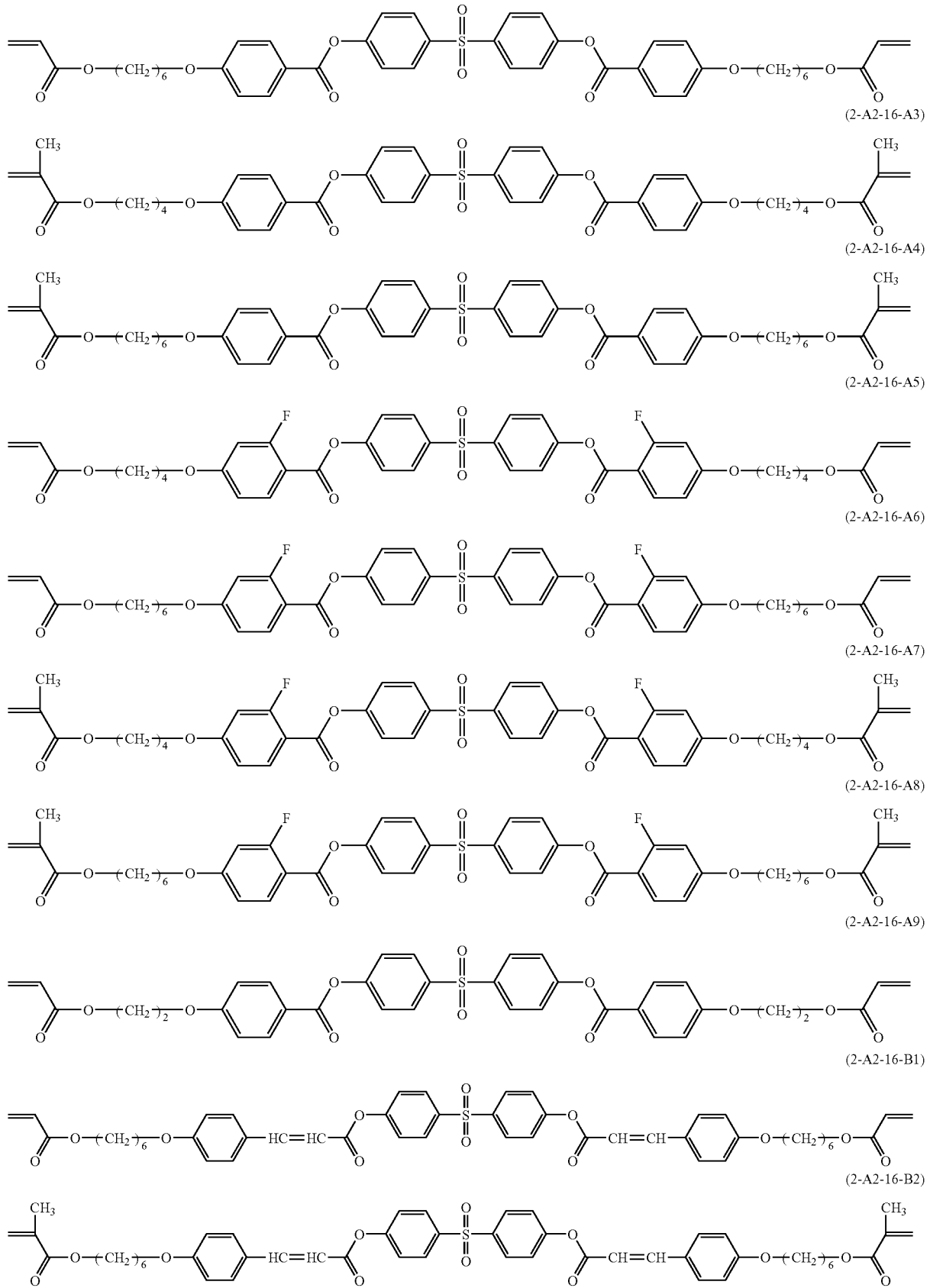

-continued
(2-A2-16-B3)
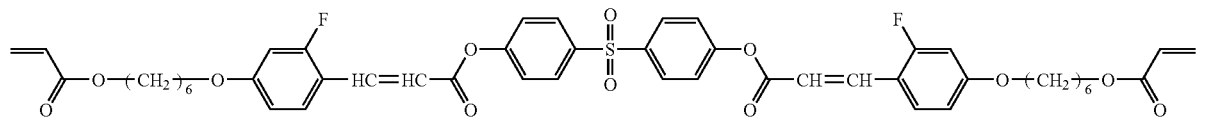
(2-A2-16-B4)
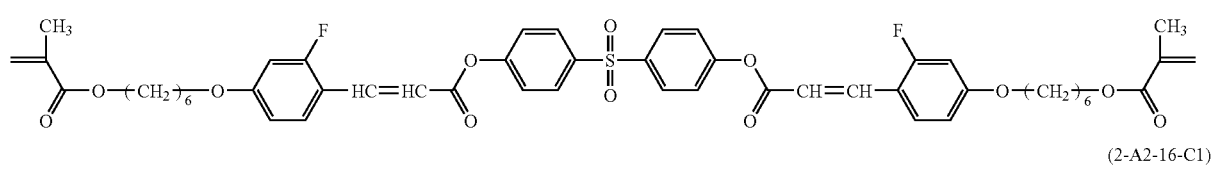
(2-A2-16-C1)
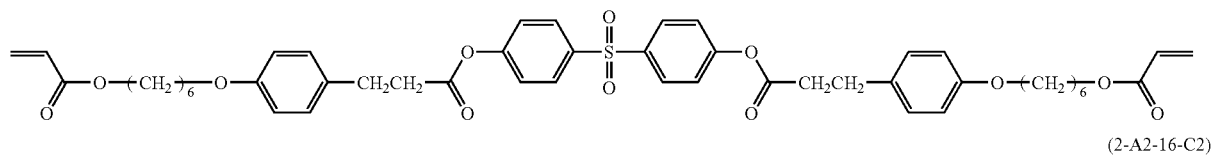
(2-A2-16-C2)
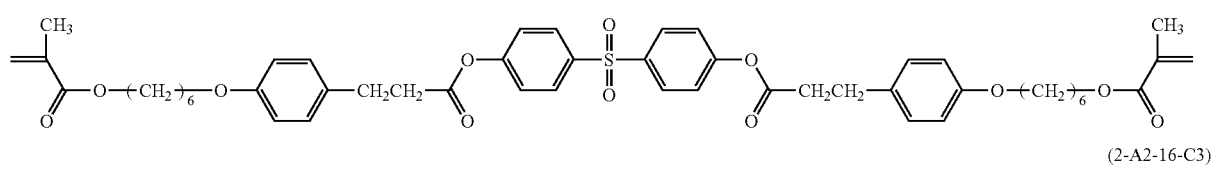
(2-A2-16-C3)
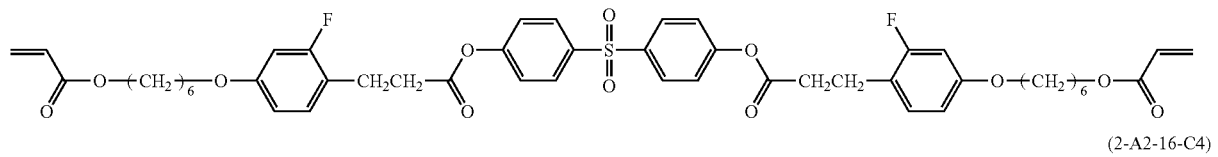
(2-A2-16-C4)
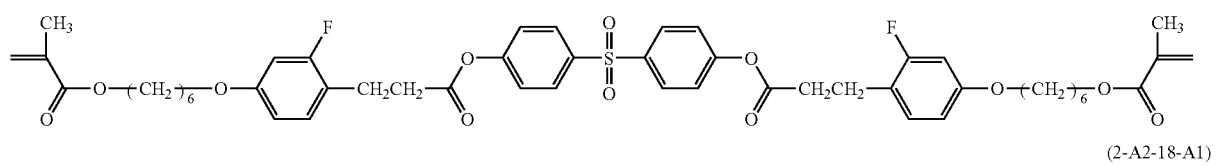
(2-A2-18-A1)
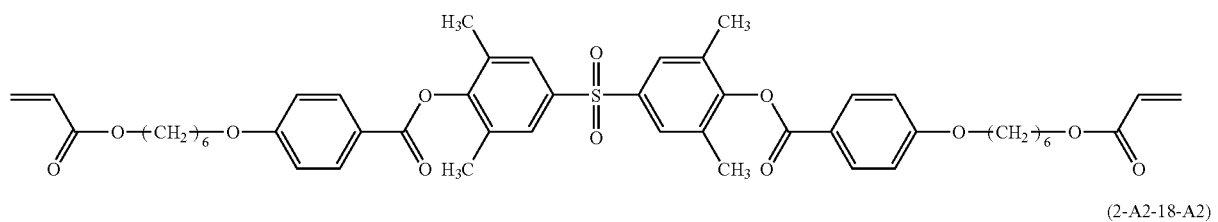
(2-A2-18-A2)
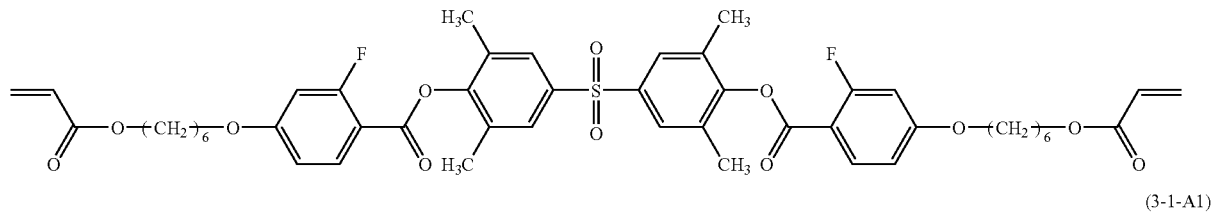
(3-1-A1)
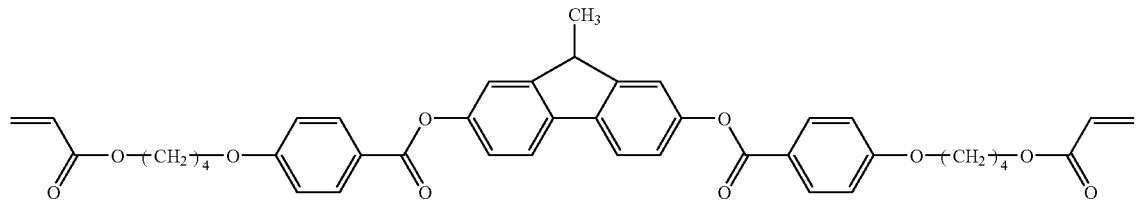

-continued
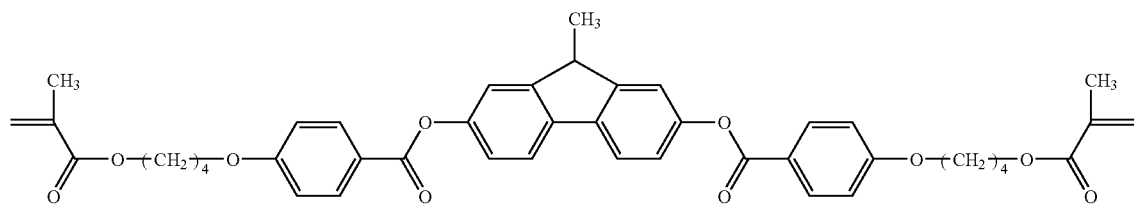
(3-1-A2)
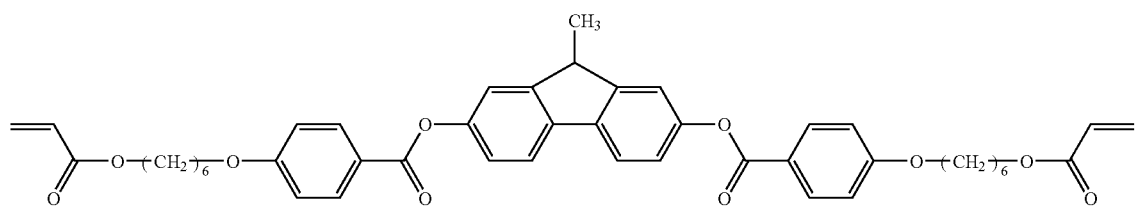
(3-1-A3)
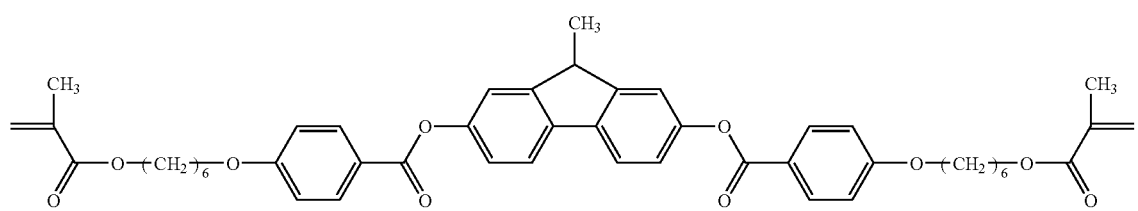
(3-1-A4)
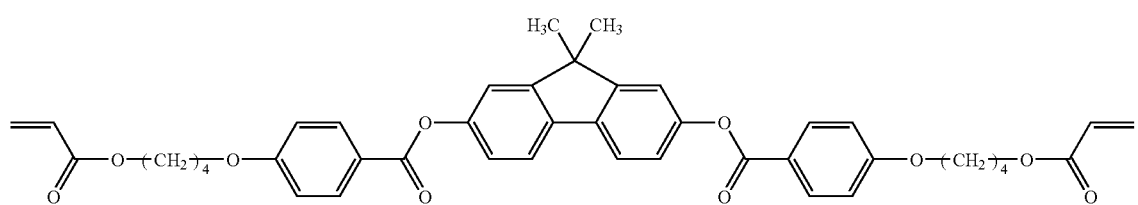
(3-1-B1)
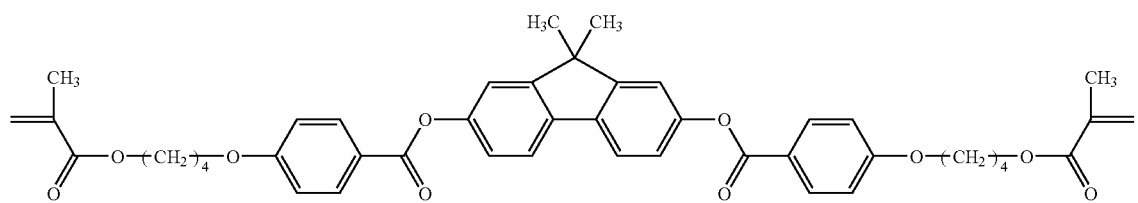
(3-1-B2)
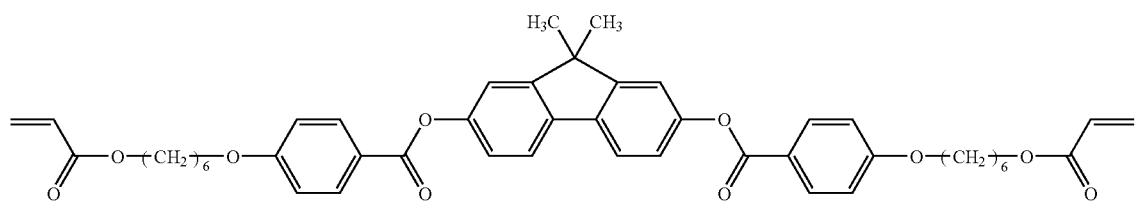
(3-1-B3)
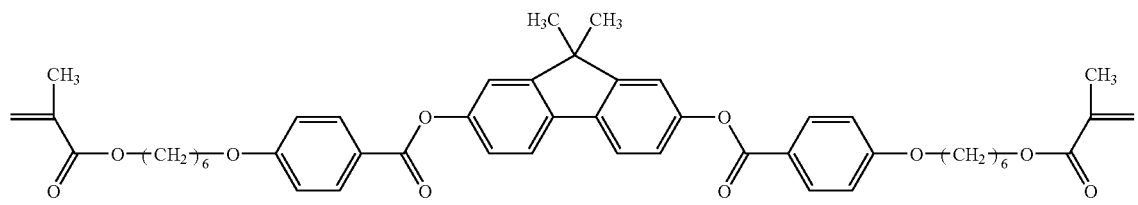
(3-1-B4)

-continued
(3-1-C1)
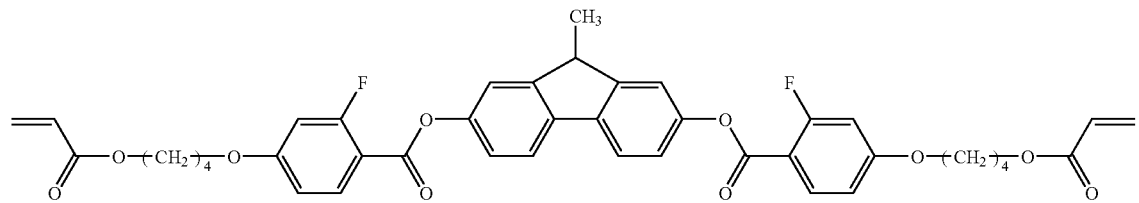
(3-1-C2)
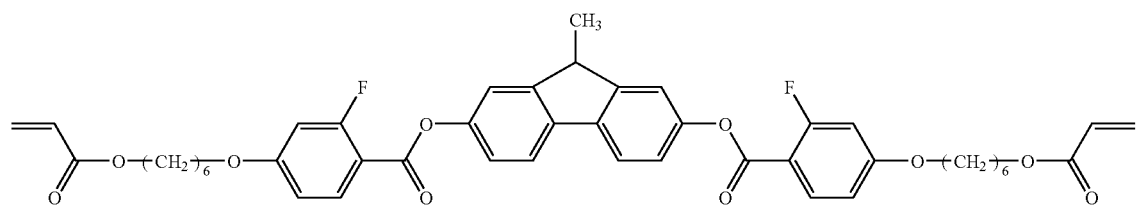
(3-1-C3)
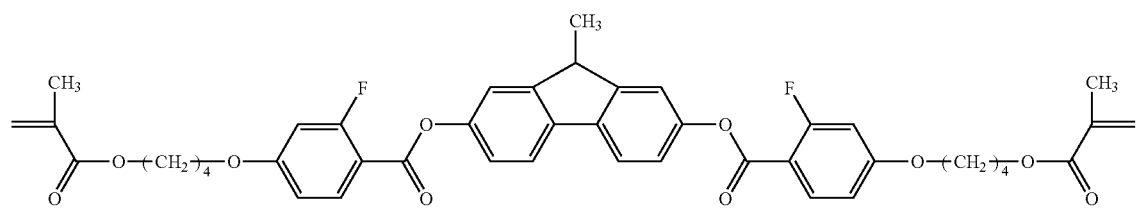
(3-1-C4)
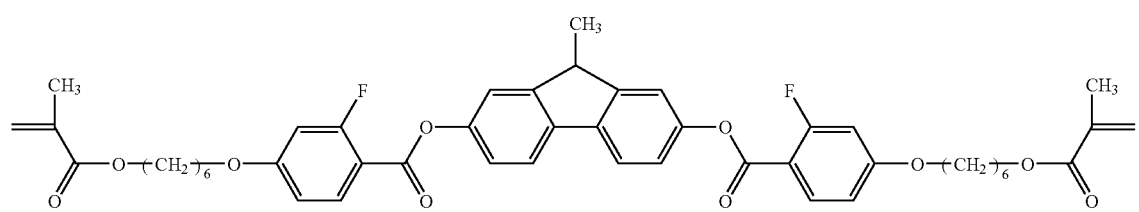
(3-1-D1)
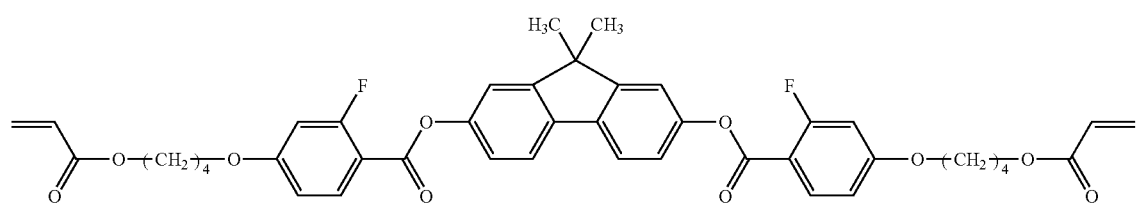
(3-1-D2)
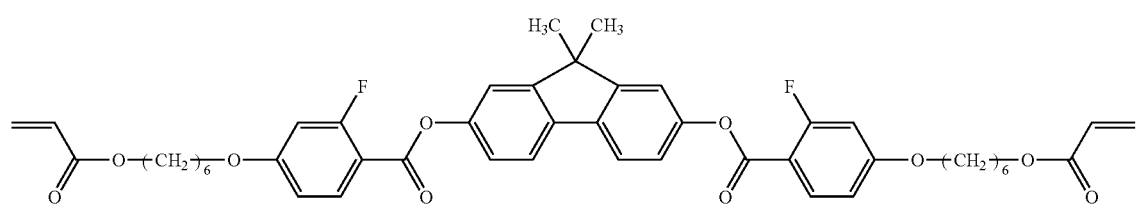
(3-1-D3)
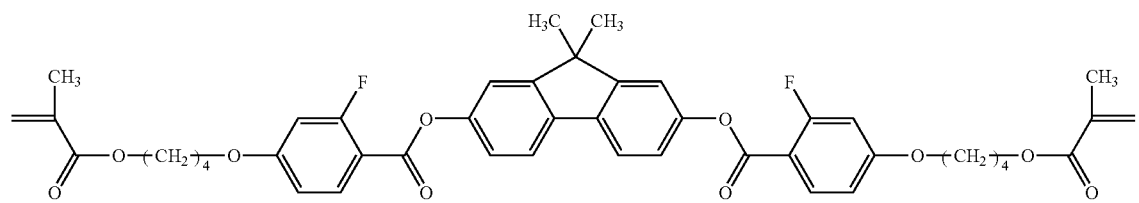

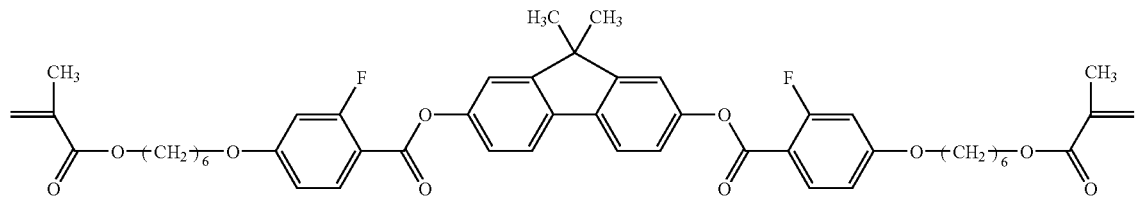
(3-1-D4)
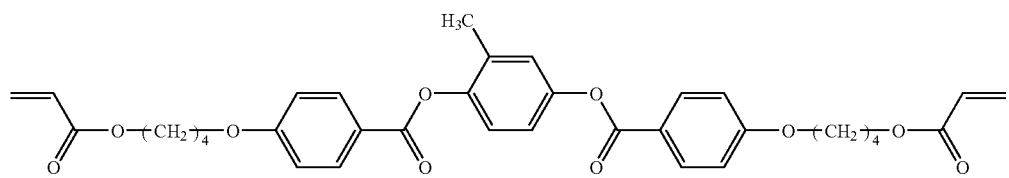
(3-2-C1)
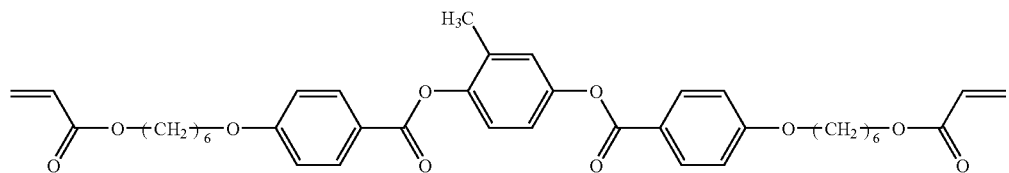
(3-2-C2)
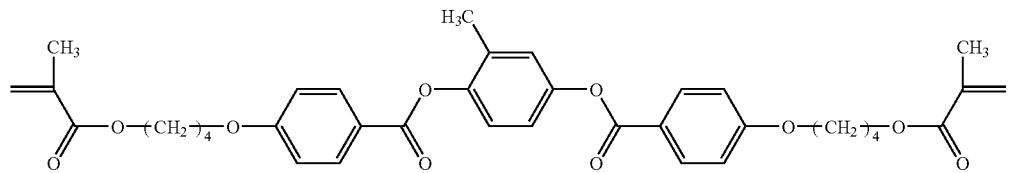
(3-2-C3)
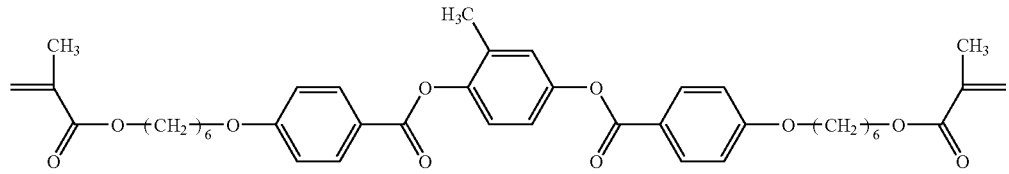
(3-2-C4)
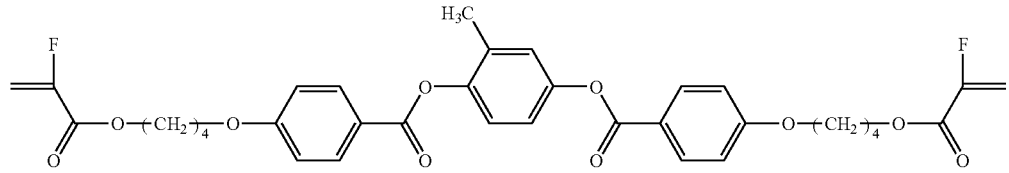
(3-2-C5)
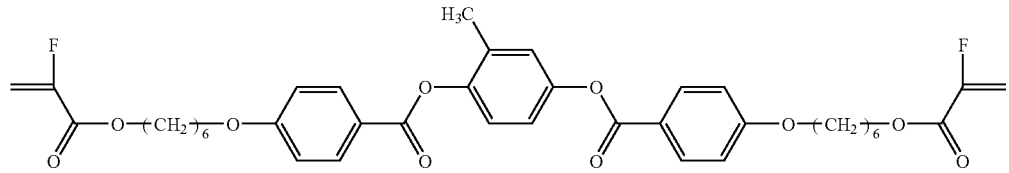
(3-2-C6)
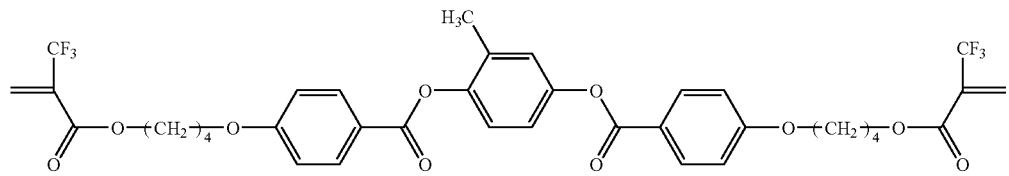
(3-2-C7)

-continued
(3-2-C8)
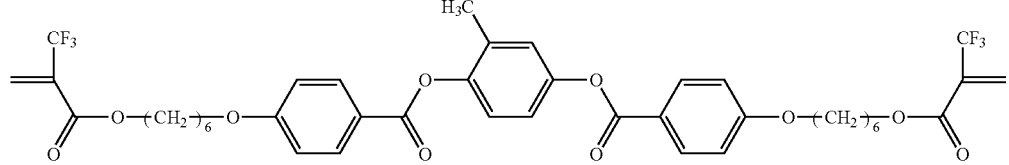
(3-2-D1)
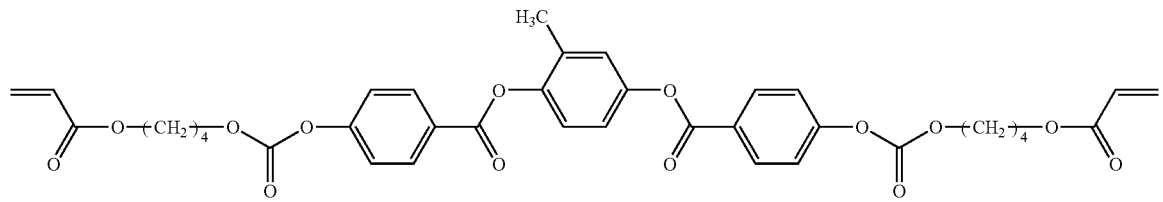
(3-2-D2)
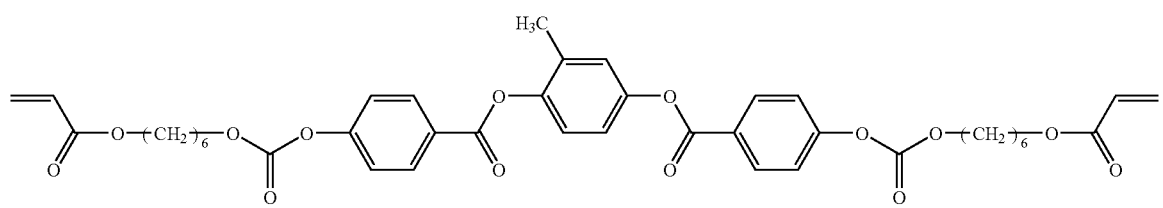
(4-1-A1) (4-1-A2)
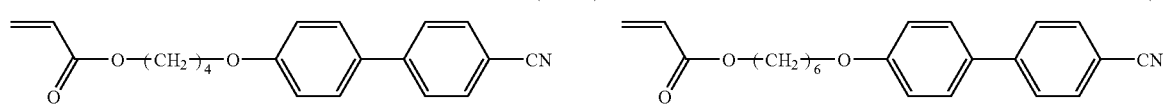
(4-1-A3) (4-1-A4)
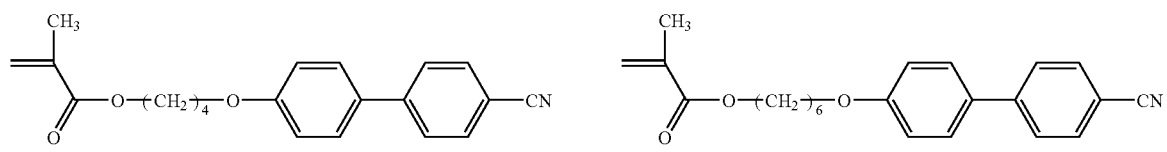
(4-1-B1) (4-1-B2)
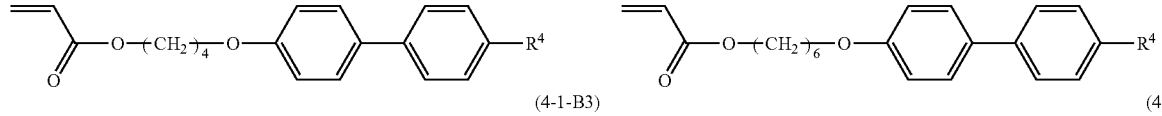
(4-1-B3) (4-1-B4)
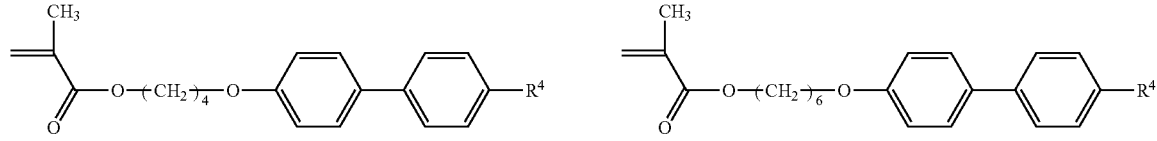
wherein $R^4$ represents alkyl having from 1 to 10 carbon atoms or alkoxy having from 1 to 10 carbon atoms.
-continued
(4-1-C1) (4-1-C3)
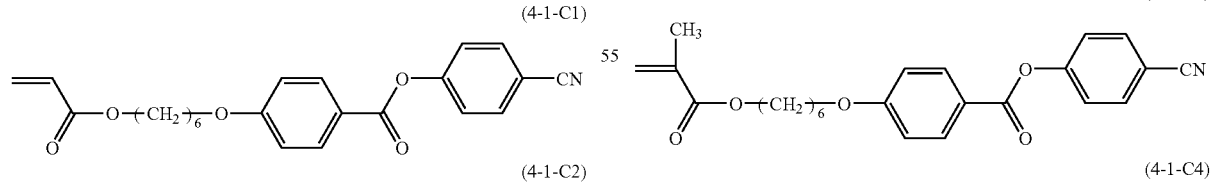
(4-1-C2) (4-1-C4)
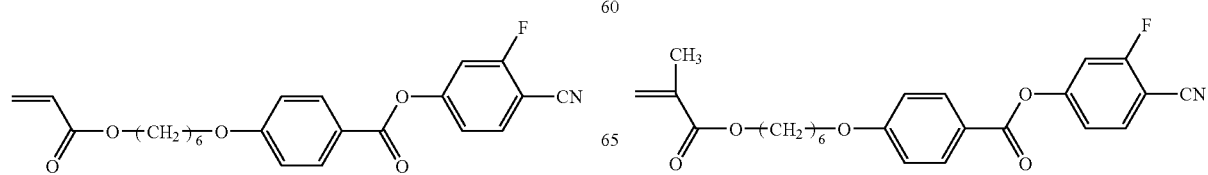

(4-1-C5)
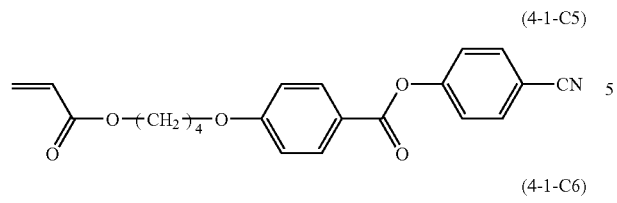

(4-1-C6)
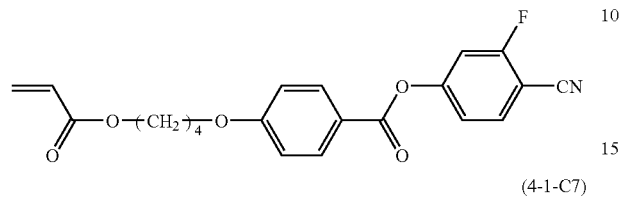

(4-1-C7)
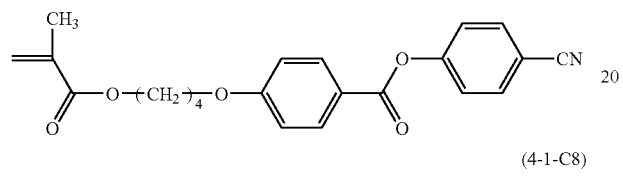

(4-1-C8)
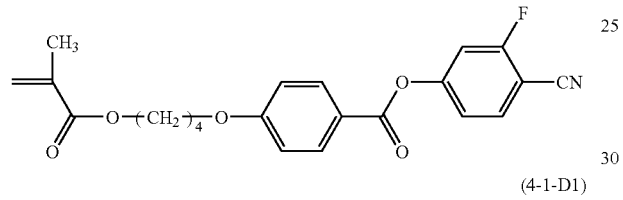

(4-1-D1)
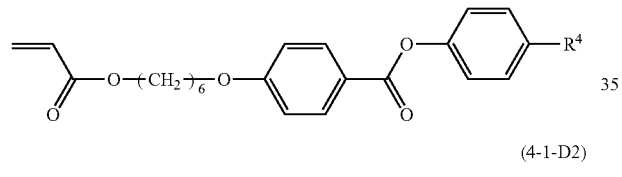

(4-1-D2)
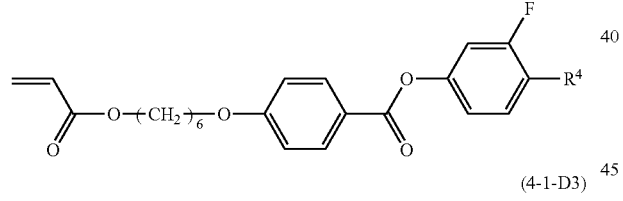

(4-1-D3)
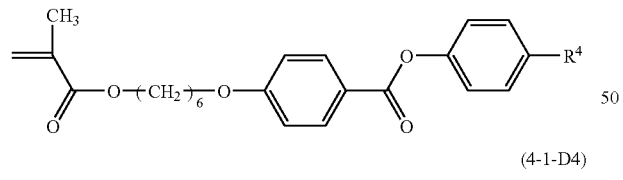

(4-1-D4)
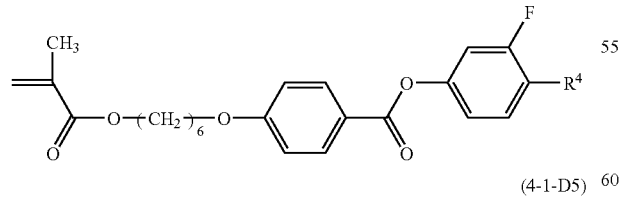

(4-1-D5)
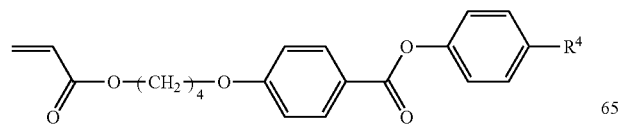

(4-1-D6)
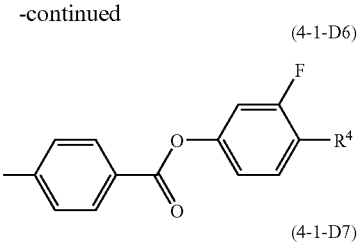

(4-1-D7)
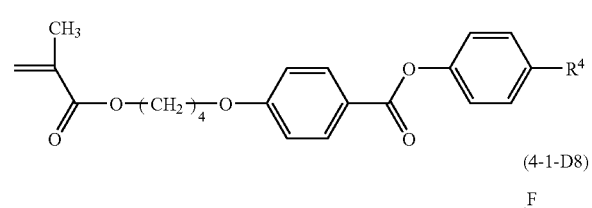

(4-1-D8)
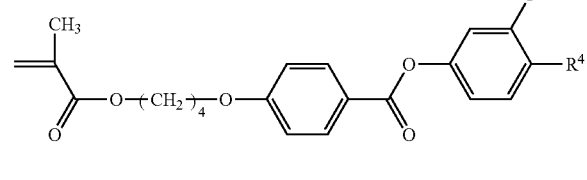

wherein $R^4$ represents alkyl having from 1 to 10 carbon atoms, alkoxy having from 1 to 10 carbon atoms or —$OCF_3$.

(5-1-1)

(5-1-2)

(5-1-3)

(5-2-1)
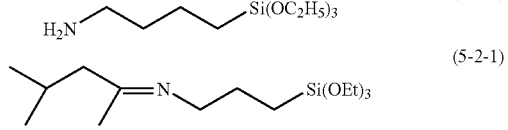

Examples of the nonionic surfactant are described below.

Examples of the silicone-related nonionic surfactant include products containing modified silicone as a major component available from Kyoeisha Chemical Co., Ltd., such as, Polyflow ATF-2, Glanol 100, Glanol 115, Glanol 400, Glanol 410, Glanol 435, Glanol 440, Glanol 450, Glanol B-1484, Polyflow KL-250, Polyflow KL-260, Polyflow KL-270, Polyflow KL-280, BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-344, BYK-345, BYK-346, BYK-347, BYK-348, BYK-370, BYK-375, BYK-377, BYK-378, BYK-3500, BYK-3510 and BYK-3570.

Examples of the fluorine-related nonionic surfactant include BYK-340, Ftergent 251, Ftergent 221 MH, Ftergent 250, FTX-215M, FTX-218M, FTX-233M, FTX-245M, FTX-290M, FTX-209F, FTX-213F, Ftergent 222F, FTX-233F, FTX-245F, FTX-208G, FTX-218G, FTX-240G, FTX-206D, Ftergent 212D, FTX-218, FTX-220D, FTX-230D, FTX-240D, FTX-720C, FTX-740C, FTX-207S, FTX-211S, FTX-220S, FTX-230S, KB-L82, KB-L85, KB-L97, KB-L109, KB-L110, KB-F2L, KB-F2M, KB-F2S, KB-F3M and KB-FaM.

Examples of the hydrocarbon-related nonionic surfactant include products containing an acrylic polymer as a major component, such as Polyflow No. 3, Polyflow No. 50EHF, Polyflow No. 54N, Polyflow No. 75, Polyflow No. 77, Polyflow No. 85HF, Polyflow No. 90, Polyflow No. 95, BYK-350, BYK-352, BYK-354, BYK-355, BYK-358N, BYK-361N, BYK-380N, BYK-381, BYK-392 and BYK-Silclean3700.

Polyflow and Glanol are trade names of the products available from Kyoeisha Chemical Co., Ltd. BYK is a trade name of the products available from BYK Chemie Co., Ltd. Ftergent, FTX and KB are trade names of the products available from Neos Co., Ltd.

In the invention, the aforementioned nonionic surfactants may be used solely or in combination of two or more of them.

Examples of the other polymerizable compounds, the additive and the organic solvent will be described. These compounds and materials may be those commercially available. Examples of the other polymerizable compounds include a compound having one polymerizable group, a compound having two polymerizable groups and a polyfunctional compound having three or more polymerizable groups.

Examples of the compound having one polymerizable group include styrene, nuclear substituted styrene, acrylonitrile, vinyl chloride, vinylidene chloride, vinylpyridine, N-vinylpyrrolidone, vinylsulfonic acid, a vinyl fatty acid ester (such as vinyl acetate), an α,β-ethylenic unsaturated carboxylic acid (such as acrylic acid, methacrylic acid, maleic acid, fumaric acid and itaconic acid), an alkyl ester of (meth)acrylic acid (number of carbon atoms of alkyl: 1 to 18), a hydroxyalkyl ester of (meth)acrylic acid (number of carbon atoms of hydroxyalkyl: 1 to 18), an aminoalkyl ester of (meth)acrylic acid (carbon number of aminoalkyl: 1 to 18), an ether oxygen-containing alkyl ester of (meth)acrylic acid (number of carbon atoms of ether oxygen-containing alkyl: 3 to 18, such as methoxyethyl ester, ethoxyethyl ester, methoxypropyl ester, methylcarbyl ester, ethylcarbyl ester and butylcarbyl ester), N-vinylacetamide, vinyl p-t-butyl benzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, dicyclopentanyloxylethyl (meth)acrylate, isobornyloxyethyl(meth)acrylate, isobornyl (meth)acrylate, adamantyl(meth)acrylate, dimethyladamantyl (meth)acrylate, dicyclopentanyl(meth)acrylate, dicyclopentenyl (meth)acrylate, 2-acryloyloxyethylsuccinic acid, 2-acryloyloxyethylhexahydrophthalic acid, 2-acryloyloxyethylphthalic acid, 2-acryloyloxyethyl-2-hydroxyethylphthalic acid, 2-acryloyloxyethyl acid phosphate, 2-methacryloyloxyethyl acid phosphate, a mono(meth)acrylate ester or a di(meth)acrylate ester of polyalkylene glycol, such as polyethylene glycol having a polymerization degree of from 1 to 100, polypropylene glycol having a polymerization degree of from 1 to 100 and a copolymer of ethylene oxide and propylene oxide and a copolymer of ethylene oxide and propylene oxide, and a mono(meth)acrylate ester of polyalkylene glycol, such as polyethylene glycol or polypropylene glycol having a polymerization degree of from 1 to 100 and a copolymer of ethylene oxide and propylene oxide, having terminals capped with an alkyl group having from 1 to 6 carbon atoms.

Examples of the compound having, two or more polymerizable groups include 1,4-butanediol diacrylate, 1,6-hexanediol diacrylate, 1,9-nonanediol diacrylate, neopentyl glycol diacrylate, dimethyloltricyclodecane diacrylate; triethylene glycol diacrylate, dipropylene glycol diacrylate, tripropylene glycol diacrylate, tetraethylene glycol diacrylate, bisphenol A ethylene oxide adduct diacrylate, bisphenol A glycidyl diacrylate (Biscoat V #700), polyethylene glycol diacrylate, methacrylate compounds of these compounds, and polymerizable bisphenol fluorenone derivatives having a cardo structure represented by the formulae (α-1) to (α-6). These compounds are suitable for enhancing the film forming capability of the polymer.

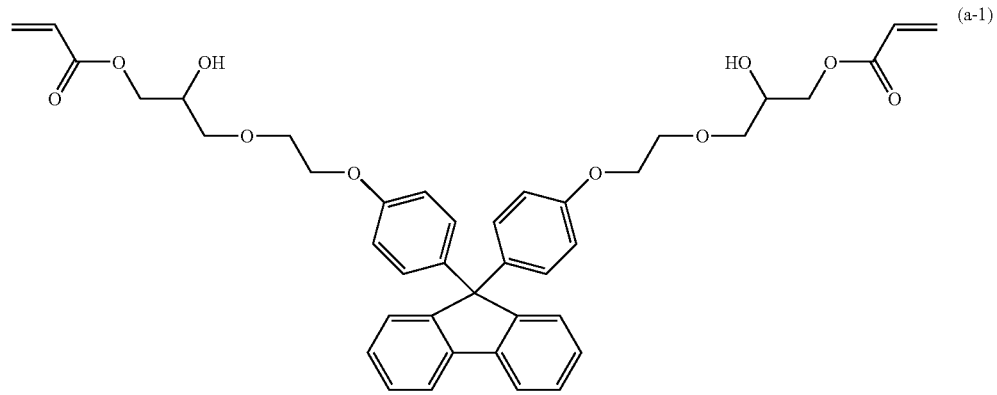

(a-1)

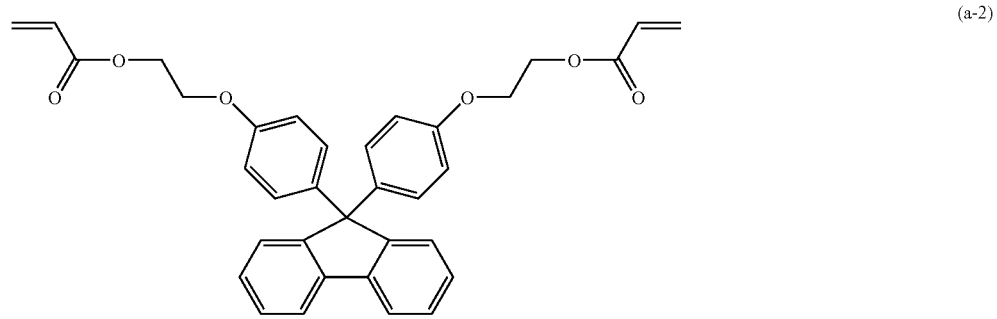

(a-2)

-continued

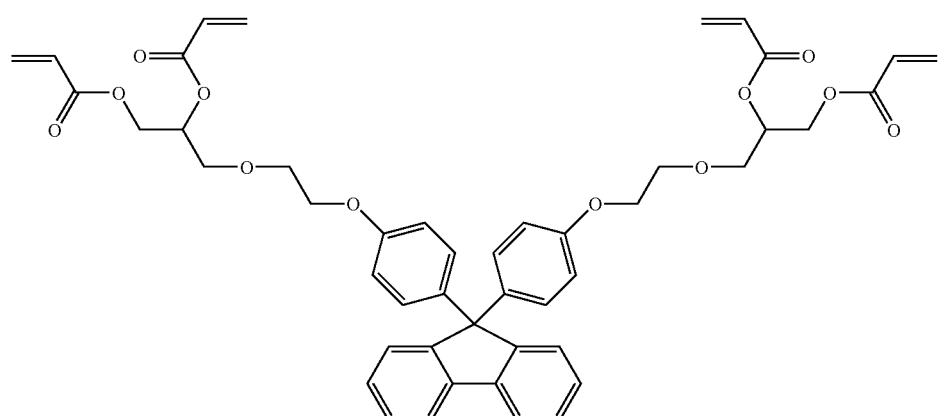
(a-3)

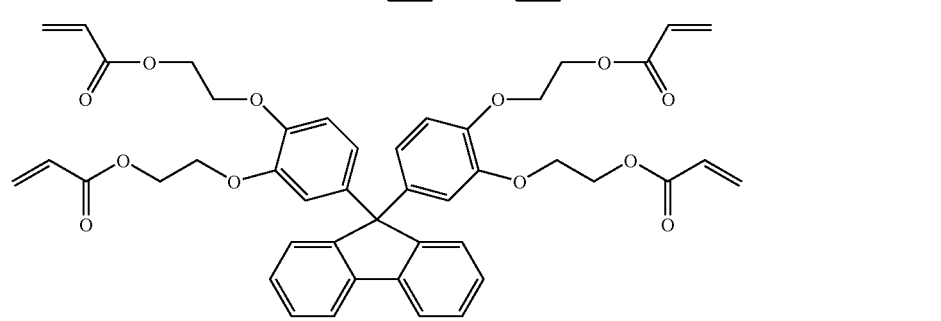
(a-4)

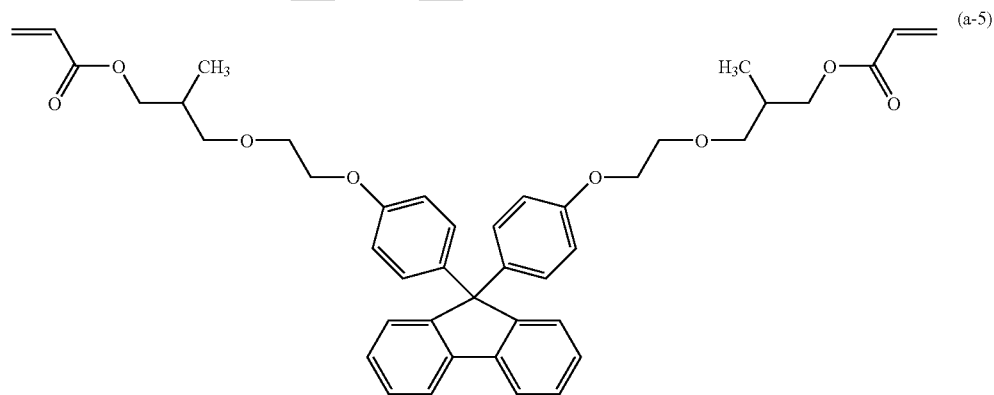
(a-5)

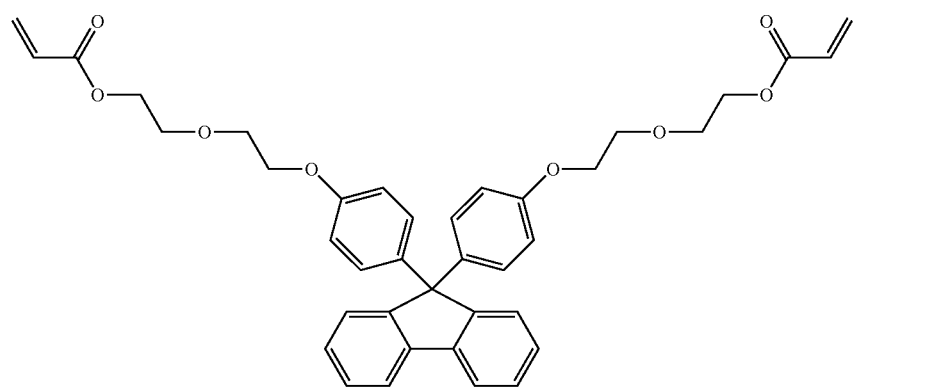
(a-6)

The polyfunctional compound is a non-liquid crystalline compound having from 3 to 70 polymerizable groups in one molecule. The compound may be one commercially available. Preferred examples of the polyfunctional compound include pentaerythritol tri(meth)acrylate, trimethylolpropane tri(meth)acrylate, trimethylol ethylene oxide adduct tri(meth)acrylate, tris(meth)acryloyloxyethyl phosphate, tris((meth)acryloyloxyethyl)isocyanurate, alkyl-modified dipentaerythritol tri(meth)acrylate, ethylene oxide-modified trimethylolpropane tri(meth)acrylate, propylene oxide-modified trimethylolpropane tri(meth)acrylate, pentaerythritol tetra(meth)acrylate, alkyl-modified dipentaerythritol tetra (meth)acrylate, ditrimethylolpropane tetra(meth)acrylate, dipentaerythritol hexa(meth)acrylate, dipentaerythritol monohydroxypenta(meth)acrylate, alkyl-modified dipentaerythritol penta(meth)acrylate, Biscoat V #802 (number of functional groups: 8) and Biscoat V #1000 (number of functional groups: 14 in average). Biscoat is a trade name of the products available from Osaka Organic Chemical Industry Ltd. The polyfunctional compound having 16 or more functional groups can be obtained by acrylating Boltorn H20 (number of functional groups: 16), Boltorn H30 (number of functional groups: 32) Boltorn H40 (number of functional groups: 64), which are available from Perstorp Speciality Chemicals AB.

Examples of the surfactant other than the nonionic surfactant include a polyether compound, a titanate compound, imidazoline, a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, a lauryl sulfate amine compound, an alkyl-substituted aromatic sulfonate salt, an alkylphosphate salt, an aliphatic or aromatic sulfonic acid formalin condensate, laurylamide propyl betaine, laurylaminoacetic acid betaine, a polyethylene glycol fatty acid ester, polyoxyethylene alkylamine, a perfluoroalkylsulfonate salt, a perfluoroalkylcarboxylate salt, and a urethane compound having a perfluoroalkyl group. The surfactant has such a function as that of facilitating the coating operation of the composition on a support substrate. The amount of the surfactant is preferably from 0.0001 to 0.03, and more preferably from 0.0005 to 0.03, based on the total weight of the components (A) to (D).

A known photopolymerization initiator may be used for optimizing the polymerization rate of the polymerizable liquid crystal composition. The amount of the photopolymerization initiator added is preferably from 0.0001 to 0.20, more preferably from 0.001 to 0.15, and further preferably from 0.01 to 0.15, in terms of a weight ratio based on the total amount of the components (A) to (D). Examples of the photopolymerization initiator include 2-hydroxy-2-methyl-1-phenylpropan-1-one (Darocure 1173), 1-hydroxycyclohexyl phenyl ketone, 2,2-dimethoxy-1,2-diphenylethan-1-one (Irgacure 651), 1-hydroxycyclohexyl phenyl ketone (Irgacure 184), Irgacure 127, Irgacure 500 (a mixture of Irgacure 184 and benzophenone), Irgacure 2959, Irgacure 907, Irgacure 369, Irgacure 379, Irgacure 754, Irgacure 1300, Irgacure 819, Irgacure 1700, Irgacure 1800, Irgacure 1850, Irgacure 1870, Darocure 4265, Darocure MBF, Darocure TPO, Irgacure 784, Irgacure 754, Irgacure OXE01, Irgacure OXE02. Darocure and Irgacure are trade names of the products available from Ciba Japan Co., Ltd. A known sensitizer may be added thereto, examples of which include isopropylthioxanthone, diethylthioxanthone, ethyl-4-dimethylaminobenzoate (Darocure EDB) and 2-ethylhexyl-4-dimethylaminobenzoate (Darocure EHA).

Examples of the photoradical polymerization initiator also include p-methoxyphenyl-2,4-bis(trichloromethyl)triazine, 2-(p-butoxystyryl)-5-trichloromethyl-1,3,4-oxadiazole, 9-2 phenylacridine, 9,10-benzphenazine, a mixture of benzophenone and Michler's ketone, a mixture of hexaarylbiimidazole and mercaptobenzimidazole, 1-(4-isopropylphenyl)-2-hydroxy-2-methylpropan-1-one, benzyldimethylketal, 2-methyl-1-(4-(methylthio)phenyl)-2-morpholinopropan-1-one, a mixture of 2,4-diethylxanthone and methyl p-dimethylaminobenzoate, and a mixture of benzophenone and methyltriethanolamine.

One or plural chain transfer agents may be added to the polymerizable liquid crystal composition to control the mechanical characteristics of the polymer. The use of a chain transfer agent enables to control the length of the polymer chain or the distance between two crosslinked polymer chains in the polymer film. These lengths can be controlled simultaneously. Increase of the amount of the chain transfer agent decreases the length of the polymer chain. Preferred examples of the chain transfer agent include a thiol compound. Examples of a monofunctional thiol compound include dodecanethiol and 2-ethylhexyl-(3-mercaptopropyonate). Examples of a polyfunctional thiol compound include trimethylolpropane tris(3-mercaptopropyonate), pentaerythritol tetrakis(3-mercaptopropyonate), 1,4-bis(3-mercaptobutyryloxy)butane (Karenz MT BD1), pentaerythritol tetrakis (3-mercaptobutyrate) (Karenz MT PE1), and 1,3,5-tris(3-mercaptobutyloxyethyl)-1,3,5-triazine-2,4,6(1H,3H,5H)-trione (Karenz MT NR1). Karenz is a trade name of the products available from Showa Denko Co., Ltd.

A polymerization inhibitor may be added to the polymerizable liquid crystal composition for preventing initiation of polymerization upon storing. A known polymerization inhibitor may be used, and preferred examples thereof include 2,5-di(t-butyl)hydroxytoluene (BHT), hydroquinone, Methylene Blue, diphenylpicric acid hydrazide (DPPH), benzothiadine, 4-nitrosodimethylaniline (NIDI) and o-hydroxybenzophenone.

An oxygen inhibitor may be added to the polymerizable liquid crystal composition for improving the storage stability thereof. A radical formed in the composition reacts with oxygen in the atmosphere to provide a peroxide radical, which accelerate unfavorable reaction with the polymerizable compound. In order to prevent the phenomenon, an oxygen inhibitor is preferably added. Examples of the oxygen inhibitor include a phosphate ester compound.

In order to improve the weather resistance of the polymerizable liquid crystal composition, an ultraviolet ray absorbent, a light stabilizer (radical scavenger) and an antioxidant may be added. Examples of the ultraviolet ray absorbent include Tinuvin PS, Tinuvin P; Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479 Tinuvin 5236, ADK STAB LA32, ADK STAB LA-34, ADK STAB LA-36, ADK STAB LA-31, ADK STAB 1413 and ADK STAB LA-51. Tinuvin is a trade name of the products available from Ciba Japan Co., Ltd., and ADK STAB is a trade name of the products available from ADEKA Corporation.

Examples of the light stabilizer include Tinuvin 111FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050, Tinuvin 5060, Tinuvin 5151, Chimassorb 119FL, Chimassorb 944FL, Chimassorb 944LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, Cyasorb UV-3346, available from Nihon Cytec Industries Inc., and Good-rite UV-3034, available from Goodrich Corp. Chimassorb is a trade name of a commercial product available from Ciba Japan Co., Ltd.

Examples of the antioxidant include ADK STAB AO-20, AO-30, AO-40, AO-50, AO-60 and AO-80, Sumilizer BHT, Sumilizer BBM-S and Sumilizer GA-80, available from Sumitomo Chemical Co., Ltd., and Irganox 1076, Irganox 1010, Irganox 3114 and Irganox 245, available from Ciba Japan Co., Ltd. These commercially available products may be used in the invention.

A silane coupling agent other than the compound (5) may be added to the polymerizable liquid crystal composition for controlling adhesion to the substrate. Specific examples of the silane coupling agent include vinyltrialkoxysilane, 3-isocyanatepropyltrialkoxysilane, N-(2-aminoethyl)-3-aminopropyltrialkoxysilane, 3-glycidoxypropyltrialkoxysilane, 3-chlorotrialkoxysilane, 3-acryloxypropyltrimethoxysilane and 3-methacryloxypropyltrialkoxysilane. Examples thereof also include dialkoxymethylsilane compounds obtained by replacing one of the three alkoxy groups of these compounds by methyl.

The polymerizable liquid crystal composition may be coated as it is on the surface of the substrate. However, in general, for facilitating the coating operation, the polymerizable liquid crystal composition is diluted with a solvent, or in alternative, the components of the polymerizable liquid crystal composition are dissolved in a solvent, so as to prepare a solution of the polymerizable liquid crystal composition containing the polymerizable liquid crystal composition and the solvent, and the solution is coated. A sole compound may be used as the solvent, and two or more compounds may be used as a mixture. Examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (such as methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (such as methyl propionate, methyl 3-methoxypropionate, ethyl propionate, propyl propionate and butyl propionate), alkyl butyrate (such as methyl butyrate, ethyl butyrate, butyl butyrate, isobutyl butyrate and propyl butyrate), dialkyl malonate (such as diethyl malonate), alkyl glycolate (such as methyl glycolate and ethyl glycolate), alkyl lactate (such as methyl lactate, ethyl lactate, isopropyl lactate, n-propyl lactate, butyl lactate and ethylhexyl lactate), monoacetin, γ-butyrolactone and γ-valerolactone.

Preferred examples of the amide solvent include N-methyl-2-pyrrolidone, N,N-diemthylacetamide, N-methylpropionamide, N,N-dimethylformamide, N,N-diethylformamide, N,N-diethylacetamide, N,N-diemthylacetamide dimethylacetal, N-methylcaprolactam and dimethylimidazolidinone.

Preferred examples of the alcohol solvent include methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerin, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

Preferred examples of the ether solvent include ethylene glycol dimethyl ether, diethylene glycol dimethyl ether, bis(2-propyl)ether, 1,4-dioxane and tetrahydrofuran (THF).

Preferred examples of the glycol monoalkyl ether solvent include ethylene glycol monoalkyl ether (such as ethylene glycol monomethyl ether and ethylene glycol monobutyl ether), diethylene glycol monoalkyl ether (such as diethylene glycol monoethyl ether), triethylene glycol monoalkyl ether, propylene glycol monoalkyl ether (such as propylene glycol monobutyl ether), dipropylene glycol monoalkyl ether (such as dipropylene glycol monomethyl ether), ethylene glycol monoalkyl ether acetate (such as ethylene glycol monobutyl ether acetate), diethylene glycol monoalkyl ether acetate (such as diethylene glycol monoethyl ether acetate), triethylene glycol monoalkyl ether acetate, propylene glycol monoalkyl ether acetate (such as propylene glycol monomethyl ether acetate, propylene glycol monoethyl ether acetate and propylene glycol monobutyl ether acetate), dipropylene glycol monoalkyl ether acetate (such as dipropylene glycol monomethyl ether acetate), and diethylene glycol methyl ethyl ether.

Preferred examples of the aromatic hydrocarbon solvent include benzene, toluene, xylene, mesitylene, ethylbenzene, diethylbenzene, i-propylbenzene, n-propylbenzene, tert-butylbenzene, sec-butylbenzene, n-butylbenzene and tetralin. Preferred examples of the halogenated aromatic hydrocarbon solvent include chlorobenzene. Preferred examples of the aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Preferred examples of the alicyclic hydrocarbon solvent include cyclohexane and decalin.

Preferred examples of the ketone solvent include acetone, methyl ethyl ketone, methyl isobutyl ketone, cyclohexanone, cyclopentanone and methyl propyl ketone.

Preferred examples of the acetate solvent include ethylene glycol monomethyl ether acetate, propylene glycol monomethyl ether acetate, propylene glycol monoethyl ether acetate, methyl acetoacetate and 1-methoxy-2-propyl acetate.

An amide solvent, an aromatic hydrocarbon solvent and a ketone solvent are preferably used from the standpoint of solubility of the polymerizable liquid crystal compounds, and an ester solvent, an alcohol solvent, an ether solvent and a glycol monoalkyl ether solvent are also preferably used in combination from the standpoint of the boiling point of the solvent. There is no particular limitation on selecting the solvent, and in the case where a plastic substrate is used as the supporting substrate, it is necessary to lower the drying temperature to prevent the substrate from being deformed, and is also necessary to prevent the substrate from being damaged with the solvent. Preferred examples of the solvent used in this case include an aromatic hydrocarbon solvent, a ketone solvent, an ester solvent, an ether solvent, an alcohol solvent, an acetate solvent and a glycol monoalkyl acetate solvent.

The referred ratio of the solvent in the solution of the polymerizable liquid crystal composition is generally from 50 to 95% based on the total weight of the solution. The lower limit is determined by considering the solubility of the polymerizable liquid crystal compound and the optimum viscosity upon coating the solution. The upper limit is determined by considering the economical issues, such as the cost for the solvent and the time and amount of heat necessary for evaporating the solvent. The ratio of the solvent is preferably from 60 to 90%, and more preferably from 70 to 85%.

In the following description, a liquid crystal film of the invention obtained from the polymerizable liquid crystal composition may be referred simply to as a liquid crystal film in some cases. The liquid crystal film can be produced in the following manner. The solution of the polymerizable liquid crystal composition is coated on a supporting substrate, and then dried to form a coated film. The coated film is then irradiated with light to polymerize the polymerizable liquid crystal composition, thereby fixing the nematic alignment formed by the composition in a liquid crystal state in the coated film. Examples of the supporting substrate that can be used herein include glass and a plastic film. Examples of a plastic film include films of polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin.

Examples of the cycloolefin resin include a norbornene resin and a dicyclopentadiene resin, but the invention is not limited thereto. Among these, those having no unsaturated bond or having unsaturated bonds that have been hydrogenated are preferably used. Examples thereof include a hydrogenated product of a ring-opening (co)polymer of one or plural kinds of norbornene monomers, an addition (co)polymer of one or plural kinds of norbornene monomers, an addition copolymer of a norbornene monomer and an olefin monomer (such as ethylene and an α-olefin), an addition copolymer of a norbornene monomer and a cycloolefin monomer (such as cyclopentene, cyclooctene and 5,6-dihydroxycyclopentadiene), and modified products thereof. Specific examples thereof include Zeonex and Zeonor (available from Nippon Zeon Corp.), Arton (available from JSR Corporation), TOPAS (available from Ticona, Inc.), Apel (available from Mitsui Chemicals, Inc.), Escena (available from Sekisui Chemical Co., Ltd.) and Optorez (available from Hitachi Chemical Co., Ltd.).

The plastic film may be a uniaxially stretched film or a biaxially stretched film. The plastic film may be subjected to a surface treatment, such as a hydrophilic treatment, e.g., a corona treatment and a plasma treatment, and a hydrophobic treatment. While the method for the hydrophilic treatment is not particularly limited, a corona treatment and a plasma treatment are preferred, and a plasma treatment is particularly preferred. The plasma treatment can be effected by a method disclosed, for example, in JP-A-2002-226616, JP-A-2002-121648. An anchor coating layer may be formed for improving adhesion between the liquid crystal film and the plastic film. The anchor coating layer may be formed of an inorganic material or an organic material as far as the layer improves adhesion between the liquid crystal film and the plastic film. The plastic film may be a laminated film. Instead of the plastic film, a metallic substrate, such as aluminum, iron and copper, having slit grooves formed on the surface thereof, and a glass substrate, such as alkali glass, borosilicate glass and flint glass, having been etched to form grooves in a slit form may also be used.

In the case where a liquid crystal film of homogeneous alignment or hybrid alignment is to be formed, the supporting substrate, such as glass and a plastic films, is subjected to a physical or mechanical surface treatment, such as rubbing, before forming a coated film of the polymerizable liquid crystal composition. In the case where a liquid crystal film of homeotropic alignment is to be formed, such a surface treatment as rubbing is not carried out in many cases, but the rubbing treatment may be carried out for preventing alignment defects from occurring. The rubbing treatment may be carried out by an arbitrary method, and in general, the following methods may be employed. A rubbing cloth formed of such a material as rayon, cotton or polyamide is wound on a metallic roll, and the roll is rotated and moved in a state where the roll is in contact with the supporting substrate or the polymer film, or the supporting substrate is moved with the rotated roll staying. The rubbing treatment may be carried out directly on the supporting substrate, or on the plastic film formed on the supporting substrate in advance. The method for the rubbing treatment has been described above. An alignment capability may be imparted to the surface of the supporting substrate by oblique vapor deposition of silicon oxide depending on the kind of the supporting substrate.

Examples of a coating method for obtaining a coated film having a uniform thickness upon coating the polymerizable liquid crystal composition or a solution thereof include a spin coating method, a microgravure coating method, a gravure coating method, a wire bar coating method, a dip coating method, a spray coating method, a meniscus coating method and a die coating method. In particular, a wire bar coating method and the like, in which a shearing force is applied to the liquid crystal composition upon coating, may be employed in the case where the alignment of the liquid crystal composition is controlled without a surface treatment, such as rubbing, on the substrate.

Upon preparing the solution of the polymerizable liquid crystal composition, the compound (5) may be used after diluting with a solvent. The solvent is selected from such solvents that have sufficient solubility with the compound (5) and do not impair the stability and uniformity of the homeotropic alignment of the polymerizable liquid crystal composition, which is an advantage of the invention. Examples of the solvent include those solvents that have been described for preparation of the solution of the polymerizable liquid crystal composition. The amount of the solvent used may be set within such a range that the stability of the polymerizable liquid crystal composition is not impaired.

Upon coating the solution of the polymerizable liquid crystal composition of the invention, the solvent is removed after coating to form a polymerizable liquid crystal layer, i.e., a layer of the polymerizable liquid crystal composition, having a uniform thickness on the supporting substrate. The conditions for removing the solvent are not particularly limited, and the coated film may be dried to such an extent that the solvent has been substantially removed, and the coated film of the polymerizable liquid crystal composition loses flowability. The solvent can be removed by air drying at room temperature, drying with a hot plate, drying in a drying furnace, blowing warm air or hot air, or the like. The polymerizable liquid crystal composition in the coated film may complete a nematic alignment during the drying operation of the coated film in some cases, depending on the kinds and the compositional ratios of the compounds used in the polymerizable liquid crystal composition. Accordingly, the coated film after completing the drying step can be subjected to a polymerizing step without subjecting to a heat-treating step described later.

Preferred ranges of the conditions, such as the temperature and time for the heat treatment of the coated film, the wavelength of light used for light irradiation, the amount of light radiated from a light source, vary depending on the kinds and compositional ratios of the compounds used in the polymerizable liquid crystal composition, and the presence or absence and the addition amount of the photopolymerization initiator. Accordingly, the conditions including the temperature and time for the heat treatment of the coated film, the wavelength of light used for light irradiation, and the amount of light radiated from a light source described later are considered to be approximate ranges.

The heat treatment of the coated film is preferably carried out under such conditions that the solvent is removed, and homogeneous alignment of the polymerizable liquid crystal is obtained. The heat treatment may be carried out at a temperature higher than the liquid crystal phase transition temperature of the polymerizable liquid crystal composition. One example of the heat-treating method is a method of heating the coated film to a temperature where the polymerizable liquid crystal composition exhibits a nematic liquid crystal phase, whereby the polymerizable liquid crystal composition in the coated film forms nematic alignment. Nematic alignment may be formed by changing the temperature of the coated film within a temperature range where the polymerizable liquid crystal composition exhibits a nematic liquid crystal phase. In this method, the coated film is heated to a high temperature region within the aforementioned temperature range to complete substantially nematic alignment of the coated film, and then the temperature is decreased to make alignment with higher regularity. In both cases using the heat-treating methods, the heat-treating temperature may be from room temperature to 120° C., preferably room temperature to 100° C., more preferably from room temperature to 90° C., and further preferably from room temperature to 85° C. The heat-treating time is generally from 5 seconds to 2 hours, preferably from 10 seconds to 40 minutes, and more preferably from 20 seconds to 20 minutes. In order to increase the temperature of the layer containing the polymerizable liquid crystal composition to the prescribed temperature, the heat-treating time is preferably 5 seconds or more. In order to prevent the productivity from being deteriorated, the heat-treating time is preferably 2 hours or less. The polymerizable liquid crystal layer of the invention is thus completed in this manner.

The nematic alignment state of the polymerizable liquid crystal compounds formed in the polymerizable liquid crystal layer is fixed by polymerizing the polymerizable liquid crystal composition through irradiation of light. The wavelength of the light used for the light irradiation is not particularly limited, and an electron beam, an ultraviolet ray, a visible ray, an infrared ray (heat ray) and the like may be used. In general, an ultraviolet ray or a visible ray may be used. The wavelength is generally in a range of from 150 to 500 nm, preferably in a range of from 250 to 450 nm, and more preferably in a range of from 300 to 400 nm. Examples of the light source include a low pressure mercury lamp (such as a bactericidal lamp, a fluorescent chemical lamp and a black light lamp), a high pressure discharge lamp (such as a high pressure mercury lamp and a metal halide lamp), and a short arc discharge lamp (such as a super high pressure mercury lamp, a xenon lamp and a mercury xenon lamp). Preferred examples of the light source include a metal halide lamp, a xenon lamp, a super high pressure mercury lamp and a high pressure mercury lamp. The wavelength range of the light source used for irradiation may be selected by inserting a filter between the light source and the polymerizable liquid crystal layer to pass only the specific wavelength range. The amount of light radiated from the light source is generally from 2 to 5,000 mJ/cm$^2$, preferably from 10 to 3,000 mJ/cm$^2$, and more preferably from 100 to 2,000 mJ/cm$^2$. The temperature condition upon irradiation of light is preferably set similarly to the heat-treating temperature. The atmosphere upon polymerization may be any of a nitrogen atmosphere, an inert gas atmosphere and an air atmosphere, and a nitrogen atmosphere and an inert gas atmosphere are preferred from the standpoint of enhancement of the curing property.

In the case where the polymerizable liquid crystal layer of the invention and a liquid crystal film obtained by polymerizing it through light or heat are used in various optical devices, and in the case where they are used as an optical compensation device used in a liquid crystal display device, it is considerably important to control the distribution of the tilt angle thereof in the thickness direction.

One example of the method of controlling the tilt angle is a method of selecting the kinds and compositional ratios of the liquid crystal compounds used in the polymerizable liquid crystal composition. The tilt angle can be controlled by adding other components to the polymerizable liquid crystal composition. The tilt angle of the liquid crystal film can also be controlled by the kind of the solvent and the concentration of the solute in the polymerizable liquid crystal composition, and the kind and amount of the surfactant added as one of the other components. The tilt angle of the liquid crystal film can also be controlled by the kind and the rubbing condition of the supporting substrate or the polymer coated film, and the drying conditions and the heat-treating conditions of the coated film of the polymerizable liquid crystal composition. Furthermore, the irradiation atmosphere and the temperature upon irradiation of light in the photopolymerization step after alignment also influence the tilt angle of the liquid crystal film. In other words, it can be considered that substantially the all conditions in the production process of the liquid crystal film influence the tilt angle in any way. Therefore, an arbitrary tilt angle can be obtained by optimizing the polymerizable liquid crystal composition and by appropriately selecting the various conditions in the production process of the liquid-crystal film.

In homogeneous alignment, the tilt angle is close to 0°, and particularly is distributed from 0 to 50, over the substrate interface to the free interface. This alignment state is obtained by forming a coated film by coating the polymerizable liquid crystal composition of the invention that contains the components (A) and (B) and the nonionic surfactant on the surface of the supporting substrate that has been subjected to a surface treatment, such as rubbing.

For obtaining uniform homogeneous alignment in the invention, it is preferred to use the nonionic surfactant in an amount of from 0.0001 to 0.03 in terms of a weight ratio based on the total weight of the components (A) and (B). Preferred examples of the nonionic surfactant used include a fluorine-related nonionic surfactant, a silicone-related nonionic surfactant and a hydrocarbon-related nonionic surfactant. While the components (C) and (D) are not essential, the component (C) may be used for controlling the birefringence, and the component (D) may be used for controlling the tilt angle, the melting point and the like. The amount of the nonionic surfactant used in the case where the components (C) and (D) are used in combination is preferably from 0.0001 to 0.03 in terms of a weight ratio based on the total weight of the components (A) to (D).

Preferred examples of the component compounds for providing homogeneous alignment include the following compounds.

Preferred examples of the compound (1) include the compounds (1-1-2), (1-3-1), (1-15-1), (1-16-1), (1-17-1), (1-18-1), (1-25-1), (1-26-1), (1-27-2), (1-28-2), (1-33-1), (1-34-1) (1-35-1), (1-36-1), (1-37-0.1) and (1-38-1). Plural kinds of the compounds (1) may be used in combination.

Preferred examples of the compound (2) include the compounds (2-A2-11-A1) to (2-A2-11-A4), (2-A2-16-A1), (2-A2-16-A2), (2-A2-16-A5), (2-A2-16-A6) and (2-A2-16-A9). Plural kinds of the compounds (2) may be used in combination.

Preferred examples of the compound (3) include the compounds (3-1-A1), (3-1-A3), (3-1-B1), (3-1-B3), (3-1-C1), (3-1-C2), (3-1-D1), (3-1-D2), (3-2-C1), (3-2-C2), (3-2-C5), (3-2-C6), (3-2-D1) and (3-2-D2). Plural kinds of the compounds (3) may be used in combination.

Preferred examples of the compound (4) include the compounds (4-1-A1), (4-1-A2), (4-1-B1), (4-1-B2), (4-1-C1), (4-1-C2), (4-1-C5), (4-1-C6), (4-1-D1), (4-1-D2), (4-1-D5) and (4-1-D6). Plural kinds of the compounds (4) may be used in combination.

There are cases where uniform homogeneous alignment is difficult to be provided according to the aforementioned constitution, depending on the kinds of the polymerizable liquid crystal compounds and the formulation of the polymerizable liquid crystal composition. In such cases, it is considered that the tilt alignment property is dominant, and thus uniform homogeneous alignment can be obtained by increasing the amount of the component (A), minimizing the amount of the component (B) or increasing the amount of the nonionic surfactant.

In homeotropic alignment, the tilt angle is distributed from 85 to 90°, over the substrate interface to the free interface. This alignment state is obtained by forming a coated film by coating the polymerizable liquid crystal composition of the invention that contains the components (A), (B) and (D) and the compound (5) on the surface of the supporting substrate.

For obtaining uniform homeotropic alignment in the invention, it is preferred to use the compound (5) in an amount of from 0.01 to 0.15, and more preferably from 0.03 to 0.10, in terms of a weight ratio based on the total weight of the components (A) to (D). Plural kinds of the compounds (5) may be used in combination. While the component (C) is not essential, the component (C) may be used in the case where the birefringence is necessarily controlled. The amount of the compound (5) used in the case where the component (C) is used in combination is preferably from 0.03 to 0.10 in terms of a weight ratio based on the total weight of the components (A) to (D).

Preferred examples of the component compounds for providing homeotropic alignment include the following compounds.

Preferred examples of the compound (1) include the compounds (1-27-2), (1-27-3), (1-28-2), (1-28-3), (1-29-1), (1-31-1), (1-33-1), (1-34-1), (1-35-1), (1-36-1), (1-37-1) and (1-38-1). Plural kinds of the compounds (1) may be used in combination.

Preferred examples of the compound (2) include the compounds (2-A2-11-A1), (2-A2-11-A2), (2-A2-16-A1) and (2-A2-16-A2). Plural kinds of the compounds (2) may be used in combination.

Preferred examples of the compound (3) include the compounds (3-1-A1), (3-1-A3), (3-1-B1), (3-1-B3), (3-2-C1), (3-2-C2), (3-2-C5) and (3-2-C6). Plural kinds of the compounds (3) may be used in combination.

Preferred examples of the compound (4) include the compounds (4-1-A1), (4-1-A2), (4-1-C1), (4-1-C2), (4-1-C5), (4-1-C6), (4-1-D1), (4-1-D2), (4-1-D5) and (4-1-D6). Plural kinds of the compounds (4) may be used in combination.

For forming uniform homeotropic alignment, the compound (5) may be added directly to the polymerizable liquid crystal composition or added thereto after diluting with a solvent or the like. There are cases where uniform homeotropic alignment is difficult to be provided according to the aforementioned constitution, depending on the kinds of the polymerizable liquid crystal compounds and the formulation of the polymerizable liquid crystal composition. In such cases, it is considered that the homogeneous alignment property is dominant, and thus uniform homeotropic alignment can be obtained by increasing the amount of the component (D) or the compound (5) added or decreasing the amount of the component (C) to the necessary minimum amount. Formation of uniform homeotropic alignment can be facilitated by using a supporting substrate having a surface that has polarity through a hydrophilic treatment or the like. In this case, uniform homeotropic alignment can be obtained without a surface treatment, such as rubbing.

In the case where a vertical alignment agent is formed on the supporting substrate, the supporting substrate may be coated with a silane coupling agent, such as octadecyltriethoxysilane, lecithin, a chromium complex, a polyimide alignment layer for vertical alignment, a low-temperature (less than 180° C.) baked film of a polyamic acid alignment layer, a high-temperature (180° C. or more) baked film of a polyamic acid alignment layer, a water-soluble silsesquioxane film or a side-chain type liquid crystal polymer.

Hybrid alignment is such a state that the alignment vector of liquid crystal uprises from the parallel direction to the vertical direction with distance from the substrate. The tilt angle is, for example, from 5 to 85°. This alignment state can be obtained by forming a coated film of the polymerizable liquid crystal composition that contains the components (A), (B) and (D) as polymerizable components on the surface of the supporting substrate that has been subjected to a surface treatment, such as rubbing.

For obtaining uniform hybrid alignment in the invention, it is preferred to use the components (A), (B) and (D). While the component (C) is not essential, the component (C) may be used in the case where the birefringence is controlled. While the nonionic surfactant is not essential, the nonionic surfactant may be used in combination in such a minimum amount that does not affect the tilt angle upon improving the leveling property.

Preferred examples of the component compounds for providing hybrid alignment include the following compounds.

Preferred examples of the compound (1) include the compounds (1-1-2), (1-3-1), (1-15-1), (1-16-1), (1-17-1), (1-18-1), (1-19-1), (1-20-1), (1-21-1), (1-22-1), (1-23-1), (1-24-1), (1-25-1), (1-26-1), (1-27-2), (1-28-2), (1-33-1), (1-34-1), (1-35-1), (1-36-1), (1-37-1) and (1-38-1). Plural kinds of the compounds (1) may be used in combination.

Preferred examples of the compound (2) include the compounds (2-A2-11-A1) to (2-A2-11-A4), (2-A2-16-A1), (2-A2-16-A2), (2-A2-16-A5) and (2-A2-16-A6). Plural kinds of the compounds (2) may be used in combination.

Preferred examples of the compound (3) include the compounds (3-1-A1), (3-1-A3), (3-1-B1), (3-1-B3), (3-1-C1), (3-1-C2), (3-1-D1), (3-1-D2), (3-2-C1), (3-2-C2), (3-2-C5), (3-2-C6), (3-2-D1) and (3-2-D2). Plural kinds of the compounds (3) may be used in combination.

Preferred examples of the compound (4) include the compounds (4-1-A1), (4-1-A2), (4-1-B1), (4-1-B2), (4-1-C1), (4-1-C2), (4-1-C5), (4-1-C6), (4-1-D1), (4-1-D2), (4-1-D5) and (4-1-D6). Plural kinds of the compounds (4) may be used in combination.

A suitable thickness of the liquid crystal film varies depending on the retardation corresponding to the target device and the birefringence of the liquid crystal film. Therefore, the suitable range thereof cannot be determined strictly and may be generally from 0.05 to 50 μm, preferably from 0.1 to 20 μm, and more preferably from 0.5 to 10 μm. The liquid crystal film preferably has a haze of 1.5% or less, and more preferably 1.0% or less, and a transmittance of 80% or more, and more preferably 95% or more. The conditions of transmittance preferably satisfied in the visible ray region.

The liquid crystal film is effective as an optical compensation device applied to a liquid crystal display device (particularly, a liquid crystal display device of an active matrix type or a passive matrix type). Examples of the type of the liquid crystal display device, to which the liquid crystal film is applied as an optical compensation film, include an IPS (in-plane switching) type, a display having switch in an optically isotropic phase (described, for example, in WO 02/93244), a TN (twisted nematic) type, an STN (super twisted nematic) type, an ECB (electrically controlled birefringence) type, a DAP (deformation of aligned phases) type, a CSH (color super homeotropic) type, a VA (vertical alignment) type, a VAN/VAC (vertically aligned nematic/cholesteric) type, an MVA (multi-domain vertical alignment) type, a PVA (patterned vertical alignment) type, an OCB (optically compensated birefringence) type, an R-OCB (reflective optically compensated birefringence) type, an HAN (hybrid aligned nematic) type, an OMI (optical mode interference) type and SBE (super birefringence effect) type. Furthermore, the liquid crystal film can be used as a phase retarder for a display device of a guest-host type, a ferroelectric type or antiferroelectric type. Preferred examples of the type of the liquid crystal display device include a TN type, an STN type, a VA type and an IPS type, and particularly an active matrix type display. The optimum values of the parameters demanded for the anisotropic polymer, such as the distribution of tilt angle in the thickness direction and the thickness, strongly depend on the kind and the optical parameters of the liquid crystal display device that is to be compensated, and thus vary depending on the kind of the device.

The liquid crystal film can be used as an optical device having a polarizing plate and the like integrated therewith, and in this case, the liquid crystal film is disposed outside the liquid crystal cell. However, the liquid crystal film as an optical compensation device can be disposed inside the liquid crystal cell since it suffers no or less elution of impurities into the liquid crystal filled in the cell. For example, by applying the techniques disclosed in JP-A-2006-285014 and JP-A-2008-01943, the polymerizable liquid crystal layer of the invention can be formed on a color filter to enhance the function of the color filter.

EXAMPLES

The invention will be described in more detail below with reference to examples, but the invention is not construed as being limited to the examples. Evaluation methods used in the examples are shown below.
<Polymerization Conditions>
A polymerizable composition was irradiated with light having an intensity of 30 mW/cm$^2$ (365 nm) by using a 250 W super high pressure mercury lamp at room temperature in a nitrogen atmosphere for 30 seconds.
<Evaluation of Homogeneous Alignment>
(1) Preparation of Glass Substrate with Rubbed Alignment Layer
Polyamic acid for a low pre-tilt angle (horizontal alignment mode) (Lixon Aligner PIA-5310, available from Chisso Corporation) was spin-coated on a glass substrate having a thickness of 1.1 mm, and after removing the solvent by heating, the coated film was baked at 210° C. for 30 minutes and then subjected to a rubbing treatment.

(2) Confirmation of Uniformity of Liquid Crystal Alignment
The substrate having the liquid crystal film was observed with a polarization microscope to confirm the presence of alignment defects.
<Evaluation of Hybrid Alignment>
(3) Preparation of Glass Substrate with Rubbed Alignment Layer
Polyamic acid for a high pre-tilt angle (OCB alignment mode) (Lixon Aligner PIA-5580, available from Chisso Corporation) was spin-coated on a glass substrate having a thickness of 1.1 mm, and after removing the solvent by heating, the coated film was baked at 210° C. for 30 minutes and then subjected to a rubbing treatment.
(4) Confirmation of Uniformity of Liquid Crystal Alignment
The substrate having the liquid crystal film was observed with a polarization microscope as similar to the evaluation of homogeneous alignment to confirm the presence of alignment defects.
<Evaluation of Homeotropic Alignment>
(5) Preparation of Glass Substrate with Rubbed Alignment Layer
As a supporting substrate for evaluation, non-alkali glass, or slide glass, which was spin-coated with a low pre-tilt angle (horizontal alignment mode) (Lixon Aligner PIA-5310, available from Chisso Corporation), followed by subjecting to removal of the solvent and baking at 210° C. for 30 minutes, was used without a rubbing treatment.
(6) Confirmation of Uniformity of Liquid Crystal Alignment
The substrate having the liquid crystal film was held between two polarizing plates having been disposed as crossed nicols. In the case where a dark field was viewed by observing the substrate from the front, and a bright field was viewed by observing the substrate in the vertical direction or the horizontal direction, it was evaluated that the liquid crystal film exhibited homeotropic alignment since the phenomenon showed that the alignment vector of the liquid crystal skeleton was perpendicular to the glass substrate. With respect to the uniformity of the homeotropic alignment, the substrate having the liquid crystal film was held between two polarizing plates having been disposed as crossed nicols, and in the case where light passing through the liquid crystal film due to alignment defects of the liquid crystal was not observed (dark field), it was evaluated that the liquid crystal film exhibited uniform alignment.
<Measurement With Ellipsometer: Confirmation of Alignment State>
OPTIPRO ellipsometer, available from Shintech Inc., Ltd., was used. The substrate having the liquid crystal film was irradiated with light having a wavelength of 550 nm. The retardation was measured by decreasing the incident angle of the light with respect to the film surface from 90°, and the state of alignment was confirmed. The retardation of phase is expressed by $\Delta n \times d$, wherein $\Delta n$ represents the optical anisotropy, and d represents the thickness of the polymer film.

The compounds used in Examples are shown below.

(1-1-2)

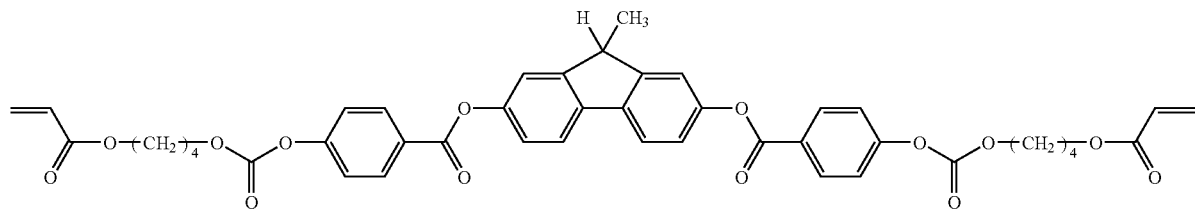

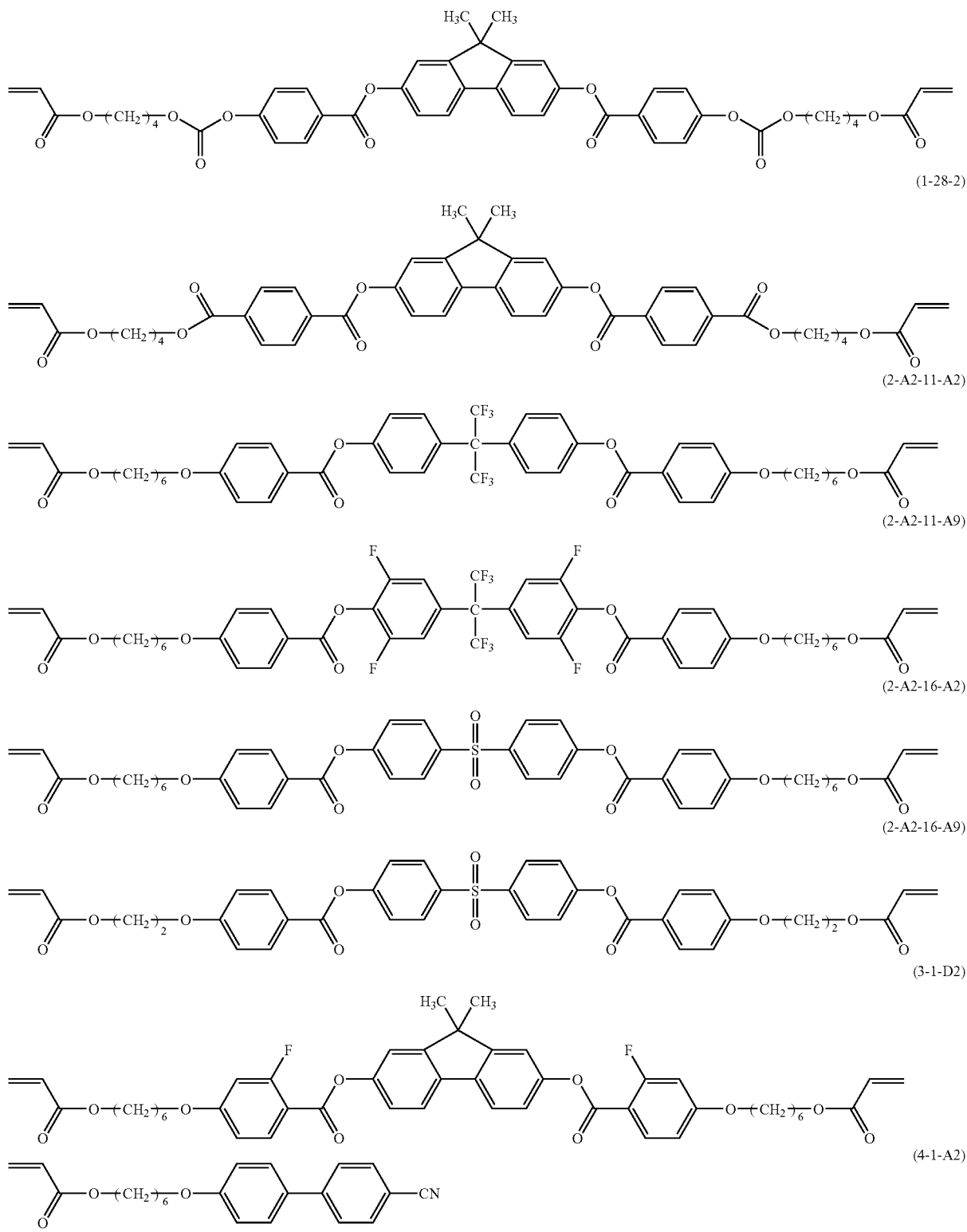
The compounds (1-1-2), (1-3-1) and (1-28-2) were synthesized according to the method disclosed in WO 2008/136265.
The compounds (2-A2-11-A2), (2-A2-16-A2) and (2-A2-16-A9) were synthesized according to the method disclosed in JP-A-2007-16213, and the compound (2-A2-11-A9) was synthesized according to the method disclosed in JP-A-2008-133344.
The compound (3-1-D2) was synthesized according to the method disclosed in JP-A-2006-307150.

The compound (4-1-A2) was synthesized according to the similar method as in Macromolecules, vol. 26, pp. 6132-6134 (1993).

Example 1

Preparation of Polymerizable Liquid Crystal Composition (1)

The compounds (1-28-2), (2-A2-11-A2) and (4-1-A2) were mixed at a weight ratio of 65/5/30. The resulting composition was designated as MIX 1. A polymerization initiator, Irgacure 907, available from Ciba Japan, Co., Ltd., in a weight ratio of 0.03 and a fluorine-related nonionic surfactant, FTX-218, available from Neos Co., Ltd., in a weight ratio of 0.002 were added to MIX 1. Propylene glycol monomethyl ether acetate (PGMEA) was added to the resulting composition to prepare a polymerizable liquid crystal composition (1) having a monomer concentration of 25% by weight.

Polyamic acid for a low pre-tilt angle (horizontal alignment mode) (Lixon Aligner PIA-5310, available from Chisso Corporation) was spin-coated on a glass substrate (S-1112, available from Matsunami Glass Industries, Ltd.), and after drying at 80° C. for 3 minutes, the coated film baked at 21° C. for 30 minutes, and then subjected to a rubbing treatment with a rayon rubbing cloth. The polymerizable liquid crystal composition (1) was coated by a spin coating method on the glass substrate having the rubbed polyamic acid film. The substrate was heated to 80° C. for 3 minutes and cooled at room temperature for 3 minutes, and the coated film, from which the solvent was removed, was polymerized with an ultraviolet ray under a nitrogen stream to provide a liquid crystal film having uniform homogeneous alignment. The measurement of retardation of the film provided the results shown in FIG. 1.

Example 2

Preparation of Polymerizable Liquid Crystal Composition (2)

A polymerization initiator, Irgacure 907, available from Ciba Japan Co., Ltd., in a weight ratio of 0.03 was added to MIX 1 described in Example 1. Propylene glycol monomethyl ether acetate (PGMEA) was added to the resulting composition to prepare a polymerizable liquid crystal composition (2) having a monomer concentration of 25% by weight.

Figure 2:
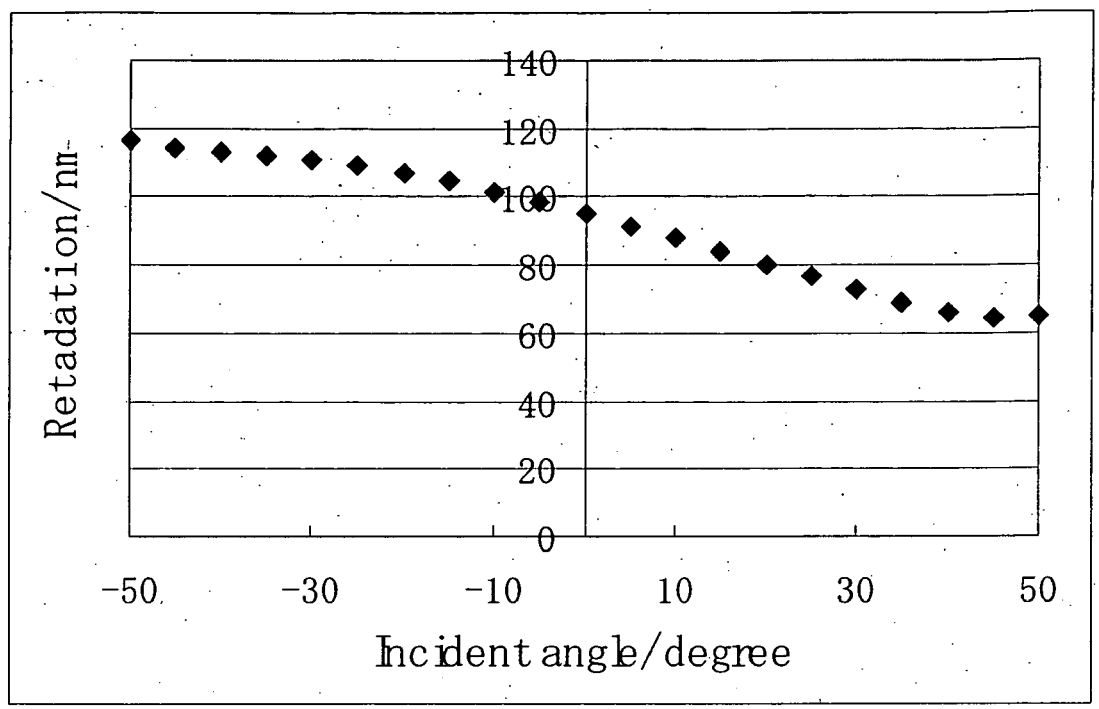
FIG. 2 is an illustration showing results of measurement of retardation for a liquid crystal film (hybrid alignment) obtained in Example 2.

Polyamic acid for a high pre-tilt angle (OCB mode) (Lixon Aligner PIA-5580, available from Chisso Corporation) was spin-coated on a glass substrate (S-1112, available from Matsunami Glass Industries, Ltd.), and after drying at 80° C. for 3 minutes, the coated film baked at 210° C. for 30 minutes, and then subjected to a rubbing treatment with a rayon rubbing cloth. The polymerizable liquid crystal composition (2) was coated by a spin coating method on the glass substrate having the rubbed polyamic acid film. The substrate was heated to 80° C. for 3 minutes and cooled at room temperature for 3 minutes, and the coated film, from which the solvent was removed, was polymerized with an ultraviolet ray under a nitrogen stream to provide a liquid crystal film having uniform hybrid alignment. The measurement of retardation of the film provided the results shown in FIG. 2.

Example 3

Preparation of Polymerizable Liquid Crystal Composition (3)

A polymerization initiator, Irgacure 907, available from Ciba Japan Co., Ltd., in a weight ratio of 0.03 and the compound (5-1-1) (SILA-ACE S-330) in a weight ratio of 0.10 were added to MIX 1 described in Example 1. Propylene glycol monomethyl ether acetate (PGMEA) was added to the resulting composition to prepare a polymerizable liquid crystal composition (3) having a monomer concentration of 25% by weight.

Figure 3:
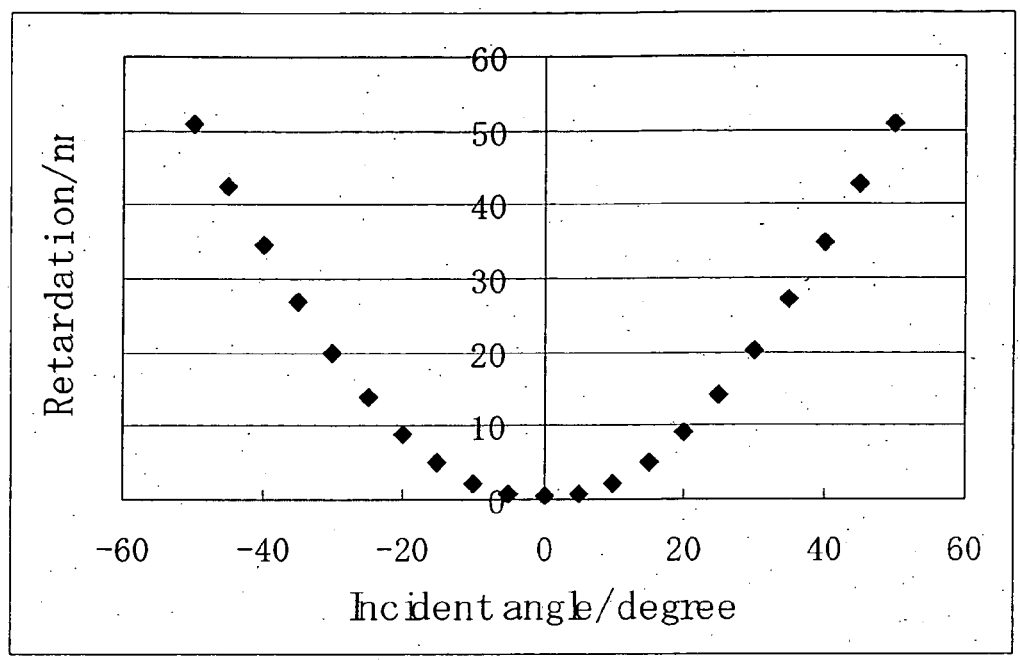
FIG. 3 is an illustration showing results of measurement of retardation for a liquid crystal film (homeotropic alignment) obtained in Example 3.

Polyamic acid for a low pre-tilt angle (horizontal alignment mode) (Lixon Aligner PIA-5310, available from Chisso Corporation) was spin-coated on a glass substrate (S-1112, available from Matsunami Glass Industries, Ltd.), and after drying at 80° C. for 3 minutes, the coated film baked at 210° C. for 30 minutes. The polymerizable liquid crystal composition (3) was coated by a spin coating method on the glass substrate having the polyamic acid film without a rubbing treatment. The substrate was heated to 80° C. for 3 minutes and cooled at room temperature for 3 minutes, and the coated film, from which the solvent was removed, was polymerized with an ultraviolet ray under a nitrogen stream to provide a liquid crystal film having uniform homeotropic alignment. The measurement of retardation of the film provided the results shown in FIG. 3.

Example 4

A liquid crystal film was formed in the same manner as in Example 3 except that non-alkali glass (1737 Glass, available from Corning, Inc.) was used as a supporting substrate without a thin film of polyamic acid. The resulting liquid crystal film had uniform homeotropic alignment as similar to Example 3 and had retardation in the similar tendency as in Example 3.

Example 5

The compounds (1-1-2), (2-A2-11-A2) and (4-1-A2) were mixed at a weight ratio of 65/5/30. The resulting composition was designated as MIX 2. A liquid crystal film was formed in the same manner as in Example 4 except that MIX 2 was used. The resulting liquid crystal film had uniform homeotropic alignment as similar to Example 4 and had retardation in the similar tendency as in Example 4.

Comparative Example 1

The compounds (1-28-1) and (4-1-A2) were mixed at a weight ratio of 65/35 without the use of the compound (2-A2-11-A2) having a bisphenol skeleton. The resulting composition was designated as MIX 3. A polymerizable liquid crystal composition (5) was prepared in the same manner as in Example 3 except that MIX 3 was used, and a liquid crystal film was formed in the same manner as in Example 3. A liquid crystal film having homeotropic alignment was obtained but had low homogeneity with alignment defects.

Comparative Example 2

A polymerizable liquid crystal composition (6) was prepared in the same manner as in Example 2 except that MIX 3 described in Comparative Example 1 was used, and a liquid crystal film was formed in the same manner as in Example 2. A liquid crystal film having hybrid alignment was obtained but had low homogeneity with alignment defects.

Comparative Example 3

A polymerizable liquid crystal composition (7) was prepared in the same manner as in Example 1 except that MIX 3 described in Comparative Example 1 was used, and a liquid crystal film was formed in the same manner as in Example 1. A liquid crystal film having homogeneous alignment was obtained. The resulting liquid crystal film had uniform alignment and had retardation in the similar tendency as in Example 1.

In Comparative Examples 1 to 3 using no compound having a bisphenol skeleton, a liquid crystal film having uniform alignment was obtained only in homogeneous alignment. Accordingly, it was understood that the use of the compound having a bisphenol skeleton enabled production of a liquid crystal film having uniform alignment in various alignment states.

Example 6

A liquid crystal film was formed in the same manner as in Example 4 except that the compound (2-A2-16-A2) was used instead of the compound (2-A2-11-A2) in MIX 1. The resulting liquid crystal film had uniform homeotropic alignment as similar to Example 4 and had retardation in the similar tendency as in Example 4.

Example 7

Figure 4:
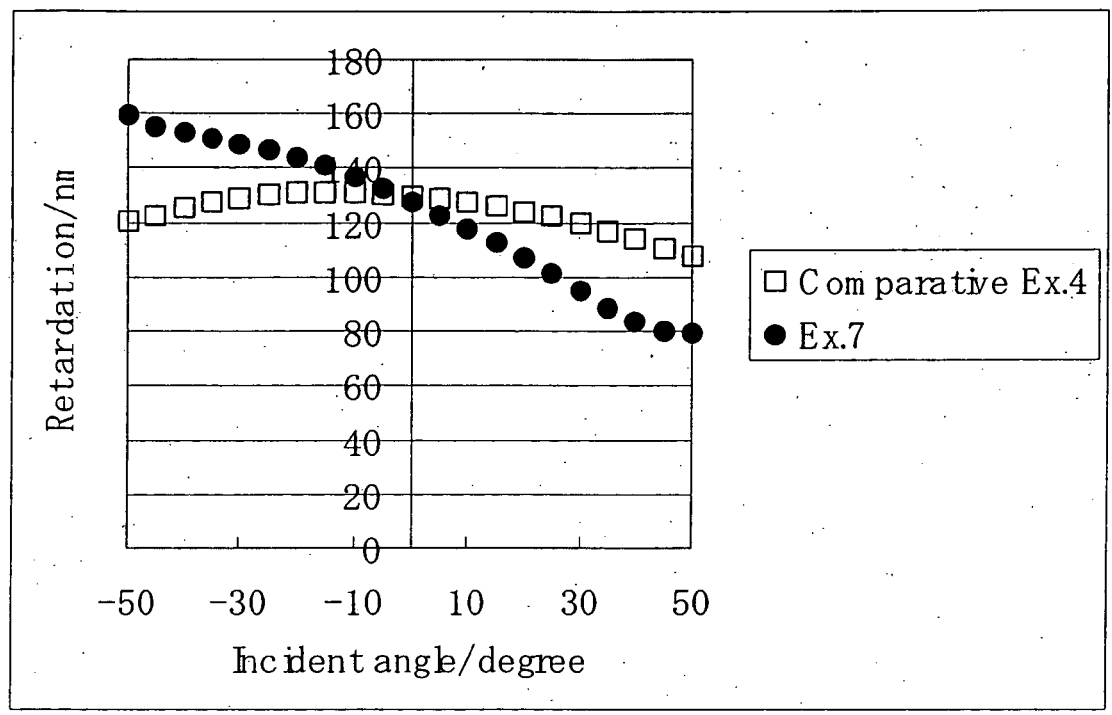
FIG. 4 is an illustration showing results of measurement of retardation for liquid crystal films (hybrid alignment) obtained in Example 7 and Comparative Example 4.

A liquid crystal film was formed in the same manner as in Example 2 except that the compounds (1-28-2), (3-1-D2), (2-A2-11-A2) and (4-1-A2) were mixed in a weight ratio of 34/39/3/24, and a mixed solvent containing PGMEA and methyl 3-methoxypropionate (weight ratio: 7/3) was used. The resulting liquid crystal film had uniform hybrid alignment and retardation shown in FIG. 4.

Comparative Example 4

A liquid crystal film was formed in the same manner as in Example 2 except that the compounds (1-28-2), (3-1-D2) and (4-1-A2) were mixed in a weight ratio of 35/40/25. The resulting liquid crystal film had uniform alignment, but the liquid crystal showed substantially no tilt and thus was insufficient as hybrid alignment. The liquid crystal film had retardation shown in FIG. 4.

Example 8

A liquid crystal film was formed in the same manner as in Example 7 except that the compound (2-A2-11-A9) was used instead of the compound (2-A2-11-A2). The resulting liquid crystal film had uniform hybrid alignment as similar to Example 7 and had retardation in the similar tendency as in Example 7.

Example 9

A liquid crystal film was formed in the same manner as in Example 2 except that the compounds (1-28-2); (1-3-1), (2-A2-11-A2) and (4-1-A2) were mixed in a weight ratio of 34/39/3/24. The resulting liquid crystal film had uniform hybrid alignment as similar to Example 2 and had retardation in the similar tendency as in Example 2.

Comparative Example 5

A liquid crystal film was formed in the same manner as in Example 2 except that the compounds (1-28-2), (1-3-1) and (4-1-A2) were mixed in a weight ratio of 35/40/25. The resulting liquid crystal film had uniform alignment, but the liquid crystal showed substantially no tilt and thus was insufficient as hybrid alignment. The liquid crystal film had retardation as similar to that shown in FIG. 4.

Example 10

A liquid crystal film was formed in the same manner as in Example 1 except that the compounds (1-1-2), (1-3-1) and (2-A2-16-A2) were mixed in a weight ratio of 40/40/20, and a mixed solvent containing PGMEA and methyl 3-methoxypropionate (weight ratio: 1/9) was used. The resulting liquid crystal film had uniform homogeneous alignment and retardation as similar to that shown in FIG. 1.

Example 11

A liquid crystal film was formed in the same manner as in Example 1 except that the compounds (1-1-2), (1-3-1) and (2-A2-16-A9) were mixed in a weight ratio of 40/40/20, and a mixed solvent containing PGMEA and methyl 3-methoxypropionate (weight ratio: 1/9) was used. The resulting liquid crystal film had uniform homogeneous alignment and retardation as similar to that shown in FIG. 1.

Comparative Example 6

A liquid crystal film was formed in the same manner as in Example 10 except that the compounds (1-1-2) and (1-3-1) were mixed in a weight ratio of 50/50. The resulting liquid crystal film suffered significant crystallization upon drying and was difficult to be evaluated.

The polymerizable liquid crystal composition according to the invention has good solubility in a solvent with high safety, such as PGMEA, can be provided, whereby various alignment states can be controlled. The polymer according to the invention can be utilized, for example, as constitutional elements of a liquid crystal display device, such as a retardation plate, a polarizing element, an antireflection film, a selective reflection film, a brightness enhancement film and a viewing angle compensation film.

What is claimed is:

1. A polymerizable liquid crystal composition comprising at least one compound selected from the group of compounds represented by the formula (1) as a component (A) and at least one compound selected from the group of compounds represented by the formula (2) as a component (B), wherein the liquid crystal composition may further contain at least one compound selected from the group of compounds represented by the formulae (3-1) and (3-2) as a component (C), and may further contain at least one compound selected from the group of compounds represented by the formula (4) as a component (D):

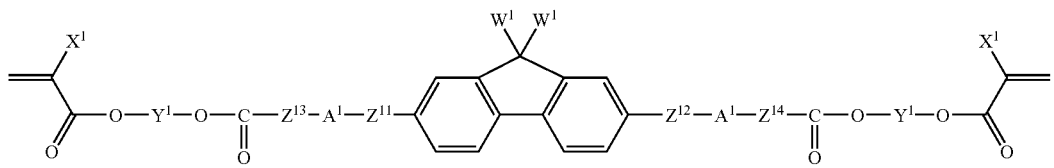

(1)

wherein
W¹ independently represents hydrogen, fluorine, chlorine, methyl or ethyl;
X¹ independently represents hydrogen, fluorine, methyl or trifluoromethyl;
$Z^{11}$ represents a single bond, —COO—, —CH=CH—COO—, —CH$_2$CH$_2$—COO—, —CH$_2$O—, —CONH—, —(CH$_2$)$_4$—, —CH$_2$CH$_2$— or —C≡C—;
$Z^{12}$ represents a single bond, —OCO—, —OCO—CH=CH—, —OCO—CH$_2$CH$_2$—, —OCH$_2$—, —NHCO—, —(CH$_2$)$_4$—, —CH$_2$CH$_2$— or —C≡C—;
$Z^{13}$ and $Z^{14}$ each independently represent a single bond or —O—;
A¹ independently represents 1,4-cyclohexylene, 1,4-phenylene, 1,3-phenylene, pyridin-2,5-diyl, pyrimidin-2,5-diyl, naphthalen-2,6-diyl or tetrahydronaphthalen-2,6-diyl, provided that in the 1,3-phenylene and 1,4-phenylene, arbitrary hydrogen may be replaced by fluorine, chlorine, cyano, methyl, ethyl, methoxy, hydroxyl, formyl, acetoxy, acetyl, trifluoroacetyl, difluoromethyl or trifluoromethyl; and
Y¹ independently represents alkylene having from 2 to 20 carbon atoms, provided that in the alkylene, arbitrary hydrogen may be replaced by fluorine or chlorine, and arbitrary —CH$_2$— may be replaced by —O—, —COO—, —OCO—, —CH=CH— or —C≡C—,

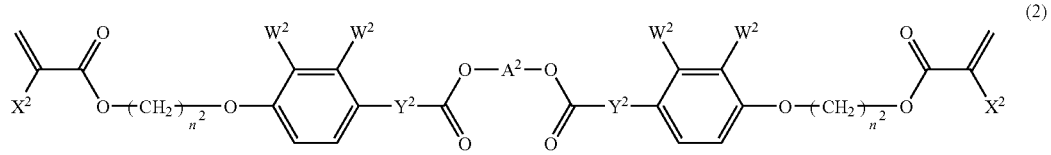
(2)

wherein A² represents a group represented by one of the formulae (A2-1) to (A2-18):

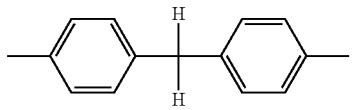
(A2-1)

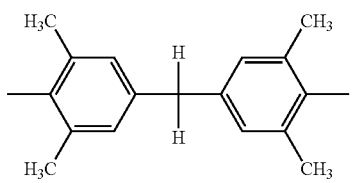
(A2-2)

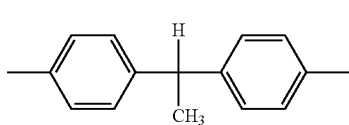
(A2-3)

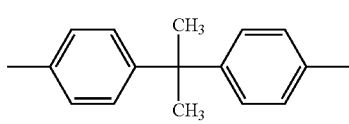
(A2-4)

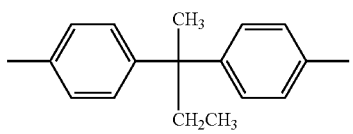
(A2-5)

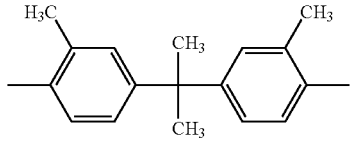
(A2-6)

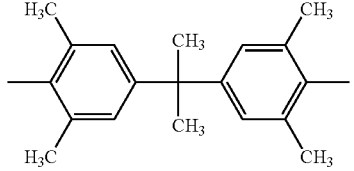
(A2-7)

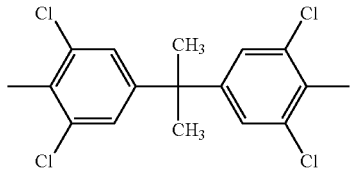
(A2-8)

-continued

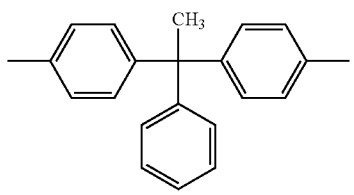
(A2-9)

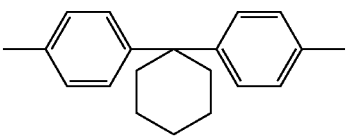
(A2-10)

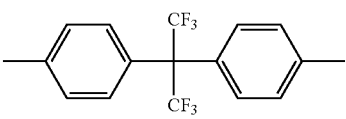
(A2-11)

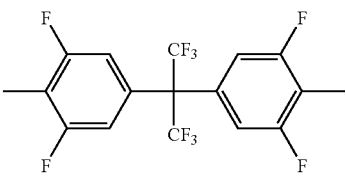
(A2-12)

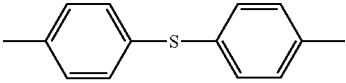
(A2-13)

-continued

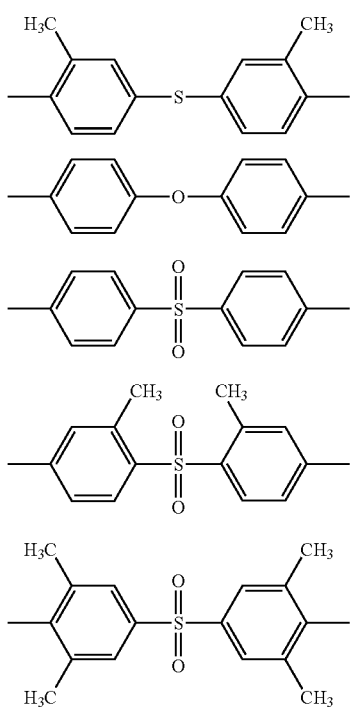

(A2-14)
(A2-15)
(A2-16)
(A2-17)
(A2-18)

$X^2$ independently represents hydrogen, fluorine, methyl or trifluoromethyl;
$W^2$ independently represents hydrogen, halogen, alkyl having from 1 to 3 carbon atoms or fluoroalkyl having from 1 to 3 carbon atoms;
$Y^2$ independently represents a single bond, —CH=CH— or —(CH$_2$)$_2$—; and
$n^2$ independently represents an integer of from 2 to 15, $W^{32}$ independently represents hydrogen or fluorine; and
$n^{31}$ independently represents an integer of from 2 to 10, and in the formula (3-2),
$X^{32}$ independently represents hydrogen, fluorine or methyl;
$Z^{31}$ independently represents —O— or a group represented by the formula (a),
$Z^{32}$ independently represents a single bond, —CH$_2$CH$_2$— or —CH=CH—;
$W^{33}$ independently represents hydrogen, fluorine, methyl or trifluoromethyl;
$W^{34}$ independently represents hydrogen or fluorine; and
$n^{32}$ independently represents an integer of from 2 to 10,

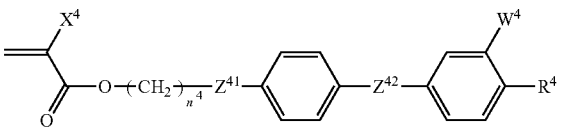

(4)

wherein
$X^4$ represents hydrogen, fluorine or methyl;
$R^4$ represents —CN, —OCF$_3$, alkyl having from 1 to 10 carbon atoms or alkoxy having from 1 to 10 carbon atoms;
$W^4$ represents hydrogen or fluorine;
$Z^{41}$ represents —O— or a group represented by the formula (a);
$Z^{42}$ represents a single bond, —C≡C— or —COO—; and
$n^4$ represents an integer of from 2 to 10.

2. The polymerizable liquid crystal composition according to claim 1, wherein
in the formula (1),
$W^1$ independently represents hydrogen or methyl;
$X^1$ independently represents hydrogen, fluorine or methyl;

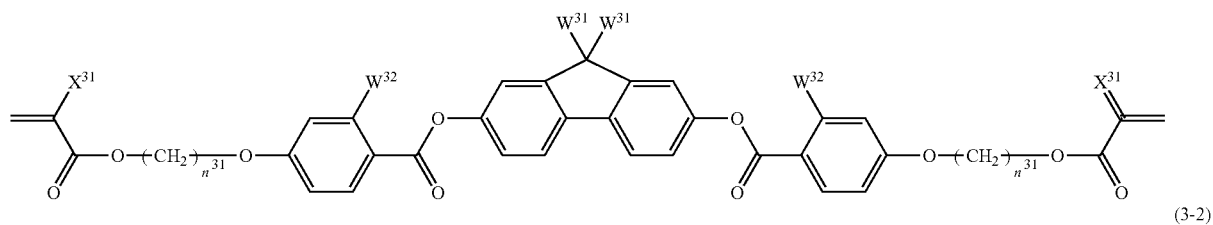

(3-1)

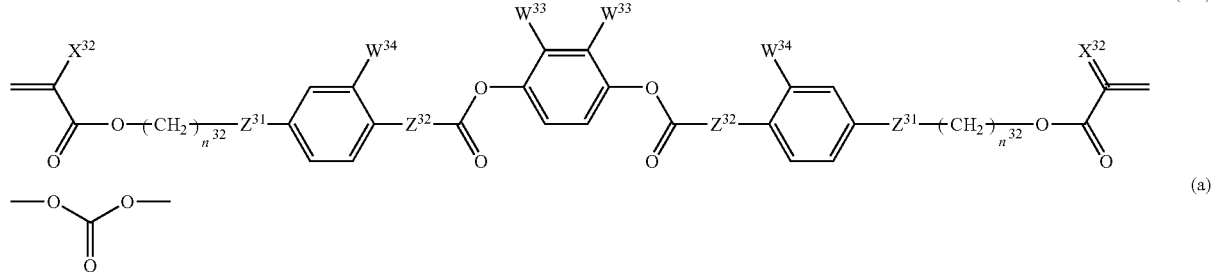

(3-2)

(a)

wherein
in the formula (3-1),
$X^{31}$ independently represents hydrogen, fluorine or methyl;
$W^{31}$ independently represents hydrogen or methyl;

$Z^{11}$ represents —COO—, —CH=CH—COO— or —CH$_2$CH$_2$—COO—;
$Z^{12}$ represents —OCO—, —OCO—CH=CH— or —OCO—CH$_2$CH$_2$—;
$Z^{13}$ and $Z^{14}$ each independently represent a single bond or —O—;

$A^1$ independently represents 1,4-phenylene or 1,3-phenylene, provided that in the rings, arbitrary hydrogen may be replaced by fluorine or chlorine; and $Y^1$ independently represents alkylene having from 2 to 14 carbon atoms, provided that in the alkylene, arbitrary —$CH_2$— may be replaced by —O—, in the formula (2), $A^2$ represents a group represented by one of the formulae (A2-1) to (A2-8) and (A2-11) to (A2-18);

$X^2$ independently represents hydrogen or methyl;

$W^2$ independently represents hydrogen or fluorine;

$Y^2$ independently represents a single bond, —CH=CH— or —$(CH_2)_2$—; and $n^2$ independently represents an integer of from 2 to 10, in the formula (3-1), $X^{31}$ independently represents hydrogen, fluorine or methyl;

$W^{31}$ independently represents hydrogen or methyl;

$W^{32}$ independently represents hydrogen or fluorine; and $n^{31}$ independently represents an integer of from 2 to 10, in the formula (3-2), $X^{32}$ independently represents hydrogen, fluorine or methyl;

$Z^{31}$ independently represents —O— or a group represented by the formula (a);

$Z^{32}$ independently represents a single bond, —$CH_2CH_2$— or CH=CH—;

$W^{33}$ independently represents hydrogen, fluorine, methyl or trifluoromethyl;

$W^{34}$ independently represents hydrogen or fluorine; and $n^{32}$ independently represents an integer of from 2 to 10, and in the formula (4), $X^4$ represents hydrogen, fluorine or methyl;

$R^4$ represents —CN, —$OCF_3$, alkyl having from 1 to 10 carbon atoms or alkoxy having from 1 to 10 carbon atoms;

$W^4$ represents hydrogen or fluorine;

$Z^{41}$ represents —O— or a group represented by the formula (a);

$Z^{42}$ represents a single bond, —C≡C— or —COO—; and $n^4$ represents an integer of from 2 to 10.

3. The polymerizable liquid crystal composition according to claim 1, wherein in the formula (1), $W^1$ independently represents hydrogen or methyl;

$X^1$ independently represents hydrogen or methyl;

$Z^{11}$ represents —COO—, —CH=CH—COO— or —$CH_2CH_2$—COO—;

$Z^{12}$ represents —OCO—, —OCO—CH=CH— or —OCO—$CH_2CH_2$—;

$Z^{13}$ and $Z^{14}$ each independently represent a single bond or —O—;

$A^1$ independently represents 1,4-phenylene or 1,3-phenylene, provided that in the rings, arbitrary hydrogen may be replaced by fluorine or chlorine; and $Y^1$ independently represents alkylene having from 2 to 14 carbon atoms, provided that in the alkylene, arbitrary —$CH_2$— may be replaced by —O—, in the formula (2), $A^2$ represents a group represented by one of the formulae (A2-1), (A2-4), (A2-11), (A2-12), (A2-16) and (A2-18);

$X^2$ independently represents hydrogen or methyl;

$W^2$ independently represents hydrogen or fluorine;

$Y^2$ independently represents a single bond, —CH=CH— or —$(CH_2)_2$—; and $n^2$ independently represents an integer of from 2 to 10, in the formula (3-1), $X^{31}$ independently represents hydrogen, fluorine or methyl;

$W^{31}$ independently represents hydrogen or methyl;

$W^{32}$ independently represents hydrogen or fluorine; and $n^{31}$ independently represents an integer of from 2 to 10, in the formula (3-2), $X^{32}$ independently represents hydrogen, fluorine or methyl;

$Z^{31}$ independently represents —O— or a group represented by the formula (a);

$Z^{31}$ independently represents a single bond, —$CH_2CH_2$— or CH=CH—;

$W^{33}$ independently represents hydrogen, methyl or trifluoromethyl;

$W^{34}$ independently represents hydrogen, and $n^{32}$ independently represents an integer of from 2 to 10, and in the formula (4), $X^4$ represents hydrogen or methyl;

$R^4$ represents —CN, —$OCF_3$, alkyl having from 1 to 10 carbon atoms or alkoxy having from 1 to 10 carbon atoms;

$W^4$ represents hydrogen or fluorine;

$Z^{41}$ represents —O— or a group represented by the formula (a);

$Z^{42}$ represents a single bond, —C≡C— or —COO—; and $n^4$ represents an integer of from 2 to 10.

4. The polymerizable liquid crystal composition according to claim 1, wherein the composition comprises the component (A), the component (B) and the component (C).

5. The polymerizable liquid crystal composition according claim 1, wherein the composition comprises the component (A), the component (B) and the component (D).

6. The polymerizable liquid crystal composition according to claim 1, wherein the composition comprises the component (A), the component (B), the component (C) and the component (D).

7. The polymerizable liquid crystal composition according to claim 1, wherein the composition further comprises at least one silane coupling agent selected from compounds represented by the formulae (5-1) and (5-2), and a weight ratio of the silane coupling agent is from 0.01 to 0.15 based on a total weight of the components (A) to (D):

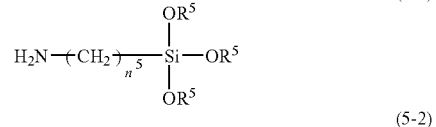

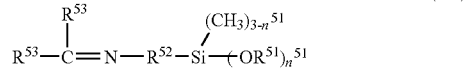

wherein in the formula (5-1), $R^5$ independently represents methyl or ethyl; and $n^5$ represents an integer of from 1 to 5, and and in formula (5-2), $R^{51}$ represents alkyl having from 1 to 4 carbon atoms;

$R^{52}$ represents alkyl having from 1 to 10 carbon atoms;

$R^{53}$ independently represents hydrogen or alkyl having from 1 to 10 carbon atoms, provided that all groups represented by $R^{53}$ each are not hydrogen simultaneously; and $n^{51}$ represents an integer of from 1 to 3.

8. The polymerizable liquid crystal composition according to claim 7, wherein
in the formula (5-1),
   $R^5$ represents ethyl; and
   $n^5$ represents an integer of from 1 to 5,
in the formula (5-2),
   $R^{51}$ represents methyl or ethyl;
   $R^{52}$ represents alkyl having from 1 to 10 carbon atoms;
   $R^{53}$ independently represents hydrogen or alkyl having from 1 to 10 carbon atoms, provided that all groups represented by $R^{53}$ each are not hydrogen simultaneously; and
   $n^{51}$ represents an integer of 3,
and a weight ratio of the silane coupling agent is from 0.03 to 0.10 based on a total weight of the components (A) to (D).

9. The polymerizable liquid crystal composition according to claim 1, wherein the composition further comprises a nonionic surfactant, and a weight ratio of the nonionic surfactant is from 0.0001 to 0.03 based on a total weight of the components (A) to (D).

10. The polymerizable liquid crystal composition according to claim 9, wherein the nonionic surfactant is a fluorine-related nonionic surfactant, a silicone-related nonionic surfactant or a hydrocarbon-related nonionic surfactant.

11. The polymerizable liquid crystal composition according to claim 1, wherein an amount of the component (A) is from 5 to 95% by weight, an amount of the component (B) is from 1 to 30% by weight, an amount of the component (C) is from 0 to 47% by weight, and an amount of the component (D) is from 0 to 47% by weight, based on a total weight of the components (A) to (D).

12. The polymerizable liquid crystal composition according to claim 1, wherein an amount of the component (A) is from 10 to 90% by weight, an amount of the component (B) is from 1 to 28% by weight, an amount of the component (C) is from 0 to 45% by weight, and an amount of the component (D) is from 0 to 44% by weight, based on a total weight of the components (A) to (D).

13. The polymerizable liquid crystal composition according to claim 1, wherein an amount of the component (A) is from 15 to 85% by weight, an amount of the component (B) is from 1 to 25% by weight, an amount of the component (C) is from 0 to 42% by weight, and an amount of the component (D) is from 0 to 42% by weight, based on a total weight of the components (A) to (D).

14. A film having optical anisotropy obtained by polymerizing at least one of the polymerizable liquid crystal composition according to claim 1.

15. A film having optical anisotropy obtained by polymerizing at least one of the polymerizable liquid crystal composition according to claim 5.

16. A film having optical anisotropy obtained by polymerizing at least one of the polymerizable liquid crystal composition according to claim 7.

17. A film having optical anisotropy obtained by polymerizing at least one of the polymerizable liquid crystal composition according to claim 9.

18. The film having optical anisotropy according to claim 14, wherein the polymerizable liquid crystal composition is in a homogeneous alignment state.

19. The film having optical anisotropy according to claim 14, wherein the polymerizable liquid crystal composition is in a homeotropic alignment state.

20. The film having optical anisotropy according to claim 14, wherein the polymerizable liquid crystal composition is in a hybrid alignment state.

21. The film having optical anisotropy according to claim 17, wherein the polymerizable liquid crystal composition is in a homogeneous alignment state.

22. The film having optical anisotropy according to claim 17, wherein the polymerizable liquid crystal composition is in a homeotropic alignment state.

23. The film having optical anisotropy according to claim 17, wherein the polymerizable liquid crystal composition is in a hybrid alignment state.

24. A liquid crystal display device comprising the film having optical anisotropy according to claim 14.

* * * * *